US012689843B2

(12) United States Patent
Jang

(10) Patent No.: US 12,689,843 B2
(45) Date of Patent: Jul. 21, 2026

(54) IMAGE SENSING DEVICE AND METHOD FOR SENSING DISTANCE

(71) Applicant: SK hynix Inc., Icheon-si (KR)

(72) Inventor: Jae Hyung Jang, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 32 days.

(21) Appl. No.: 18/784,668

(22) Filed: Jul. 25, 2024

(65) Prior Publication Data

US 2025/0039581 A1 Jan. 30, 2025

(30) Foreign Application Priority Data

Jul. 25, 2023 (KR) ......................... 10-2023-0096705
Nov. 27, 2023 (KR) ......................... 10-2023-0166739
Jun. 24, 2024 (KR) ......................... 10-2024-0082106

(51) Int. Cl.
  *H04N 25/773* (2023.01)
(52) U.S. Cl.
  CPC ................................. *H04N 25/773* (2023.01)
(58) Field of Classification Search
  CPC ....... H04N 25/773; H02S 10/10; H02S 20/23; H10N 39/00; H10N 30/30; B60L 53/12; B60L 53/51; H02J 50/30; H02J 50/00; H02J 50/10; H02J 7/35
  USPC ....................................................... 348/308
  See application file for complete search history.

(56) References Cited

U.S. PATENT DOCUMENTS

| | | | | |
|---|---|---|---|---|
| 5,578,815 A | * | 11/1996 | Nakase | ..................... G05F 3/18 |
| | | | | 250/214 R |
| 9,178,100 B2 | | 11/2015 | Webster et al. | |
| 10,446,601 B2 | | 10/2019 | Otake et al. | |
| 10,580,817 B2 | * | 3/2020 | Otake | .................. H10F 39/199 |
| 10,641,653 B2 | * | 5/2020 | Storm | ................... G01J 1/0228 |
| 10,680,028 B2 | | 6/2020 | Kobayashi et al. | |
| 11,159,738 B2 | * | 10/2021 | Gnecchi | ................. G06T 7/521 |
| 11,221,253 B2 | * | 1/2022 | Ledvina | .................... G01J 1/44 |
| 11,245,865 B2 | * | 2/2022 | Huang | ................. H04N 25/778 |
| 11,296,241 B2 | * | 4/2022 | Azuma | ................. H10F 77/959 |
| 11,609,308 B2 | * | 3/2023 | Ueno | .................... G01S 7/4863 |
| 11,714,172 B2 | * | 8/2023 | Ozawa | .................. G01S 7/4914 |
| | | | | 356/4.01 |
| 11,849,200 B2 | * | 12/2023 | Ito | ............................ G01C 3/06 |

(Continued)

FOREIGN PATENT DOCUMENTS

| | | |
|---|---|---|
| JP | 2021197596 A | 12/2021 |
| JP | 2022083067 A | 6/2022 |
| KR | 10-2023-0001795 A | 1/2023 |

OTHER PUBLICATIONS

Canon Global, "Canon develops world's first 1-megapixel SPAD image sensor," News Release, Jun. 24, 2020, url: https://global. canon/en/news/2020/20200624.html, 4 pages.

(Continued)

*Primary Examiner* — Pritham D Prabhakher
(74) *Attorney, Agent, or Firm* — Perkins Coie LLP

(57) ABSTRACT

An image sensing device is provided to include a first pixel including a first single-photon avalanche diode (SPAD) that includes a cathode to receive a first bias voltage; a second pixel including a second SPAD that includes an anode to receive a second bias voltage; and a selection circuit coupled to the first pixel and the second pixel and configured to select the first pixel or the second pixel to produce an output.

25 Claims, 46 Drawing Sheets

(56) References Cited

U.S. PATENT DOCUMENTS

| | | | | |
|---|---|---|---|---|
| 11,943,542 | B2 * | 3/2024 | Gnecchi | H04N 25/70 |
| 12,028,631 | B2 * | 7/2024 | Shinohara | H04N 25/77 |
| 12,326,503 | B2 * | 6/2025 | Hata | G01S 17/10 |
| 2013/0193546 | A1 | 8/2013 | Webster et al. | |
| 2014/0191115 | A1 * | 7/2014 | Webster | H10F 30/225 |
| | | | | 250/214 R |
| 2018/0058924 | A1 * | 3/2018 | Storm | G01J 1/44 |
| 2019/0006399 | A1 * | 1/2019 | Otake | H10F 39/811 |
| 2019/0181177 | A1 * | 6/2019 | Kobayashi | H10F 39/811 |
| 2019/0302242 | A1 * | 10/2019 | Fenigstein | H10F 30/225 |
| 2020/0044098 | A1 * | 2/2020 | Azuma | G01S 7/486 |
| 2020/0203415 | A1 * | 6/2020 | Kobayashi | H10F 39/811 |
| 2020/0321369 | A1 * | 10/2020 | Otake | H10F 39/199 |
| 2021/0025990 | A1 * | 1/2021 | Ozawa | G01S 17/88 |
| 2021/0063588 | A1 * | 3/2021 | McGarvey | H10F 77/959 |
| 2021/0088658 | A1 * | 3/2021 | Hata | G01S 7/4863 |
| 2021/0092275 | A1 * | 3/2021 | Gnecchi | G06T 7/521 |
| 2021/0185260 | A1 * | 6/2021 | Huang | H04N 25/778 |
| 2021/0223098 | A1 * | 7/2021 | Ledvina | G01J 1/44 |
| 2021/0257508 | A1 * | 8/2021 | Feick | H10F 77/206 |
| 2022/0006942 | A1 * | 1/2022 | Gnecchi | G06T 7/521 |
| 2022/0011413 | A1 * | 1/2022 | Yin | G01S 7/4865 |
| 2022/0069152 | A1 * | 3/2022 | Tosi | G01S 17/18 |
| 2022/0182523 | A1 | 6/2022 | Ito et al. | |
| 2023/0258776 | A1 * | 8/2023 | Morimoto | G01S 7/4816 |
| | | | | 250/206 |
| 2023/0358534 | A1 * | 11/2023 | Inoue | G01C 3/08 |
| 2023/0421919 | A1 * | 12/2023 | Shinohara | H04N 25/773 |
| 2024/0145503 | A1 * | 5/2024 | Al-Rawhani | G01S 7/4863 |

OTHER PUBLICATIONS

Jang, Jun-yeon, "Next-Generation 3D Image Sensor Device-Single-Photon Avalanche Diode (SPAD)," SK hynix Newsroom, May 12, 2021, url: https://news.skhynix.co.kr/post/next-gen-3d, 18 pages with English translation.

Shimada, S. et al.., "A Back Illuminated 6 μm SPAD Pixel Array with High PDE and Timing Jitter Performance," Sony Semiconductor Solutions & Sony Semiconductor Manufacturing, IEDM21-446, 2021 IEEE, 4 pages.

* cited by examiner

400a

| SPAD_C | SPAD_C | SPAD_A | SPAD_A |
| SPAD_C | SPAD_C | SPAD_A | SPAD_A |
| SPAD_C | SPAD_C | SPAD_A | SPAD_A |
| SPAD_C | SPAD_C | SPAD_A | SPAD_A |

Column

Row

400b

| SPAD_C | SPAD_A | SPAD_C | SPAD_A |
| SPAD_A | SPAD_C | SPAD_A | SPAD_C |
| SPAD_C | SPAD_A | SPAD_C | SPAD_A |
| SPAD_A | SPAD_C | SPAD_A | SPAD_C |

Column

Row 900-1

BN

ON

A ◄ - - - - - - - - - - - - - - - - - - - ► A'

900-2

900-3

1600

2300-2

IMAGE SENSING DEVICE AND METHOD FOR SENSING DISTANCE

CROSS-REFERENCE TO RELATED APPLICATION

This patent document claims the priority and benefits of Korean patent application Nos. 10-2023-0096705 filed on 25 Jul. 2023, 10-2023-0166739 filed on 27 Nov. 2023 and 10-2024-0082106 filed on 24 Jun. 2024, the disclosures of which are incorporated herein by reference in its entirety as part of the disclosure of this patent document.

TECHNICAL FIELD

The technology and implementations disclosed in this patent document generally relate to an image sensing device capable of detecting a distance to a target object and a method for sensing the distance.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various devices such as smart phones, wearable devices, digital cameras, game machines, IOT (Internet of Things), robots, security cameras and medical micro-cameras.

Recently, image sensing devices have been actively used not only to acquire color images but also to sense the distance to a target object to be captured. In particular, a direct time of flight (D-ToF) method, which directly or indirectly measures a time duration in which light is reflected from the target object and returns to the image sensing device, has been widely used.

SUMMARY

In accordance with an embodiment of the disclosed technology, an image sensing device may include a first pixel including a first single-photon avalanche diode (SPAD) that includes a cathode to receive a first bias voltage; a second pixel including a second SPAD that includes an anode to receive a second bias voltage; and a selection circuit coupled to the first pixel and the second pixel and configured to select the first pixel or the second pixel to produce an output.

In accordance with another embodiment of the disclosed technology, an image sensing device may include a first pixel including a first single-photon avalanche diode (SPAD) with a first detection sensitivity; a second pixel including a second SPAD with a second detection sensitivity higher than the first detection sensitivity; and a selection circuit coupled to the first pixel and the second pixel and configured to select the first pixel or the second pixel.

In accordance with another embodiment of the disclosed technology, an image sensing device may include a first pixel including a first single-photon avalanche diode (SPAD) activated at a first illuminance; a second pixel including a second SPAD activated at a second illuminance lower than the first illuminance; and a selection circuit configured to activate any one of the first pixel and the second pixel in response to illuminance information.

In accordance with another embodiment of the disclosed technology, an image sensing device may include: a plurality of single-photon avalanche diodes (SPADs), each SPAD configured to receive a bias voltage to operate in a Geiger mode in which a reverse bias voltage exceeding a breakdown voltage occurs; and a selection circuit coupled to the plurality of SPADs and configured to select any one of the plurality of SPADs to produce an output.

In accordance with another embodiment of the disclosed technology, a distance detection method may include: selecting a first pixel that includes a first single-photon avalanche diode (SPAD) that detects a single photon with a first detection sensitivity or a second pixel that includes a second SPAD that detects a single photon with a second detection sensitivity higher than the first detection sensitivity; and determining a distance from the first and second pixels to a target object based on a pulse signal output from the selected first pixel or second pixel.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
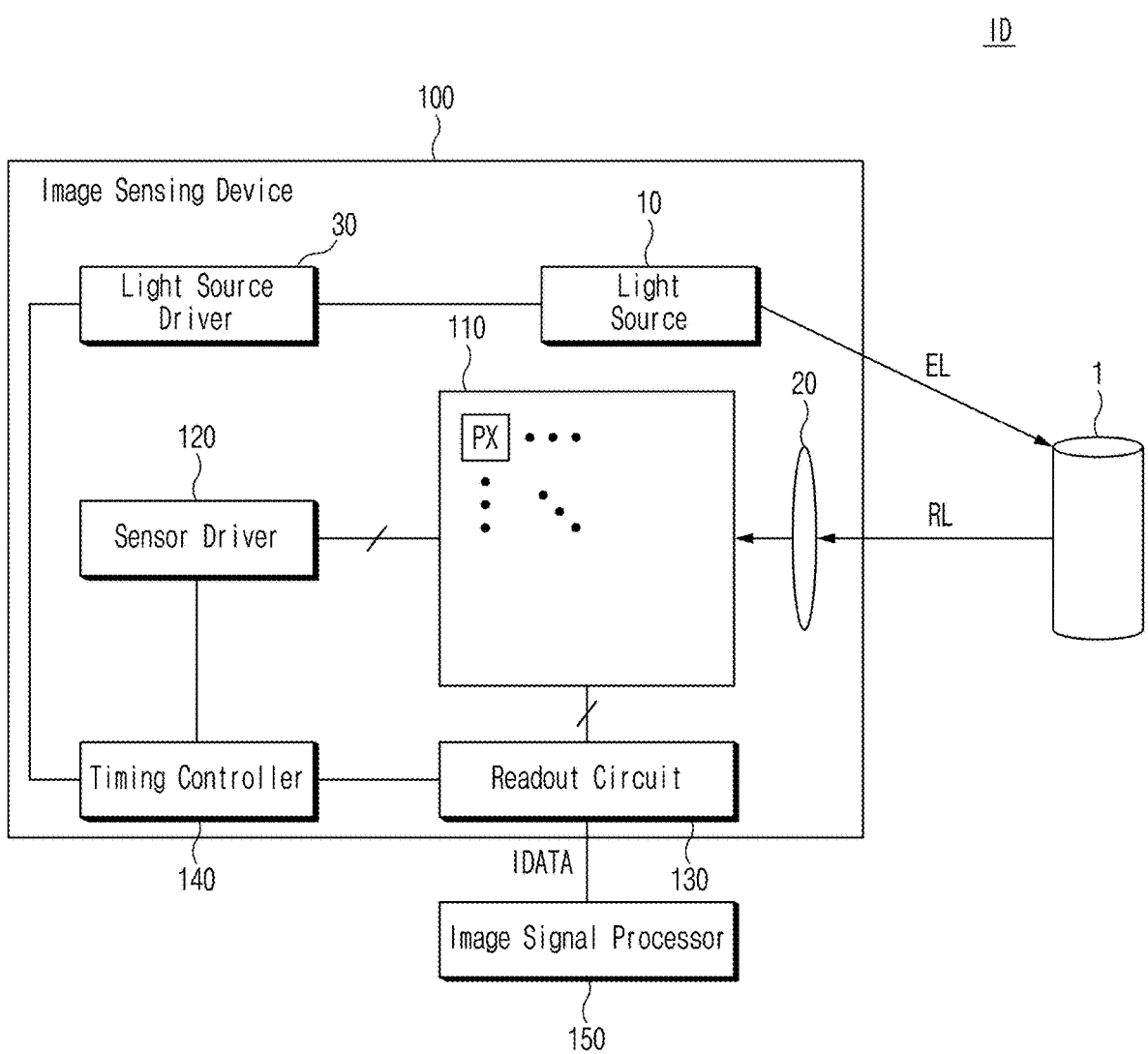
FIG. 1 is a block diagram illustrating an example of an imaging device based on some implementations of the disclosed technology.

This patent document provides implementations and examples of an image sensing device capable of detecting a distance to a target object and a method for sensing the distance that may be used in configurations to substantially address one or more technical or engineering issues and to mitigate limitations or disadvantages encountered in some other image sensing devices. Some implementations of the disclosed technology relate to an image sensing device that can operate in a mode suitable for a photographing (or shooting) condition, and a method for sensing a distance to a target object to be captured. In recognition of the issues above, the disclosed technology may provide the image sensing device that includes single-photon avalanche diode (SPAD) pixels that are operable to detect a single photon in the incident light at different detection sensitivities, and detects a distance from the SPAD pixels to a target object using one or more SPAD pixels appropriate for a situation, resulting in implementation of optimal performance optimized for the imaging device.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereinafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Various embodiments of the disclosed technology relate to an image sensing device that can operate in a mode suitable for a photographing (or shooting) condition, and a method for sensing a distance to a target object to be captured.

It is to be understood that both the foregoing general description and the following detailed description of the disclosed technology are illustrative and explanatory and are intended to provide further explanation of the disclosure as claimed.

FIG. 1 is a block diagram illustrating an example of an imaging device (ID) based on some implementations of the disclosed technology.

Referring to FIG. 1, the imaging device (ID) may refer to a device, for example, a digital still camera for photographing still images or a digital video camera for photographing moving images. For example, the imaging device (ID) may be implemented as a Digital Single Lens Reflex (DSLR) camera, a mirrorless camera, or a smartphone, and others. The imaging device (ID) may include a device having both a lens and an image pickup element such that the device can capture (or photograph) a target object and can thus create an image of the target object. In some implementations, the imaging device (ID) may be a distance measurement device that measures the distance to the target object 1. For example, the imaging device (ID) may be implemented as a Lidar sensor.

The imaging device (ID) may include an image sensing device 100 and an image signal processor (ISP) 150.

The image sensing device 100 may be a complementary metal oxide semiconductor image sensor (CIS) for converting incident light into an electrical signal. The image sensing device 100 may include a light source 10, a lens module 20, a light source driver 30, a pixel array 110, a sensor driver 120, a readout circuit 130, and a timing controller 140.

The light source 10 may emit light to a target object 1 upon receiving a control signal from the light source driver 30. The light source 10 may be a laser diode (LD) or a light emitting diode (LED) for emitting light (e.g., near infrared (NIR) light, infrared (IR) light or visible light) having a specific wavelength band, or may be any one of a Near Infrared Laser (NIR), a point light source, a monochromatic light source combined with a white lamp or a monochromator, and a combination of other laser sources. For example, the light source 10 may emit infrared light having a wavelength of 800 nm to 1000 nm. Meanwhile, light emitted from the light source 10 may be pulsed light having a predetermined period, amplitude, and pulse width. Although FIG. 1 shows only one light source 10 for convenience of description, the scope or spirit of the disclosed technology is not limited thereto, and a plurality of light sources may also be arranged in the vicinity of the lens module 20.

The lens module 20 may collect light reflected from the target object 1, and may allow the collected light to be focused onto pixels (PXs) of the pixel array 110. For example, the lens module 20 may include a focusing lens having a surface formed of glass or plastic or another cylindrical optical element having a surface formed of glass or plastic. The lens module 20 may include a plurality of lenses that is arranged to be focused upon an optical axis.

The light source driver 30 may drive the light source 10 under control of the timing controller 140. In particular, the light source driver 30 may control waveforms (e.g., a period, amplitude, pulse width, etc.) of emitted light (EL) output from the light source 10.

The pixel array 110 may include a plurality of pixels (PXs) consecutively arranged in a two-dimensional (2D) matrix structure (e.g., consecutively arranged in a column direction and/or a row direction). Each of the plurality of pixels (PXs) may generate a pixel signal by sensing incident light incident through the lens module 20 under control of the sensor driver 120.

Each pixel (PX) may be an infrared pixel for generating a pixel signal by sensing incident light that includes reached light (RL) generated when emitted light (EL) from the light source 10 is reflected from the target object 1. Although the present embodiment assumes that the reached light (RL) is light that is reflected from the target object 1 and incident upon the pixel array 110 for convenience of description, the scope or spirit of the disclosed technology is not limited thereto. For example, the light source 10 may be provided in a separate device other than the image sensing device 100, and the reached light (RL) may be obtained when the emitted light (EL) emitted from the light source 10 is directly incident upon the pixel array 110. In some implementations, the infrared pixel may be a depth pixel for calculating the distance to the target object 1. According to another embodiment, the infrared pixel may include a pixel for generating an infrared image by simply sensing infrared light incident from a scene without sensing reflected light. According to still another embodiment, the pixels (PXs) may include a pixel for generating a color image by sensing visible light incident from a scene. Hereinafter, description will be given assuming that each pixel (PX) is a single-photon avalanche diode (SPAD) pixel for detecting the distance from the PXs to the target object 1 according to a direct time-of-flight (ToF) method. A more detailed structure and operations of each unit pixel (PX) will hereinafter be described with reference to the drawings from FIGS. 2A and 2B.

The sensor driver 120 may drive the pixels (PXs) of the pixel array 110 in response to a timing signal output from the timing controller 140. For example, the sensor driver 120 may generate a control signal capable of selecting and controlling pixels (PXs) included in at least one row line from among a plurality of row lines of the pixel array 110.

The readout circuit 130 may process pixel signals received from the pixel array 110 under control of the timing controller 140, and may generate and store depth data for detecting the distance to the target object 1.

Specifically, the readout circuit 130 may calculate a candidate time-of-flight (ToF) corresponding to SPAD pulses generated by each pixel (PX) sensing the incident light including the reached light (RL), and may store the candidate time-of-flight (ToF) corresponding to the SPAD pulses in units of a subframe. The readout circuit 130 may transmit the candidate time-of-flight (ToF) stored in units of a subframe to the image signal processor 150 under control of the timing controller 140. In the present embodiment, for convenience of explanation, the term "candidate time-of-flight (ToF)" may be used interchangeably with the term "time-of-flight (ToF)" as necessary.

The timing controller 140 may generate a timing signal to control the light source driver 30, the sensor driver 120, and the readout circuit 130. In some implementations, the timing controller 140 may generate a timing signal according to a prestored sequence, data received from the readout circuit 130 and/or a request received from the image signal processor 150. In some implementations, the timing controller 140 may include a logic control circuit, a phase lock loop (PLL) circuit, a timing control circuit, a communication interface circuit and others.

The image signal processor 150 may perform at least one image signal process on image data (IDATA) received from the image sensing device 100, and may thus generate the processed image data. The image signal processor 150 may reduce noise of image data (IDATA), and may perform various kinds of image signal processing (e.g., interpolation of image data (IDATA), lens distortion correction, etc.) for image-quality improvement of the image data.

The image data (IDATA) may include the candidate time-of-flight (ToF) stored for each subframe. The image signal processor 150 may generate a histogram for one frame by accumulating data stored in units of a subframe, and may determine a target time-of-flight (ToF) for one frame based on the histogram. The target time-of-flight (ToF) may be determined for each pixel (PX), and the image signal processor 150 may determine a target distance (i.e., the distance to the target object 1 detected by each pixel PX) based on the candidate target time-of-flight (ToF) of each pixel (PX). A set (or aggregate) of target distances for pixels (PXs) included in the pixel array 110 may hereinafter be referred to as a depth image, and may be included in processed image data.

The image signal processor 150 may transmit the processed image data to a host device (not shown). The host device (not shown) may include a processor (e.g., an application processor) for processing image signal processed (ISP) image data received from the image signal processor 150, a memory (e.g., a non-volatile memory) for storing the ISP image data, a display device (e.g., a liquid crystal display (LCD)) for visually displaying the ISP image data, and the like.

The image signal processor 150 may transmit a control signal for controlling operations (whether or not to operate, an operation timing, an operation mode, etc.) of the image sensing device 100 to the image sensing device 100.

Figure 2A:
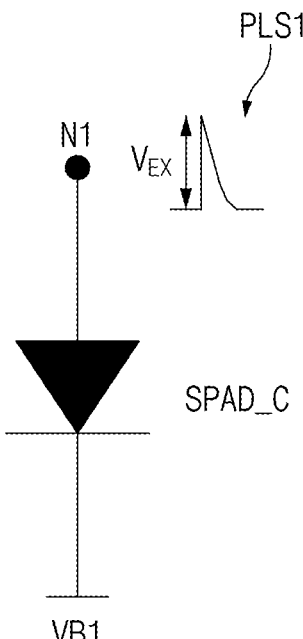
FIG. 2A is a circuit diagram illustrating an example of a first single-photon avalanche diode (SPAD) included in a pixel included in a pixel array shown in FIG. 1 based on some implementations of the disclosed technology.

FIG. 2A is a circuit diagram illustrating an example of a first single-photon avalanche diode (SPAD) included in a pixel (PX) included in the pixel array 110 shown in FIG. 1 based on some implementations of the disclosed technology.

Referring to FIG. 2A, at least one pixel (PX) included in the pixel array 110 of FIG. 1 may include a first SPAD (SPAD_C). The first SPAD (SPAD_C) may detect a single photon of the reached light (RL) reflected by the target object (1) and may generate a first voltage pulse (PLS1) corresponding to the detected single photon. The first voltage pulse (PLS1) may have a pulse shape in which a voltage temporarily increases in response to detection of a single photon.

The first SPAD (SPAD_C) may operate as a photodiode including a photosensitive P-N junction. In such a SPAD, the avalanche breakdown is triggered by a single photon incident in a Geiger mode in which a reverse bias voltage caused by a cathode-anode voltage higher than a breakdown voltage occurs. Under such a design, the first SPAD (SPAD_C) may be operated to generate a first voltage pulse (PLS1) and the process by which avalanche breakdown is triggered by a single photon and a voltage pulse is generated will hereinafter be defined as an avalanche process.

The cathode of the first SPAD (SPAD_C) may receive a first bias voltage (VB1) for applying a reverse bias voltage to the first SPAD (SPAD_C), which allows the first SPAD (SPAD_C) to operate in the Geiger mode. In some implementations, the first bias voltage (VB1) may be a voltage that causes a value obtained by subtracting a voltage of a first node (N1) from the first bias voltage (VB1) to be a voltage higher than a breakdown voltage ($V_B$) of the first SPAD (SPAD_C). The voltage of the first node (N1) may be initialized to a quenching voltage by the operation of an external circuit (e.g., a quenching circuit) connected to the first node (N1). Accordingly, the first bias voltage (VB1) may be a voltage that causes a value obtained by subtracting a quenching voltage from the first bias voltage (VB1) to be a voltage higher than the breakdown voltage. For example, when the quenching voltage is a ground voltage (e.g., OV), the first bias voltage (VB1) may be the sum of the breakdown voltage ($V_B$) and an excess voltage ($V_{EX}$). Here, the excess voltage ($V_{EX}$) may be a predetermined voltage to operate the first SPAD (SPAD_C) in the Geiger mode.

The avalanche breakdown of the first SPAD (SPAD_C) may be triggered by a single photon to increase the voltage of the first node (N1) by the excess voltage ($V_{EX}$). An external circuit (e.g., a quenching circuit) connected to the first node (N1) may initialize the voltage of the first node (N1) to the quenching voltage, thereby performing a quenching and recharging operation in which the first SPAD (SPAD_C) returns to the Geiger mode. Accordingly, the first voltage pulse (PLS1) having an amplitude of the excess voltage ($V_{EX}$) may be generated at the first node (N1) serving as the anode of the first SPAD (SPAD_C).

Figure 2B:
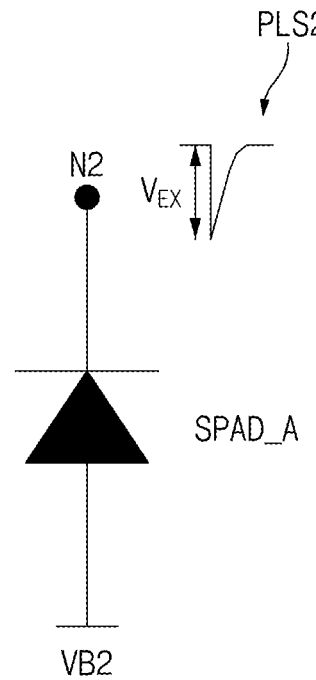
FIG. 2B is a circuit diagram illustrating an example of a second SPAD included in a pixel included in the pixel array shown in FIG. 1 based on some implementations of the disclosed technology.

FIG. 2B is a circuit diagram illustrating an example of a second SPAD included in a pixel (PX) included in the pixel array 110 shown in FIG. 1 based on some implementations of the disclosed technology.

Referring to FIG. 2B, at least one pixel (PX) included in the pixel array 110 of FIG. 1 may include a second SPAD (SPAD_A). In some implementations, each of the pixels (PXs) included in the pixel array 110 may include a first SPAD (SPAD_C) or a second SPAD (SPAD_A).

The second SPAD (SPAD_A) may detect a single photon of the reached light (RL) reflected by the target object 1 and may generate a second voltage pulse (PLS2) corresponding to the detected single photon. The second voltage pulse (PLS2) may have a pulse shape in which the voltage temporarily drops in response to detection of a single photon.

As the overall operation and characteristics of the second SPAD (SPAD_A) are similar to those of the first SPAD (SPAD_C), redundant description thereof will herein be omitted, and the following description will be given centering upon characteristic operation different from those of the first SPAD (SPAD_C).

The anode of the second SPAD (SPAD_A) may receive a second bias voltage (VB2) for applying a reverse bias voltage to the second SPAD (SPAD_A), which allows the second SPAD (SPAD_A) to operate in the Geiger mode. In some implementations, the second bias voltage (VB2) may be a voltage that causes a value obtained by subtracting a second bias voltage (VB2) from a voltage of a second node (N2) to be a voltage higher than a breakdown voltage ($V_B$) of the second SPAD (SPAD_A). The voltage of the second node (N2) may be initialized to a quenching voltage by the operation of an external circuit (e.g., a quenching circuit) connected to the second node (N2). Accordingly, the second bias voltage (VB2) may be a voltage that causes a value obtained by subtracting a second bias voltage (VB2) from the quenching voltage to be a voltage higher than the breakdown voltage. For example, when the quenching voltage is a ground voltage (e.g., OV), the second bias voltage (VB2) may have a negative voltage (i.e., $-(V_B+V_{EX})$) with respect to the sum of the breakdown voltage ($V_B$) and the excess voltage ($V_{EX}$). Here, the excess voltage ($V_{EX}$) may be a predetermined voltage to operate the second SPAD (SPAD_A) in the Geiger mode.

The avalanche breakdown of the second SPAD (SPAD_A) may be triggered by a single photon to reduce the voltage of the second node (N2) by the excess voltage ($V_{EX}$). An external circuit (e.g., a quenching circuit) connected to the second node (N2) may initialize the voltage of the second node (N2) to the quenching voltage, thereby performing a quenching and recharging operation in which the second SPAD (SPAD_A) returns to the Geiger mode. Accordingly, the second voltage pulse (PLS2) having an amplitude of the excess voltage ($V_{EX}$) may be generated at the second node (N2) serving as a cathode of the second SPAD (SPAD_A).

Figure 3:
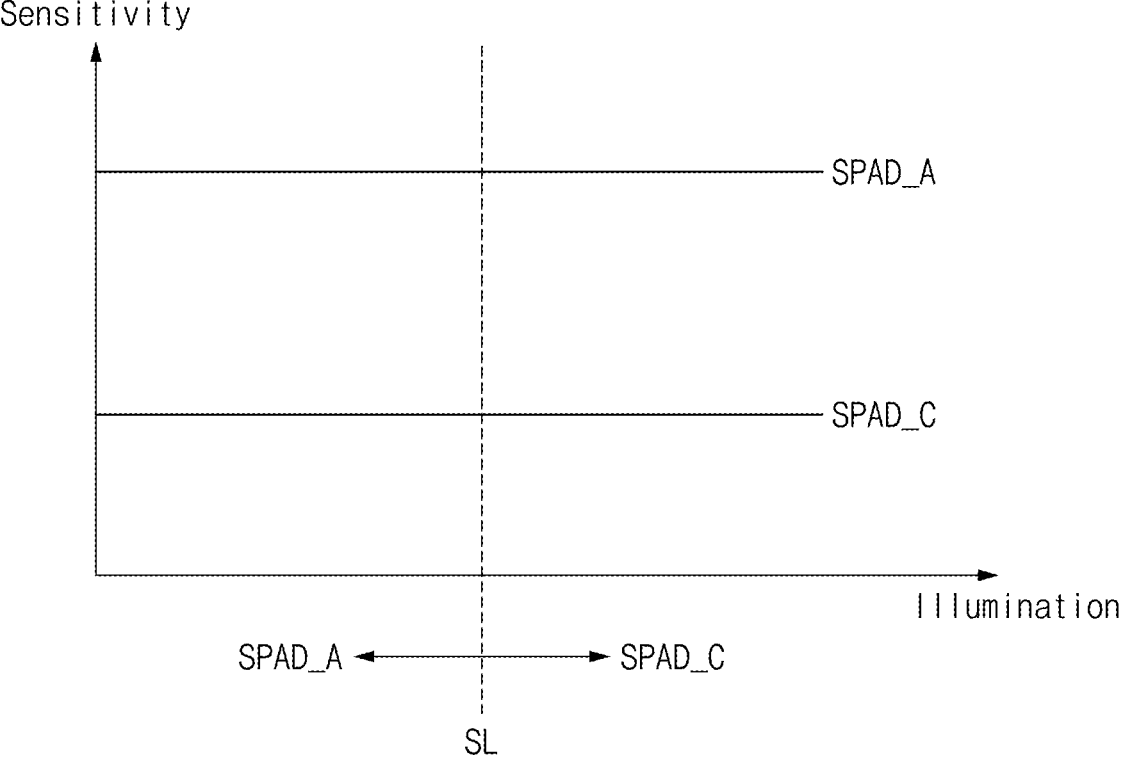
FIG. 3 is a graph illustrating an example of a result of comparison in characteristics between the first SPAD and the second SPAD based on some implementations of the disclosed technology.

FIG. 3 is a graph illustrating an example of a result of comparison in characteristics between the first SPAD (SPAD_C) and the second SPAD (SPAD_A) based on some implementations of the disclosed technology.

The graph of FIG. 3 shows sensitivity of the first SPAD (SPAD_C) and sensitivity of the second SPAD (SPAD_A) with respect to illumination (also referred to as "illuminance"). Here, the sensitivity may also be defined as photon detection efficiency (PDE).

As can be seen from FIG. 2A, when the avalanche process occurs in the first SPAD (SPAD_C) that operates in the Geiger mode upon receiving the first bias voltage (VB1) through the cathode thereof, the first SPAD (SPAD_C) may generate the first voltage pulse (PLS1) in which the voltage of the first node (N1) temporarily increases. In the implementation, carriers introduced into the first node (N1) to allow the first SPAD (SPAD_C) to generate the first voltage pulse (PLS1) are holes serving as positive (+) charges. As the hole has a relatively low mobility, the first SPAD (SPAD_C) may have a relatively low sensitivity.

When the avalanche process occurs in the second SPAD (SPAD_A) that operates in the Geiger mode upon receiving the second bias voltage (VB2) through the anode thereof, the second SPAD (SPAD_A) may generate the second voltage pulse (PLS2) in which the voltage of the second node (N2) temporarily drops. In the implementation, carriers introduced into the second node (N2) to allow the second SPAD (SPAD_A) to generate the second voltage pulse (PLS2) are electrons serving as negative (−) charges. As the electron has a relatively high mobility, the second SPAD (SPAD_A) may have a relatively high sensitivity.

Thus, the first sensitivity of the first SPAD (SPAD_C) is different from the second sensitivity of the second SPAD (SPAD_A). In the implementation, the first sensitivity of the first SPAD (SPAD_C) may be lower than the second sensitivity of the second SPAD (SPAD_A).

Based on the sensitivity characteristics of the first SPAD (SPAD_C) and the second SPAD (SPAD_A), for a certain range of illuminance, one of the first SPAD (SPAD_C) and the second SPAD (SPAD_A) can be more suitable than the other one of the first SPAD (SPAD_C) and the second SPAD (SPAD_A). For example, for the range of the luminance less than a specific illuminance (SL) that is arbitrarily determined (e.g., the specific illuminance determined to be an intermediate value) within the range of illuminance at which the first SPAD (SPAD_C) and the second SPAD (SPAD_A) can detect light, the intensity of incident light is relatively weak. Therefore, in order to increase a signal-to-noise ratio (SNR), the second SPAD (SPAD_A) with higher sensitivity may be more suitable than the first SPAD (SPAD_C).

Conversely, for the range of the luminance higher than the specific illuminance (SL), the intensity of incident light is relatively strong. Therefore, in order to reduce the number of erroneous (or false) detections of a signal (or pulse) due to ambient light, the first SPAD (SPAD_C) with lower sensitivity may be more suitable than the second SPAD (SPAD_A). The degree of erroneous signal detection due to the ambient light may be defined as a dark count rate (DCR).

In this way, since either the first SPAD (SPAD_C) or the second SPAD (SPAD_A) may be more suitable depending on illuminance conditions, the pixel array 110 includes both the first SPAD (SPAD_C) and the second SPAD (SPAD_A) and may selectively activate at least one of the first SPAD (SPAD_C) or the second SPAD (SPAD_A).

Figure 4A:
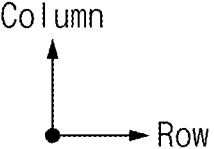
FIG. 4A is a diagram illustrating an example of an array structure of the pixel array shown in FIG. 1 based on some implementations of the disclosed technology.

FIG. 4A is a diagram illustrating an example of an array structure 400a of the pixel array 110 shown in FIG. 1 based on some implementations of the disclosed technology.

Referring to FIG. 4A, the array structure 400a of the pixel array 110 may represent a portion of the pixel array 110, and the array structure 400a of the pixel array 110 may have a structure in which the array structures 400a are repeatedly arranged in each of the row direction and the column direction. Each pixel shown in FIG. 4A may have either first SPAD (SPAD_C) or the second SPAD (SPAD_A) and thus pixels can be distinguished by a type of SPAD included therein. For convenience of explanation, the SPAD type indications (SPAD_C, SPAD_A) and the pixel type indications (SPAD_C, SPAD_A) may be used interchangeably. Referring to FIG. 4A, a region denoted by SPAD_C may refer to the first pixel (SPAD_C), which is a pixel including the first SPAD (SPAD_C), and a region denoted by SPAD_A may refer to the second pixel (SPAD_A), which is a pixel including the second SPAD (SPAD_A).

The array structure 400a includes first pixels (SPAD_C) arranged in a (4×2) matrix including four rows and two columns, and second pixels (SPAD_A) arranged in a (4×2) matrix including four rows and two columns. The first pixels (SPAD_C) arranged in a (4×2) matrix may form one block, and the second pixels (SPAD_A) arranged in a (4×2) matrix may form another block.

In the example, in the array structure 400a, a plurality of first pixels (SPAD_C) or a plurality of second pixels (SPAD_A) may be arranged in units of a block (on a block basis). Although FIG. 4A illustrates that pixels arranged in a (4×2) matrix structure are included in one block, other implementations are also possible. For example, pixels arranged in an (M×N) matrix structure (where at least one of M and N is a natural number of 2 or greater) without being limited to (4×2) matrix structure are included in one block.

According to the array structure 400a, the same type of pixels may be arranged adjacent to each other, while minimizing a size of a region in which different types of pixels are in contact with each other. By doing so, circuits for signal processing of the same type of pixels can be more easily arranged.

Figure 4B:
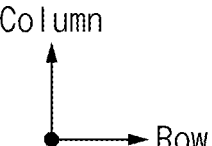
FIG. 4B is a diagram illustrating another example of the array structure of the pixel array shown in FIG. 1 based on some implementations of the disclosed technology.

FIG. 4B is a diagram illustrating another example of the array structure of the pixel array shown in FIG. 1 based on some implementations of the disclosed technology.

Referring to FIG. 4B, the array structure 400b of the pixel array 110 may represent a portion of the pixel array 110, and the array structure 400b of the pixel array 110 may have a structure in which the array structures 400b are arranged in row and column directions. Each pixel shown in FIG. 4B may have either first SPAD (SPAD_C) or the second SPAD (SPAD_A) and thus pixels can be distinguished by a type of SPAD included therein. For convenience of explanation, the SPAD type indications (SPAD_C, SPAD_A) and the pixel type indications (SPAD_C, SPAD_A) may be used interchangeably. Referring to FIG. 4B, a region denoted by SPAD_C may refer to the first pixel (SPAD_C), which is a pixel including the first SPAD (SPAD_C), and a region denoted by SPAD_A may refer to the second pixel (SPAD_A), which is a pixel including the second SPAD (SPAD_A).

The array structure 400b may include the first pixels (SPAD_C) and the second pixels (SPAD_A) which are arranged alternately in the row direction and the column direction. In the array structure 400b, the first pixels (SPAD_C) may be arranged adjacent to each other in a diagonal direction and spaced apart from each other by a distance of one pixel (hereinafter referred to as a pixel distance) in the row or column direction. Additionally, the second pixels (SPAD_A) may be arranged adjacent to each other in the diagonal direction and spaced apart from each other by a distance of one pixel (i.e., the pixel distance) in the row or column direction. Here, the pixel distance may refer to the width of the first pixels (SPAD_C) or the second pixels (SPAD_A).

According to the array structure 400b, different types of pixels can be evenly arranged per unit area (e.g., 2×2 matrix), so that image processing (e.g., interpolation, etc.) can be more easily performed and the defocusing phenomenon in which the lens module 20 is incorrectly focused on a specific block can be reduced.

Figure 5:
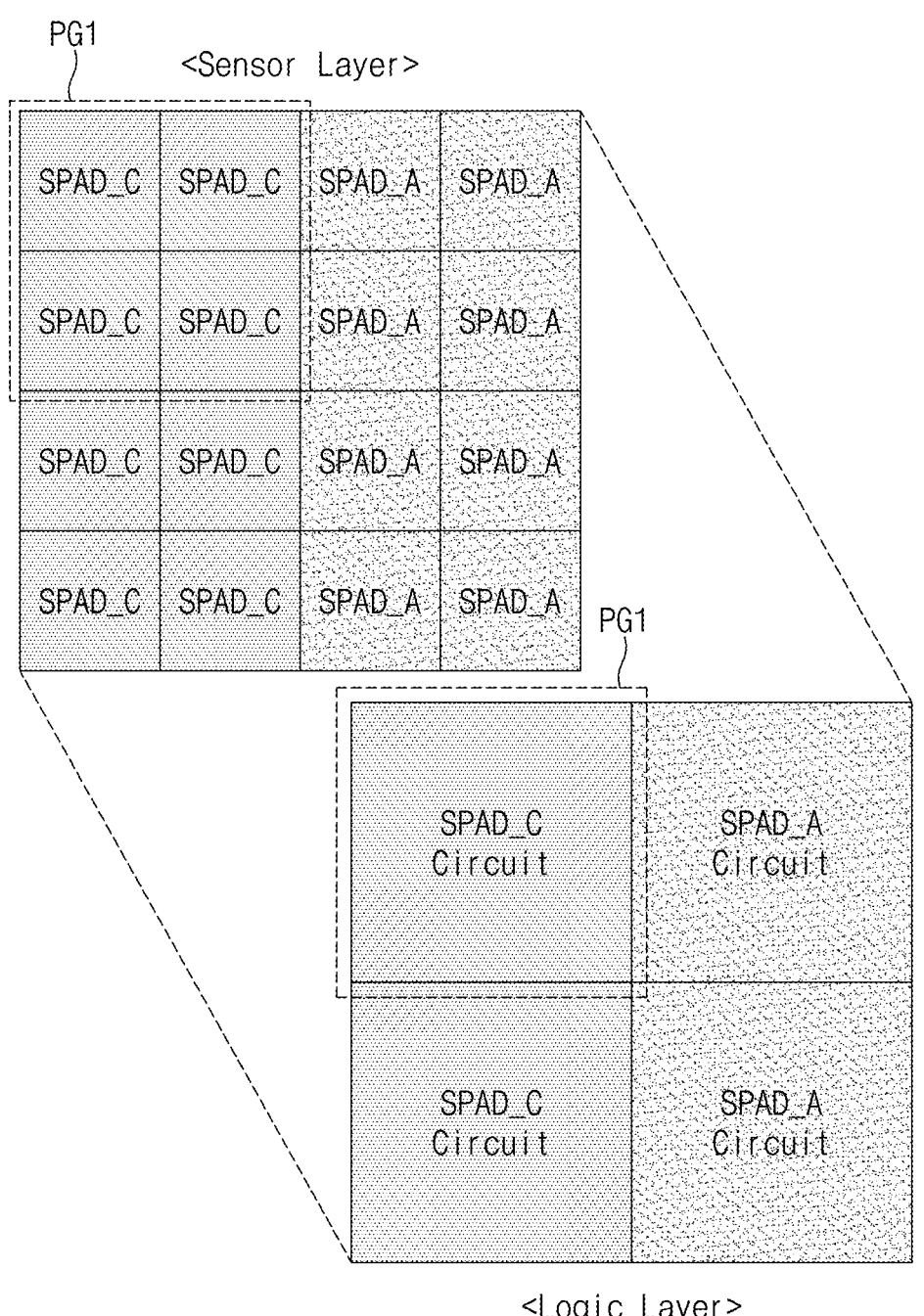
FIG. 5 is a diagram illustrating an example of a sensor layer and a logic layer for the array structure shown in FIG. 4A based on some implementations of the disclosed technology.

FIG. 5 is a diagram illustrating an example of a sensor layer and a logic layer for the array structure 400a shown in FIG. 4A based on some implementations of the disclosed technology.

Referring to FIGS. 4A and 5, the array structure 400a may have a stacked structure including a sensor layer and a logic layer. In the implementation, the sensor layer may be disposed closer to the lens module 20 at an upper portion of the logic layer, and the logic layer may be disposed farther away from the lens module 20 at a lower portion of the sensor layer. The sensor layer and the logic layer may correspond to different semiconductor substrates, and electrical connection between the sensor layer and the logic layer may be implemented using a through silicon via (TSV) method or a bonding method (e.g., hybrid bonding, thermo-compression (TC) bonding, etc.), or others.

The sensor layer may include the first SPADs (SPAD_C) and the second SPADS (SPAD_A) that are arranged in a format corresponding to the array structure 400a.

The logic layer may include one or more circuits (hereinafter collectively referred to as a "first SPAD circuit (SPAD_C circuit)") for driving the first SPADS (SPAD_C) or processing signals output from the first SPADS (SPAD_C), and one or more circuits (hereinafter collectively referred to as a "second SPAD circuit (SPAD_A circuit)) for driving the second SPADs (SPAD_A) or processing signals output from the second SPADs (SPAD_A).

The SPADs included in the sensor layer and the SPAD circuits included in the logic layer may correspond to each other according to predetermined rules.

In some implementations, the SPADs arranged in a (2×2) matrix of the sensor layer and the SPAD circuits of the logic layer may be disposed at the corresponding positions while having the substantially same area. For example, the SPADs included in the first pixel group (PG1) and arranged in the (2×2) matrix of the sensor layer are disposed at the top left portion of the sensor layer, and the SPAD_C circuit corresponding those SPADs in the first pixel group (PG1) is disposed at the top left portion of the logic layer.

In the example of FIG. 5, the first SPADs (SPAD_C) arranged in a (2×2) matrix included in the first pixel group (PG1) and the first SPAD circuits (SPAD_C circuits) for the first SPADs (SPAD_C) of the first pixel group (PG1) may be arranged to overlap each other while having substantially the same area. Although the first pixel group (PG1) has been described as an example for convenience of description, other pixels may also be disposed in substantially the same shape as the first pixel group (PG1) in units of a (2×2) matrix.

According to the arrangement structure as shown in FIG. 5, when the first SPADs (SPAD_C) of the first pixel group (PG1) share at least a portion of the first SPAD circuit (SPAD_C circuit), a design margin of the first SPAD circuits (SPAD_C circuits) can be further secured.

Figure 6:
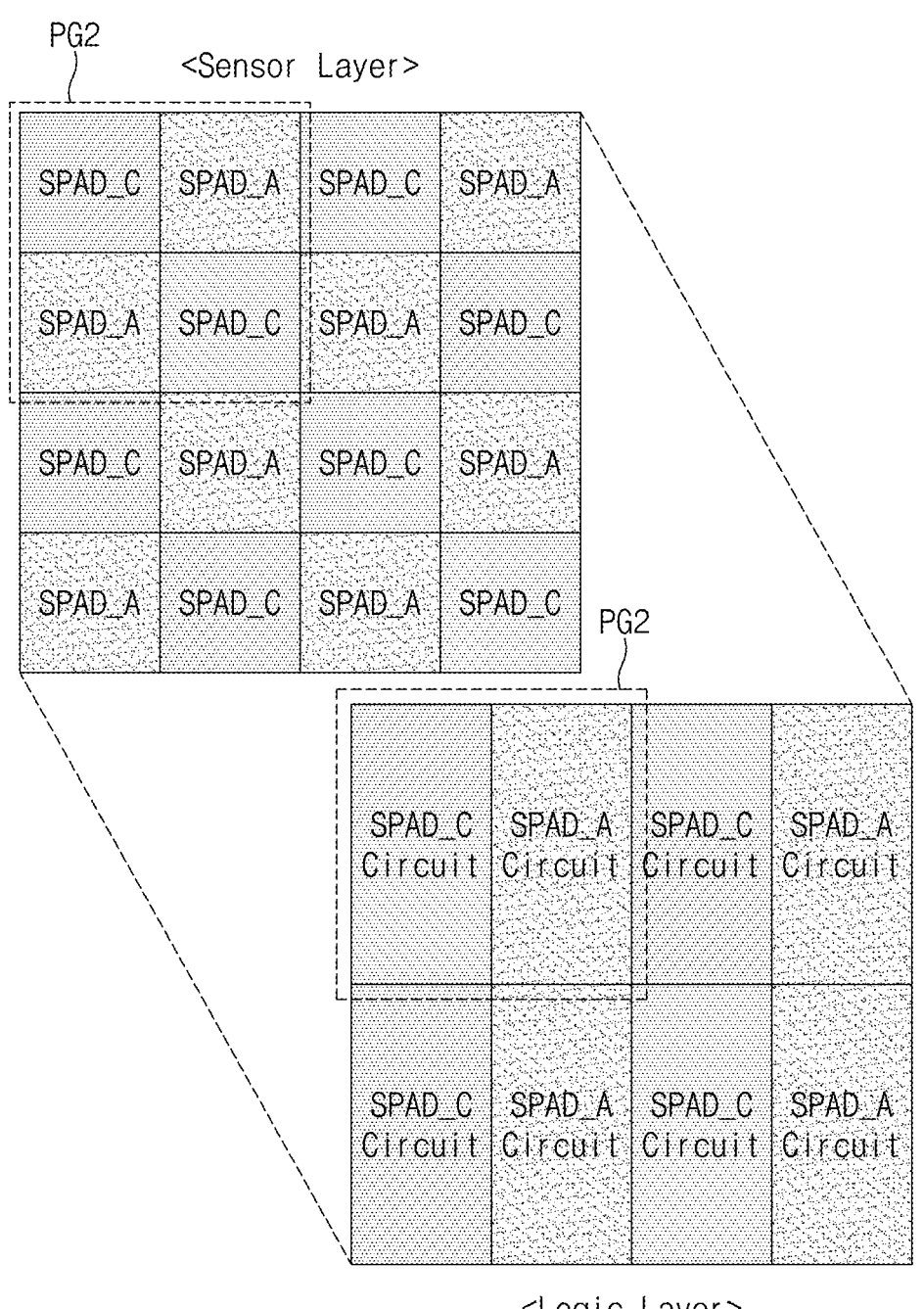
FIG. 6 is a diagram illustrating an example of a sensor layer and a logic layer for the array structure shown in FIG. 4B based on some implementations of the disclosed technology.

FIG. 6 is a diagram illustrating an example of a sensor layer and a logic layer for the array structure 400b shown in FIG. 4B based on some implementations of the disclosed technology.

Referring to FIGS. 4B and 6, the array structure 400b may have a stacked structure including a sensor layer and a logic layer. In the implementation, the sensor layer may be disposed closer to the lens module 20 at an upper portion of the logic layer, and the logic layer may be disposed farther away from the lens module 20 at a lower portion of the sensor layer. The sensor layer and the logic layer may correspond to different semiconductor substrates, and electrical connection between the sensor layer and the logic layer may be implemented using a through silicon via (TSV) method or a bonding method (e.g., hybrid bonding, thermo-compression (TC) bonding, etc.), or others.

The sensor layer may include the first SPADs (SPAD_C) and the second SPADs (SPAD_A) arranged in a format corresponding to the array structure 400b.

The logic layer may include one or more first SPAD circuits (SPAD_C circuits) for driving the first SPADs (SPAD_C) or processing signals output from the first SPADs (SPAD_C), and one or more second SPAD circuits (SPAD_A circuits) for driving the second SPADs (SPAD_A) or processing signals output from the second SPADs (SPAD_A).

The SPADs included in the sensor layer and the SPAD circuits included in the logic layer may correspond to each other according to predetermined rules.

In some implementations, the SPADs arranged in the diagonal direction of the sensor layer and the SPAD circuits of the logic layer may be arranged to partially overlap each other while having substantially the same area. For example, in the implementation as shown in FIG. 6, while the second pixel group (PG2) includes two first SPADs (SPAD_C) that are arranged in the diagonal direction, only one of the first SPADs (SPAD_C) of the second pixel group (PG2), which is at the left top corner of the sensor layer, overlaps the first SPAD circuit (SPAD_C circuit) of the logic layer. In the implementation as shown in FIG. 6, while the second pixel group (PG2) includes two second SPADS (SPAD_A) that are arranged in the diagonal direction, only one of the second SPADs (SPAD_A) of the second pixel group (PG2) overlaps the second SPAD circuit (SPAD_A circuit) of the logic layer.

In the example of FIG. 6, the first SPADS (SPAD_C) arranged diagonally included in the second pixel group (PG2) and the first SPAD circuits (SPAD_C circuits) for the first SPADS (SPAD_C) of the second pixel group (PG2) may be arranged to partially overlap each other while having substantially the same area. In addition, the second SPADs (SPAD_A) arranged diagonally included in the second pixel group (PG2) and the second SPAD circuits (SPAD_A circuits) for the second SPADS (SPAD_A) of the second pixel group (PG2) may be arranged to partially overlap each other while having substantially the same area. Although the second pixel group (PG2) has been described as an example for convenience of description, other pixels may also be disposed in substantially the same shape as the second pixel group (PG2) in units of a (2×2) matrix.

According to the arrangement structure as shown in FIG. 6, when the first SPADs (SPAD_C) of the second pixel group (PG2) share at least a portion of the first SPAD circuit (SPAD_C circuit), a design margin of the first SPAD circuits (SPAD_C circuits) can be further secured. Additionally, when the second SPADs (SPAD_A) of the second pixel group (PG2) share at least a portion of the second SPAD circuit (SPAD_A circuit), a design margin of the second SPAD circuits (SPAD_A circuits) can be further secured.

Figure 7A:
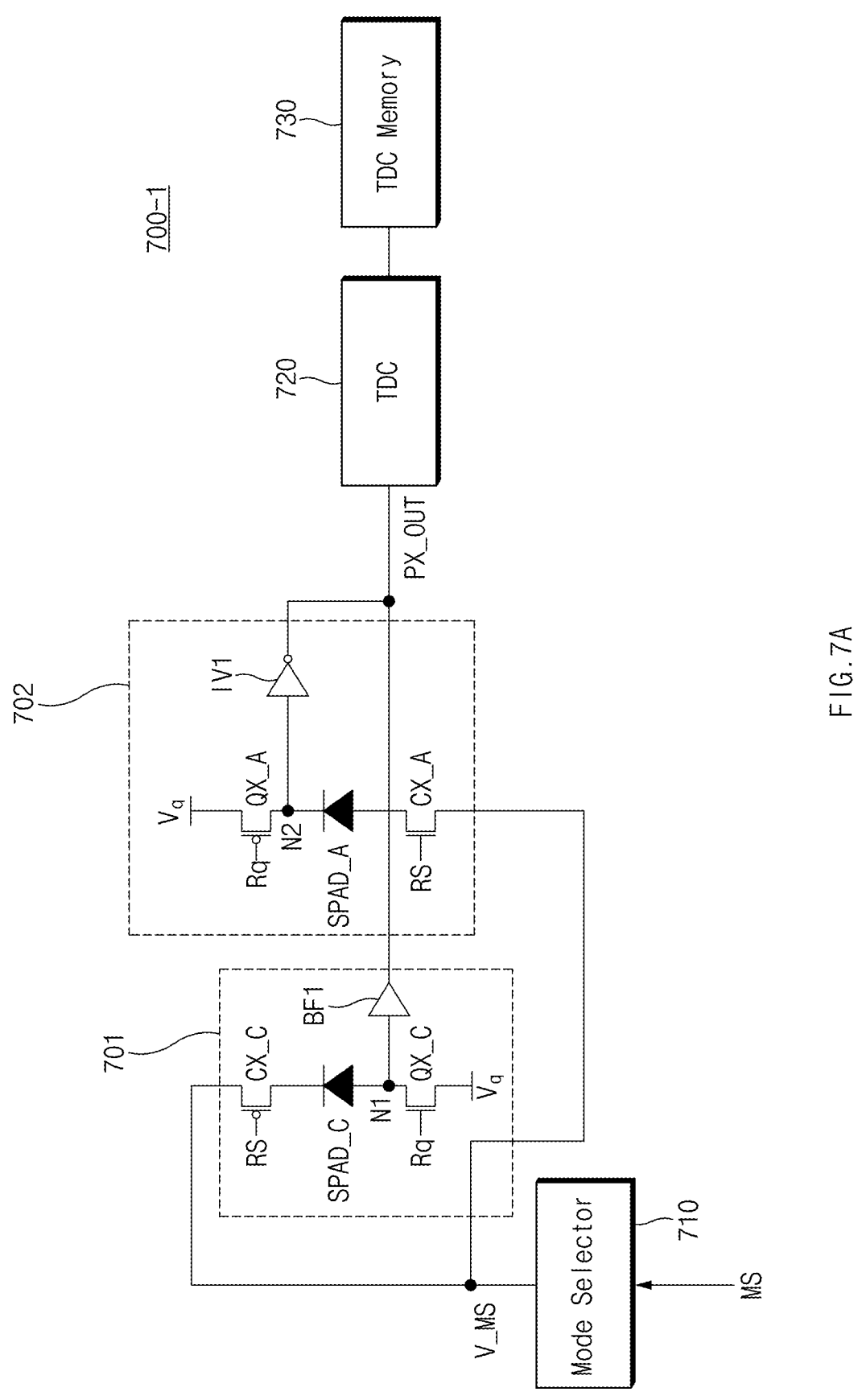
FIG. 7A is a circuit diagram illustrating example operations of pixels included in the pixel array shown in FIG. 1 based on some implementations of the disclosed technology.

FIG. 7A is a circuit diagram illustrating example operations of pixels included in the pixel array shown in FIG. 1 based on some implementations of the disclosed technology.

Referring to FIG. 7A, a first pixel signal processing path 700-1 for processing signals generated from the first SPAD (SPAD_C) and the second SPAD (SPAD_A) is shown. Although the first pixel signal processing path 700-1 is illustrated with one first SPAD (SPAD_C) and one second SPAD (SPAD_A), other implementations are also possible, For example, it should be noted that the first pixel signal processing path 700-1 may include a plurality of first SPADs (SPAD_C) and/or a plurality of second SPADs (SPAD_A) as necessary.

The first pixel signal processing path 700-1 may include a first SPAD (SPAD_C), a second SPAD (SPAD_A), a first quenching transistor (QX_C), a second quenching transistor (QX_A), a first control transistor (CX_C), a second control transistor (CX_A), a mode selector 710, a first buffer (BF1), a first inverter (IV1), a time-to-digital converter (TDC) 720, and a TDC memory 730. Here, the first SPAD (SPAD_C), the first quenching transistor (QX_C), the first control transistor (CX_C), and the first buffer (BF1) may be included in the first SPAD pixel 701. The second SPAD (SPAD_A), the second quenching transistor (QX_A), the second control transistor (CX_A), and the first inverter (IV1) may be included in the second SPAD pixel 702.

The first SPAD (SPAD_C) may correspond to the first SPAD (SPAD_C) shown in FIG. 2A, and the second SPAD (SPAD_A) may correspond to the second SPAD (SPAD_A) shown in FIG. 2B.

The first quenching transistor (QX_C) may be an N-channel MOSFET (NMOS) transistor that includes a gate terminal receiving the quenching control signal (Rq), a drain terminal connected to the first node (N1), and a source terminal receiving the quenching voltage (Vq). The quenching control signal (Rq) may have a first voltage that is higher than the quenching voltage (Vq) by a threshold voltage (or by a threshold voltage or greater) of the first quenching transistor (QX_C), a second voltage equal to the quenching voltage (Vq), or a third voltage that is lower than the quenching voltage (Vq) by a threshold voltage (or by a threshold voltage or less) of the second quenching transistor (QX_A).

When the quenching control signal (Rq) has a first voltage, the first quenching transistor (QX_C) is turned on and can supply the quenching voltage (Vq) to the first node (N1). Alternatively, when the quenching control signal (Rq) has a second or third voltage, the first quenching transistor (QX_C) may be turned off so as not to supply the quenching voltage (Vq) to the first node (N1).

The second quenching transistor (QX_A) may be a P-channel MOSFET (PMOS) transistor that includes a gate terminal receiving the quenching control signal (Rq), a drain terminal connected to the second node (N2), and a source terminal receiving the quenching voltage (Vq).

When the quenching control signal (Rq) has a third voltage, the second quenching transistor (QX_A) is turned on and can supply the quenching voltage (Vq) to the second node (N2). Alternatively, when the quenching control signal (Rq) has a first or second voltage, the second quenching transistor (QX_A) may be turned off so as not to supply the quenching voltage (Vq) to the second node (N2).

The first control transistor (CX_C) may be a PMOS transistor that includes a gate terminal receiving a selection signal (RS), a drain terminal connected to the cathode of the first SPAD (SPAD_C), and a source terminal receiving a mode selection voltage (V_MS). The mode selection voltage (V_MS) may have a first bias voltage (VB1) that is higher than the selection signal (RS) by a threshold voltage or greater of the first control transistor (CX_C), a deactivation voltage equal to the selection signal (RS), or a second bias voltage (VB2) that is lower than the selection signal (RS) by a threshold voltage or less of the second control transistor (CX_A).

When the mode selection voltage (V_MS) has the first bias voltage (VB1), the first control transistor (CX_C) is turned on to supply the first bias voltage (VB1) to the cathode of the first SPAD (SPAD_C). Alternatively, when the mode selection voltage (V_MS) has the second bias voltage (VB2) or the deactivation voltage, the first control transistor (CX_C) may be turned off so as not to supply the first bias voltage (VB1) to the cathode of the first SPAD (SPAD_C).

The second control transistor (CX_A) may be an NMOS transistor that includes a gate terminal receiving the selection signal (RS), a drain terminal connected to the anode of the second SPAD (SPAD_A), and a source terminal receiving the mode selection voltage (V_MS).

When the mode selection voltage (V_MS) has the second bias voltage (VB2), the second control transistor (CX_A) is turned on to supply the second bias voltage (VB2) to the anode of the second SPAD (SPAD_A). Alternatively, when the mode selection voltage (V_MS) has the first bias voltage (VB1) or the deactivation voltage, the second control transistor (CX_A) may be turned off so as not to supply the second bias voltage (VB2) to the anode of the second SPAD (SPAD_A).

In the present embodiment, it is assumed that each of the quenching voltage (Vq) and the selection signal (RS) has a ground voltage (e.g., OV) for convenience of description, but other implementations are also possible. For example, the quenching voltage (Vq) and the selection signal (RS) can be varied within operable ranges of the SPADs (SPAD_C, SPAD_A) and the transistors (CX_C, CX_A, QX_C, QX_A).

Additionally, the first control transistor (CX_C) and the second control transistor (CX_A) may be referred to as a control circuit for selectively activating the first SPAD (SPAD_C) and the second SPAD (SPAD_A), the first control transistor (CX_C) and the second control transistor (CX_A) are merely examples of such control circuit, and the scope of the configuration for selectively activating the first SPAD (SPAD_C) and the second SPAD (SPAD_A) is not limited thereto.

The mode selector 710 may be included as a part of the sensor driver 120 of FIG. 1, but other implementations are also possible. The quenching voltage (Vq), the quenching control signal (Rq), and the selection signal (RS) supplied to the first SPAD pixel 701 and the second SPAD pixel 702 may be supplied from the sensor driver 120.

The mode selector 710 may generate a mode selection voltage (V_MS) according to a mode selection signal (MS). The mode selection signal (MS) may be generated using illuminance information by the image sensing device 100, the image signal processor 150, or an external device (e.g., an application processor).

The illuminance information may include an illuminance value output by an illuminance sensor (not shown) included in the imaging device (ID) and/or an illuminance value estimated from a frequency of occurrence of image data (IDATA) per subframe. Here, the illuminance sensor (not shown) may detect light of a specific wavelength band (for example, light having the same wavelength band as light emitted by the light source 10) and may output an illuminance value in response to the detected light. To this end, the illuminance sensor (not shown) may include an optical filter for selectively receiving light of a specific wavelength band.

The illuminance information may be an example of information that serves as a basis of the mode selection signal (MS). In accordance with another embodiment, other information (e.g., power information indicating a power consumption state of the imaging device ID, user selection information indicating a mode selected by the user, and temperature information indicating a temperature state of the imaging device ID) may also be used as the basis of the mode selection signal (MS). In accordance with still another embodiment, the mode selection signal (MS) may be determined based on at least one of illuminance information, power information, user selection information, or temperature information.

When the illuminance value is greater than or equal to a predetermined threshold illuminance (or when a current illuminance is a first illuminance greater than or equal to the predetermined threshold illuminance), the mode selection signal (MS) may be at a logic high level. Here, the threshold value may be a value determined experimentally such that the suitability of the first SPAD (SPAD_C) for detecting the reached light (RL) is equal to the suitability of the second SPAD (SPAD_A) for detecting the reached light (RL). The mode selector 710 that receives the mode selection signal (MS) of a logic high level may output the first bias voltage (VB1).

When the first bias voltage (VB1) is applied to each of the first control transistor (CX_C) and the second control transistor (CX_A), the first control transistor (CX_C) may be turned on and the second control transistor (CX_A) may be turned off. Accordingly, the first SPAD (SPAD_C) may enter the Geiger mode, and the second SPAD (SPAD_A) may not enter the Geiger mode. When a photon is incident upon the first SPAD (SPAD_C), an avalanche process may occur so that the voltage of the first node (N1) may increase by the excess voltage ($V_{EX}$). The quenching control signal (Rq)

may transition from the second voltage to the first voltage at a predetermined time point (e.g., a time point at which the avalanche process is completed), thereby performing a quenching operation and a recharging operation for the first SPAD (SPAD_C). As a result, the voltage of the first node (N1) may return to the quenching voltage (Vq) and the first voltage pulse (PLS1) may be output from the first node (N1). Additionally, when the quenching and recharging operations for the first SPAD (SPAD_C) are completed, the quenching control signal (Rq) may transition from the first voltage to the second voltage.

When the illuminance value is less than a predetermined threshold illuminance (or when the current illuminance is a second illuminance less than the predetermined threshold illuminance), the mode selection signal (MS) may be at a logic low level. The mode selector 710 that receives the mode selection signal (MS) of a logic low level may output the second bias voltage (VB2).

When the second bias voltage (VB2) is applied to each of the first control transistor (CX_C) and the second control transistor (CX_A), the first control transistor (CX_C) may be turned off and the second control transistor (CX_A) may be turned on. Accordingly, the first SPAD (SPAD_C) may not enter the Geiger mode, and the second SPAD (SPAD_A) may enter the Geiger mode. When a photon is incident upon the second SPAD (SPAD_A), an avalanche process may occur so that the voltage of the second node (N2) may drop by the excess voltage ($V_{EX}$). The quenching control signal (Rq) may transition from the second voltage to the third voltage at a predetermined time point (e.g., a time point at which the avalanche process is completed), thereby performing a quenching operation and a recharging operation for the second SPAD (SPAD_A). As a result, the voltage of the second node (N2) may return to the quenching voltage (Vq) and the second voltage pulse (PLS2) may be output from the second node (N2). Additionally, when the quenching and recharging operations for the second SPAD (SPAD_A) are completed, the quenching control signal (Rq) may transition from the third voltage to the second voltage.

That is, the mode selector 710 may activate the first SPAD (SPAD_C) or the second SPAD (SPAD_A) by generating the mode selection voltage (V_MS) based on the mode selection signal (MS) that varies depending on the illuminance. Accordingly, the activated first SPAD (SPAD_C) may detect a photon incident thereupon and may output the first voltage pulse (PLS1), or the activated second SPAD (SPAD_A) may detect a photon incident thereupon and may output the second voltage pulse (PLS2).

The first buffer (BF1) may sample an analog first voltage pulse (PLS1) generated at the first node (N1), may convert the analog first voltage pulse (PLS1) into a digital pulse signal having an opposite waveform to the first voltage pulse (PLS1), and may invert and output the digital pulse signal having the opposite waveform to the first voltage pulse (PLS1). To this end, the first buffer BF1 may include two inverters connected in cascade. Here, the sampling method may be implemented as a method of converting the voltage pulse into a pulse signal with a logic level of 0 or 1 depending on whether the level of the voltage pulse is equal to or greater than a threshold level, but the scope of the disclosed technology is not limited thereto. The first voltage pulse (PLS1) generated at the first node (N1) may have a waveform in which the first voltage pulse (PLS1) instantaneously increases from the quenching voltage (Vq) by the avalanche process and then returns to the quenching voltage (Vq) by the quenching operation and the recharging operation. Accordingly, since the first inverter of the first buffer (BF1) converts a voltage pulse into a digital pulse signal having an opposite waveform to the first voltage pulse (PLS1), an output signal of the first inverter may have a waveform in which the output signal of the first inverter has a logic level of 1, then instantaneously transitions to a logic level of 0 in response to generation of the first voltage pulse (PLS1), and finally returns to a logic level of 1. The second inverter of the first buffer (BF1) may invert a digital pulse signal having an opposite waveform to the first voltage pulse (PLS1) received through the first inverter, and may output the inverted digital pulse signal. That is, an output signal of the second inverter may have a waveform in which the output signal of the second inverter has a logic level of 0, then instantaneously transitions to a logic level of 1 in response to generation of the first voltage pulse (PLS1), and then returns to the logic level of 0.

The output signal of the first buffer (BF1) may be referred to as a first SPAD pulse serving as a digitized pulse of the first voltage pulse (PLS1).

The first inverter (IV1) may sample an analog second voltage pulse (PLS2) generated at the second node (N2) and may convert the analog second voltage pulse (PLS2) into a digital pulse signal having an opposite waveform to the second voltage pulse (PLS2). The second voltage pulse (PLS2) generated at the second node (N2) may have a waveform in which the second voltage pulse (PLS2) momentarily drops from the quenching voltage (Vq) by the avalanche process and then returns to the quenching voltage (Vq) by the quenching operation and the recharging operation. Accordingly, since the first inverter (IV1) converts a voltage pulse into a digital pulse signal having an opposite waveform to the second voltage pulse (PLS2), an output signal of the first inverter (IV1) may have a waveform in which the output signal the first inverter (IV1) has a logic level of 0, then instantaneously transitions to a logic level of 1 when the second voltage pulse (PLS2) is generated, and finally returns to a logic level of 0.

The output signal of the first inverter (IV1) may be referred to as a second SPAD pulse serving as a digitized pulse of the second voltage pulse (PLS2).

The first SPAD pulse output from the first SPAD pixel 701 and the second SPAD pulse output from the second SPAD pixel 702 may be transmitted as a pixel signal (PX_OUT) to the TDC 720.

The TDC 720 may calculate a time delay between the pulse of the pixel signal (PX_OUT) and a reference pulse of the emitted light (EL), and may generate TDC data representing the time delay. The TDC 720 may obtain, from the timing controller 140 controlling the light source driver 30, a time point at which the reference pulse of the emitted light (EL) is generated, or may consider a predetermined time point (e.g., a time point located before a predetermined time from a start point of the subframe) to be a generation time point of the reference pulse. The TDC data output by the TDC 720 may represent the above-described candidate time-of-flight (ToF).

The TDC 720 may be activated or deactivated according to a TDC enable signal supplied from the timing controller 140. The TDC enable signal may have an activation level (e.g., a logic level of 1) when generation of the TDC data for the pixel 701 or 702 is required (e.g., during each subframe), and may have a deactivation level (e.g., a logic level of 0) when generation of TDC data for the pixel 701 or 702 is not required.

The TDC memory 730 may store the TDC data, and may output the stored TDC data to the image signal processor 150 as image data in a predetermined unit (e.g., in units of a subframe).

The TDC 720 and the TDC memory 730 may be included in the readout circuit 130 of FIG. 1 and may be provided to correspond to one column of the pixel array 110, but the scope of the disclosed technology is not limited thereto.

According to the present embodiment, the SPAD suitable for the current illuminance from among the first SPAD (SPAD_C) and the second SPAD (SPAD_A) having different sensitivities may be selectively activated, and the distance to the target object 1 may be detected using the activated SPAD, so that unnecessary power consumption can be reduced and the distance to the target object 1 can be more accurately measured.

Figure 7B:
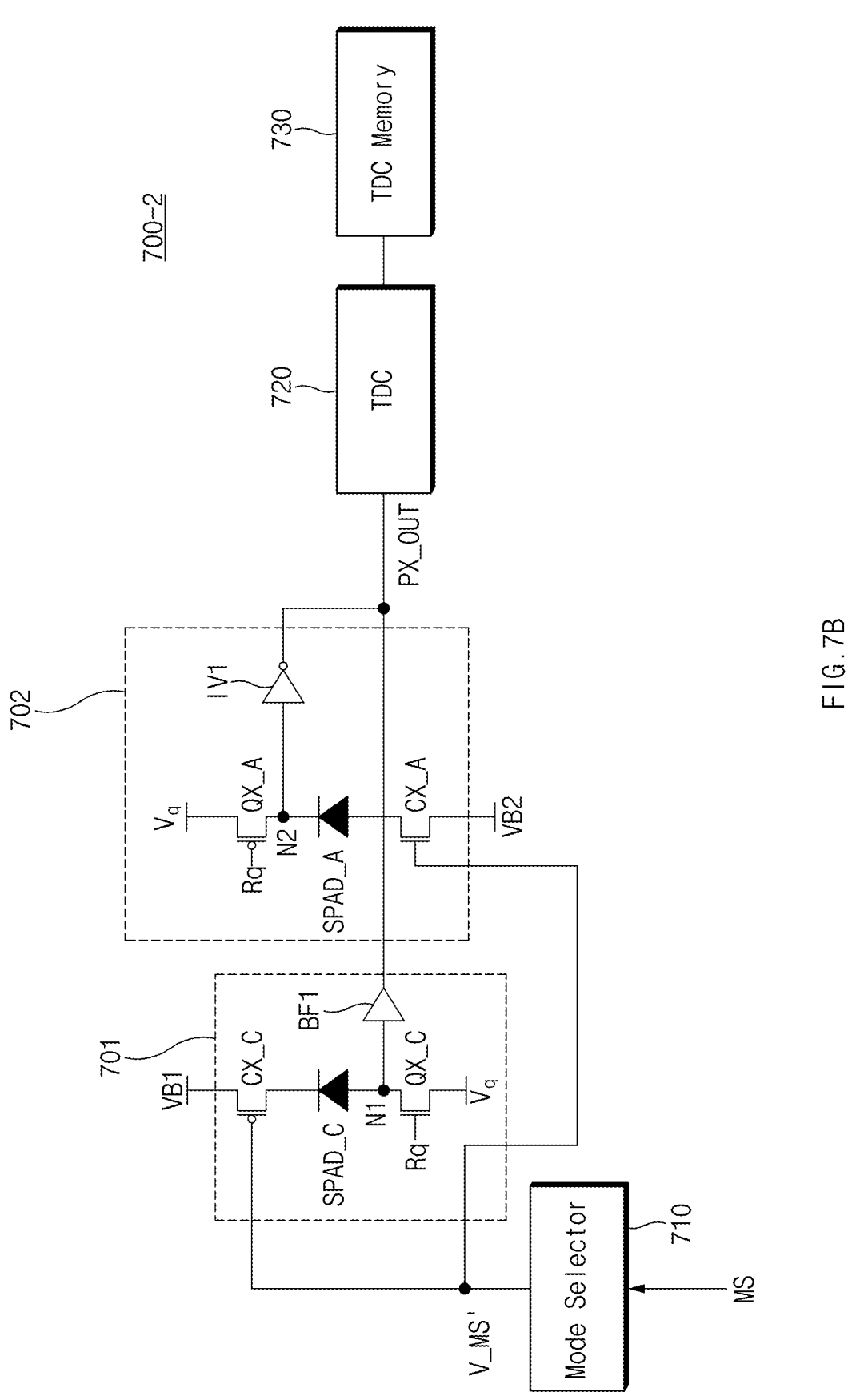
FIG. 7B is a circuit diagram illustrating example operations of pixels included in the pixel array shown in FIG. 1 based on some implementations of the disclosed technology.

FIG. 7B is a circuit diagram illustrating example operations of pixels included in the pixel array shown in FIG. 1 based on some implementations of the disclosed technology.

Referring to FIG. 7B, a second pixel signal processing path 700-2 for processing signals generated from the first SPAD (SPAD_C) and the second SPAD (SPAD_A) is shown. Although the second pixel signal processing path 700-2 is illustrated as including one first SPAD (SPAD_C) and one second SPAD (SPAD_A), other implementations are also possible, and it should be noted that the second pixel signal processing path 700-2 may include a plurality of first SPADs (SPAD_C) and/or a plurality of second SPADs (SPAD_A) as necessary.

The second pixel signal processing path 700-2 is substantially the same as the first pixel signal processing path 700-1 of FIG. 7A except for some differences, and the redundant description thereof will herein be omitted for brevity. In the below, the second pixel signal processing path 700-2 of FIG. 7B will hereinafter be described centering upon characteristics different from those of FIG. 7A.

The first control transistor (CX_C) may be a PMOS transistor that includes a gate terminal receiving a mode selection voltage (V_MS'), a drain terminal connected to the cathode of the first SPAD (SPAD_C), and a source terminal receiving a first bias voltage (VB1). The mode selection voltage (V_MS') may have a first activation voltage that is lower than the first bias voltage (VB1) by a threshold voltage or less of the first control transistor (CX_C), or a second activation voltage that is higher than the second bias voltage (VB2) by a threshold voltage or greater of the second control transistor (CX_A).

When the mode selection voltage (V_MS') has the first activation voltage, the first control transistor (CX_C) is turned on to supply the first bias voltage (VB1) to the cathode of the first SPAD (SPAD_C). Alternatively, when the mode selection voltage (V_MS') has the second activation voltage, the first control transistor (CX_C) may be turned off so as not to supply the first bias voltage (VB1) to the cathode of the first SPAD (SPAD_C).

The second control transistor (CX_A) may be an NMOS transistor that includes a gate terminal receiving the mode selection voltage (V_MS'), a drain terminal connected to the anode of the second SPAD (SPAD_A), and a source terminal receiving the second bias voltage (VB2).

When the mode selection voltage (V_MS') has the second activation voltage, the second control transistor (CX_A) is turned on to supply the second bias voltage (VB2) to the anode of the second SPAD (SPAD_A). Alternatively, when the mode selection voltage (V_MS') has the first activation voltage, the second control transistor (CX_A) may be turned off so as not to supply the second bias voltage (VB2) to the anode of the second SPAD (SPAD_A).

The first control transistor (CX_C) and the second control transistor (CX_A) may be referred to as a control circuit for selectively activating the first SPAD (SPAD_C) and the second SPAD (SPAD_A), the first control transistor (CX_C) and the second control transistor (CX_A) are merely examples of such control circuit, and the scope of the configuration for selectively activating the first SPAD (SPAD_C) and the second SPAD (SPAD_A) is not limited thereto.

The mode selector 710 may generate a mode selection voltage (V_MS') according to a mode selection signal (MS).

When the illuminance value is greater than or equal to a predetermined threshold illuminance (or when a current illuminance is a first illuminance greater than or equal to the predetermined threshold illuminance), the mode selection signal (MS) may be at a logic high level. The mode selector 710 that receives the mode selection signal (MS) of a logic high level may output the first activation voltage.

When the first activation voltage is applied to each of the first control transistor (CX_C) and the second control transistor (CX_A), the first control transistor (CX_C) may be turned on and the second control transistor (CX_A) may be turned off. Accordingly, the first SPAD (SPAD_C) may enter the Geiger mode, and the second SPAD (SPAD_A) may not enter the Geiger mode. When a photon is incident upon the first SPAD (SPAD_C), an avalanche process may occur so that the voltage of the first node (N1) may increase by the excess voltage ($V_{EX}$). The quenching control signal (Rq) may transition from the second voltage to the first voltage at a predetermined time point (e.g., a time point at which the avalanche process is completed), thereby performing a quenching operation and a recharging operation for the first SPAD (SPAD_C). As a result, the voltage of the first node (N1) may return to the quenching voltage (Vq) and the first voltage pulse (PLS1) may be output from the first node (N1). Additionally, when the quenching and recharging operations for the first SPAD (SPAD_C) are completed, the quenching control signal (Rq) may transition from the first voltage to the second voltage.

When the illuminance value is less than a predetermined threshold illuminance (or when the current illuminance is a second illuminance less than the predetermined threshold illuminance), the mode selection signal (MS) may be at a logic low level. The mode selector 710 that receives the mode selection signal (MS) of a logic low level may output the second activation voltage.

When the second activation voltage is applied to each of the first control transistor (CX_C) and the second control transistor (CX_A), the first control transistor (CX_C) may be turned off and the second control transistor (CX_A) may be turned on. Accordingly, the first SPAD (SPAD_C) may not enter the Geiger mode, and the second SPAD (SPAD_A) may enter the Geiger mode. When a photon is incident upon the second SPAD (SPAD_A), an avalanche process may occur so that the voltage of the second node (N2) may drop by the excess voltage ($V_{EX}$). The quenching control signal (Rq) may transition from the second voltage to the third voltage at a predetermined time point (e.g., a time point at which the avalanche process is completed), thereby performing a quenching operation and a recharging operation for the second SPAD (SPAD_A). As a result, the voltage of the second node (N2) may return to the quenching voltage (Vq) and the second voltage pulse (PLS2) may be output from the second node (N2). Additionally, when the quenching and recharging operations for the second SPAD (SPAD_A) are completed, the quenching control signal (Rq) may transition from the third voltage to the second voltage.

That is, the mode selector 710 may activate the first SPAD (SPAD_C) or the second SPAD (SPAD_A) by generating the mode selection voltage (V_MS') based on the mode selection signal (MS) that varies depending on the illuminance. Accordingly, the activated first SPAD (SPAD_C) may detect a photon incident thereupon and may output the first voltage pulse (PLS1), or the activated second SPAD (SPAD_A) may detect a photon incident thereupon and may output the second voltage pulse (PLS2).

Figure 7C:
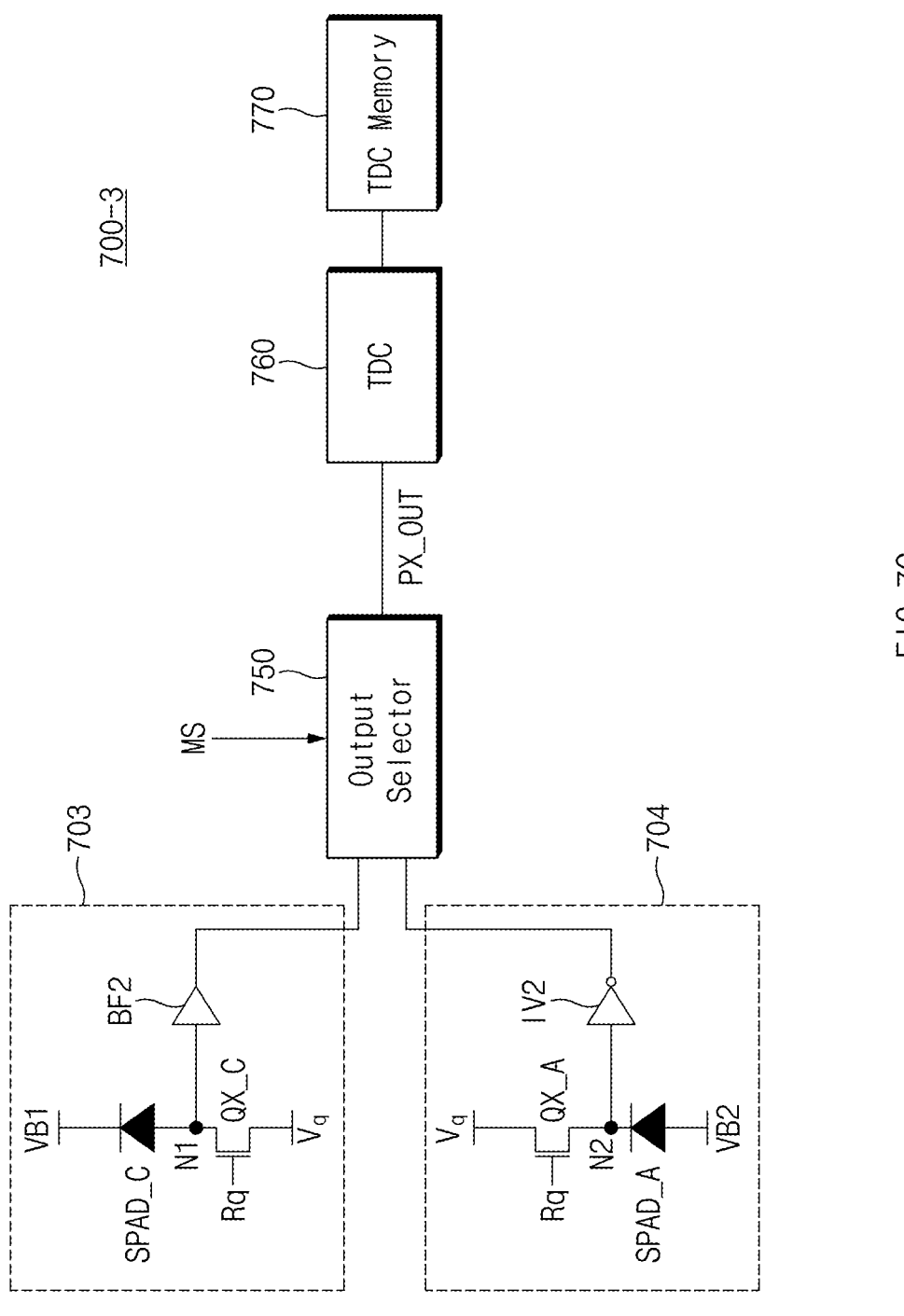
FIG. 7C is a circuit diagram illustrating example operations of pixels included in the pixel array shown in FIG. 1 based on some implementations of the disclosed technology.

FIG. 7C is a circuit diagram illustrating example operations of pixels included in the pixel array shown in FIG. 1 based on some implementations of the disclosed technology.

Referring to FIG. 7C, a third pixel signal processing path 700-3 for processing signals generated from the first SPAD (SPAD_C) and the second SPAD (SPAD_A) is shown. Although the third pixel signal processing path 700-3 is illustrated with one first SPAD (SPAD_C) and one second SPAD (SPAD_A), other implementations are also possible, and it should be noted that the third pixel signal processing path 700-3 may include a plurality of first SPADs (SPAD_C) and/or a plurality of second SPADs (SPAD_A) as necessary.

The third pixel signal processing path 700-3 may include a first SPAD (SPAD_C), a second SPAD (SPAD_A), a first quenching transistor (QX_C), a second quenching transistor (QX_A), a second buffer (BF2), a second inverter (IV2), an output selector 750, a TDC 760, and a TDC memory 770. Here, the first SPAD (SPAD_C), the first quenching transistor (QX_C), and the second buffer (BF2) may be included in the first SPAD pixel 703. The second SPAD (SPAD_A), the second quenching transistor (QX_A), and the second inverter (IV2) may be included in the second SPAD pixel 704.

The third pixel signal processing path 700-3 of FIG. 7C is similar to the first pixel signal processing path 700-1 of FIG. 7A except for some differences, and as such redundant description thereof will herein be omitted for brevity. In the description below, the third pixel signal processing path 700-3 of FIG. 7C will hereinafter be described centering upon characteristics different from those of FIG. 7A.

The third pixel signal processing path 700-3 may not include the mode selector 710 and the control transistors (CX_C, CX_A). That is, the first SPAD (SPAD_C) and the second SPAD (SPAD_A) may receive the first bias voltage (VB1) and the second bias voltage (VB2), respectively. Accordingly, the first SPAD (SPAD_C) and the second SPAD (SPAD_A) may enter the Geiger mode regardless of the mode, so that the first SPAD pixel 703 may independently generate the first SPAD pulse according to photon detection and the second SPAD pixel 704 may independently generate the second SPAD pulse according to photon detection.

Operations of the second buffer (BF2) and the second inverter (IV2) may be substantially the same as those of the first buffer (BF1) and the first inverter (IV1), respectively.

The output selector 750 may select least one of the first SPAD pulse and the second SPAD pulse as a pixel signal (PX_OUT) according to a mode selection signal (MS), and may output the selected SPAD pulse.

When the illuminance value is greater than or equal to a predetermined threshold illuminance, the mode selection signal (MS) may be at a logic high level. The output selector 750 that receives the mode selection signal (MS) of a logic high level may output the first SPAD pulse as the pixel signal (PX_OUT).

When the illuminance value is less than a predetermined threshold illuminance, the mode selection signal (MS) may be at a logic low level. The output selector 750 that receives the mode selection signal (MS) of a logic low level may output the second SPAD pulse as the pixel signal (PX_OUT).

According to another embodiment, when the illuminance value is within a predetermined range from a predetermined threshold illuminance or when there is a request from an external device, the mode selection signal (MS) may be at a third logic level. The output selector 750 receiving the mode selection signal (MS) of the third logic level may output each of the first SPAD pulse and the second SPAD pulse as the pixel signal (PX_OUT). At this time, each of the first SPAD pulse and the second SPAD pulse may be output through an independent signal line or may be sequentially output through one signal line.

Operations of the TDC 760 and the TDC memory 770 of FIG. 7C may be substantially the same as those of the TDC 720 and the TDC memory 730 of FIG. 7A, respectively.

The image sensing device according to the present embodiment may detect the distance to the target object 1 using a SPAD more suitable for the current illuminance from among the first SPAD (SPAD_C) and the second SPAD (SPAD_A) having different sensitivities. If necessary, the image sensing device may detect the distance to the target object 1 using both the first SPAD (SPAD_C) and the second SPAD (SPAD_A), thereby obtaining a more accurate distance.

In the present embodiment, the image sensing device selects any one of the first SPAD pixel including the first SPAD (SPAD_C) and the second SPAD pixel including the second SPAD (SPAD_A) according to illuminance information. FIGS. 7A and 7B show the embodiments of selecting either the first SPAD pixel 701 or the second SPAD pixel 702 by activating either the first SPAD pixel 701 or the second SPAD pixel 702. FIG. 7C shows the embodiment of selecting an output signal of at least one of the first SPAD pixel 703 or the second SPAD pixel 704.

Each of the output selector 750 of FIG. 7C and the mode selector 710 of FIG. 7A or FIG. 7B may be collectively referred to as a selection circuit or included in a selection circuit because each of the output selector 750 or the mode selector 710 can select the first SPAD pixel or the second SPAD pixel.

Figure 8A:
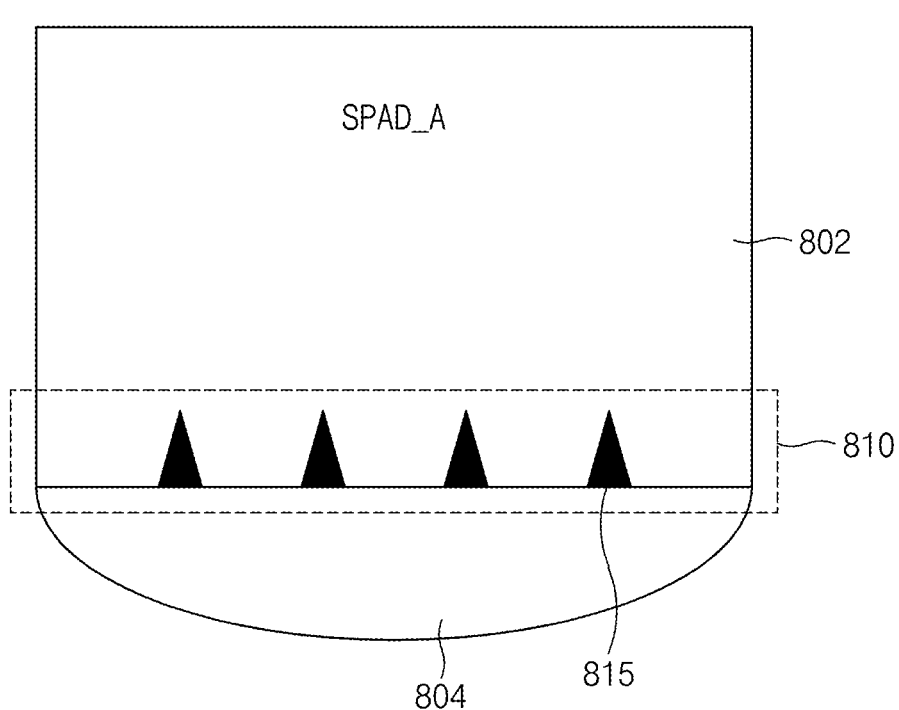
FIG. 8A is a schematic diagram illustrating an example of a sensor layer based on some implementations of the disclosed technology.

FIG. 8A is a schematic diagram illustrating an example of the sensor layer based on some implementations of the disclosed technology.

FIG. 8A illustrates a cross-sectional structure 800-1 schematically showing a region corresponding to the second SPAD (SPAD_A) from among the sensor layer.

The cross-sectional structure 800-1 may include a semiconductor substrate 802, a microlens 804, and a first optical structure 810.

The semiconductor substrate 802 may include a top surface and a bottom surface facing away from each other. For example, the semiconductor substrate 802 may be or include a P-type or N-type bulk substrate, may be or include a substrate formed by growing a P-type or N-type epitaxial layer on the P-type bulk substrate, or may be or include a substrate formed by growing a P-type or N-type epitaxial layer on the N-type bulk substrate. The second SPAD (SPAD_A) may be formed inside the semiconductor substrate 802, and a specific structure of the second SPAD (SPAD_A) will be described later with reference to the drawings below FIG. 9A. The semiconductor substrate 802 may include at least one of silicon (Si), silicon carbide (SiC), or gallium nitride (GaN).

The microlens 804 may be formed below the semiconductor substrate 802, and may be formed in a convex hemispherical shape, so that the microlenses 804 can increase light reception (Rx) efficiency by increasing light gathering power of incident light. An over-coating layer (not shown) may be additionally formed above or below the microlens 804, so that the over-coating layer can suppress flare characteristics by preventing irregular or diffuse reflection of incident light received from the lens module 20.

The first optical structure 810 may be disposed on the bottom surface of the semiconductor substrate 802 upon which light is incident, and may improve light reception (Rx) efficiency of the second SPAD (SPAD_A) by scattering the incident light. The first optical structure 810 may include concavo-convex structures (hereinafter referred to as uneven structures) 815 that are periodically disposed on the bottom surface of the semiconductor substrate 802. In some implementations, each of the uneven structures 815 may be formed in a quadrangular pyramid shape or a cylindrical shape. The width and depth of each uneven structure 815, the spacing between the uneven structures 815, and the number of uneven structures 815 may be experimentally determined depending on a size and internal structure of the second SPAD pixel and a thickness of the semiconductor substrate 802.

For example, the uneven structures 815 may be formed by various techniques, e.g., selectively wet-etching the bottom surface of the semiconductor substrate 802 and gap-filling the semiconductor substrate 802 with a material having a refractive index different from that of the semiconductor substrate 802.

As the first optical structure 810 is disposed in the region corresponding to the second SPAD (SPAD_A), the sensitivity of the second SPAD (SPAD_A), which has a higher sensitivity than the first SPAD (SPAD_C), may be further increased. According to another embodiment, for ease of fabrication processing, the uneven structures 815 may be included not only in the region corresponding to the second SPAD (SPAD_A) but also in the region corresponding to the first SPAD (SPAD_C).

Figure 8B:
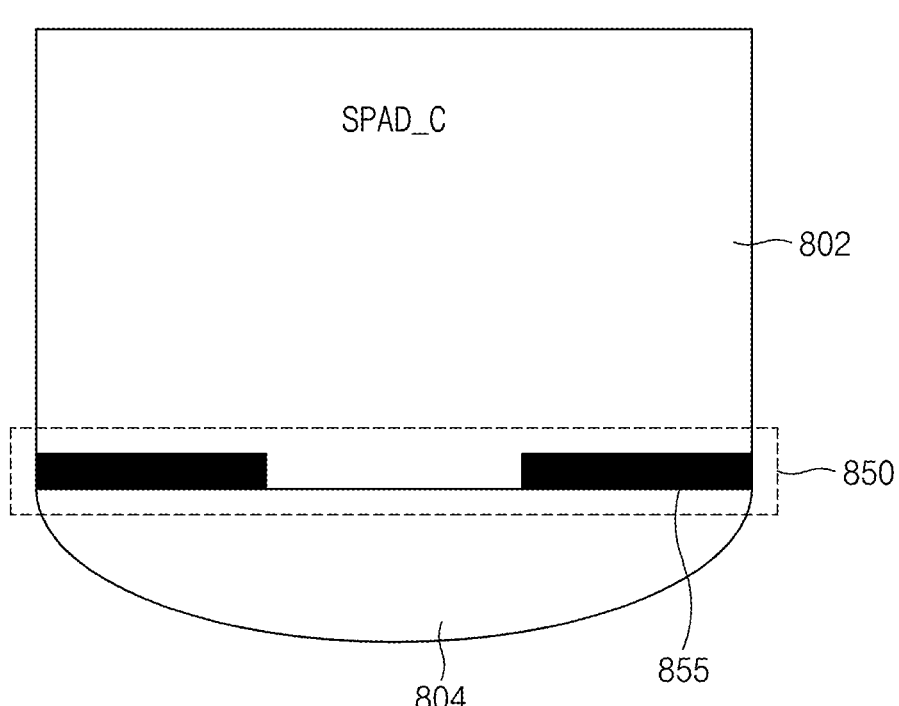
FIG. 8B is a schematic diagram illustrating another example of a sensor layer based on some implementations of the disclosed technology.

FIG. 8B is a schematic diagram illustrating another example of the sensor layer based on some implementations of the disclosed technology.

FIG. 8B illustrates a cross-sectional structure 800-2 schematically showing a region corresponding to the first SPAD (SPAD_C) from among the sensor layer.

The cross-sectional structure 800-2 may include a semiconductor substrate 802, a microlens 804, and a second optical structure 850. As the cross-sectional structure 800-2 is substantially the same as the cross-sectional structure 800-1 except for some differences, redundant description thereof will herein be omitted for brevity, and the cross-sectional structure 800-2 of FIG. 8B will hereinafter be described centering upon characteristics different from those of FIG. 8A.

The first SPAD (SPAD_C) may be formed inside the semiconductor substrate 802, and a specific structure of the first SPAD (SPAD_C) will be described later with reference to FIG. 9A and below.

The second optical structure 850 may be disposed on the bottom surface of the semiconductor substrate 802 upon which light is incident, and may reduce light reception (Rx) efficiency of the first SPAD (SPAD_C) by blocking (reflecting or absorbing) a portion of the incident light. The second optical structure 850 may include light blocking structures 855 that are disposed in at least a partial region of the microlens 804 (or a pixel including the microlens 804) on the bottom surface of the semiconductor substrate 802. In some implementations, the light blocking structures 855 may be disposed at the edge of the microlens 804 to form an opening through which incident light can pass near the center of the microlens 804. The light blocking structures 855 may be disposed at the edge of the microlens 804 to prevent crosstalk with peripheral pixels. The width, position, and number of light blocking structures 855 may be experimentally determined depending on the size and internal structure of the first SPAD pixel and the thickness of the semiconductor substrate 802.

For example, the light blocking structures 855 may be formed by selectively wet-etching the bottom surface of the semiconductor substrate 802 and gap-filling the semiconductor substrate 802 with a material (e.g., tungsten (W), aluminum (Al), copper (Cu), or an alloy thereof) having high light reflectivity or high light absorption rate.

As the second optical structure 850 is disposed in the region corresponding to the first SPAD (SPAD_C), the sensitivity of the first SPAD (SPAD_C), which has a lower sensitivity than the second SPAD (SPAD_A), may be further reduced. According to another embodiment, for ease of fabrication processing, the light blocking structures 855 may be included not only in the region corresponding to the first SPAD (SPAD_C) but also in the region corresponding to the second SPAD (SPAD_A).

Figure 8C:
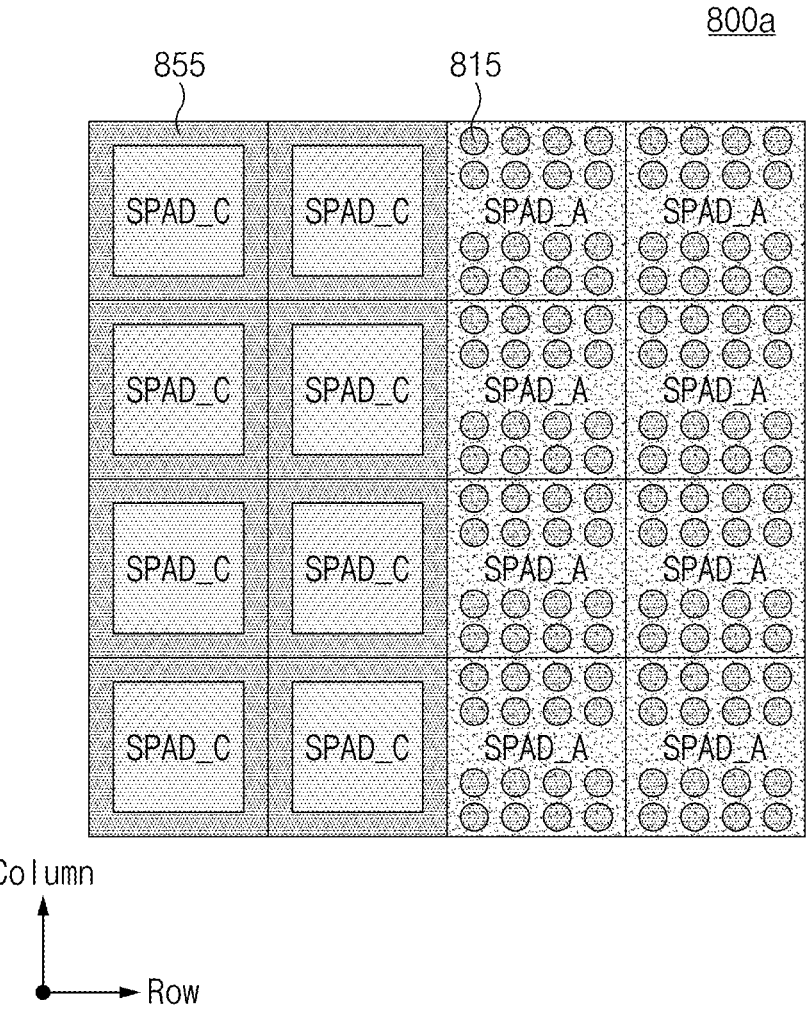
FIG. 8C is a schematic diagram illustrating an example of the arrangement structure in which the optical structures shown in FIGS. 8A and 8B are disposed based on some implementations of the disclosed technology.

FIG. 8C is a schematic diagram illustrating an example of the array structure in which the optical structures shown in FIGS. 8A and 8B are disposed based on some implementations of the disclosed technology.

FIG. 8C shows one example 800a in which the first optical structure 810 and the second optical structure 850 are arranged in the array structure 400a of the pixel array 110 shown in FIG. 4A.

A light blocking structure 855 may be disposed in each pixel including the first SPAD (SPAD_C) to block (reflect or absorb) some of the incident light, and may thus reduce light reception (Rx) efficiency of the first SPAD (SPAD_C).

The uneven (or concave-convex) structures 815 may be disposed in each pixel including the second SPAD (SPAD_A) to scatter incident light, thereby increasing light reception (Rx) efficiency of the second SPAD (SPAD_A).

In the example shown in FIG. 8C, the light blocking structure 855 may be disposed on all pixels each including the first SPAD (SPAD_C), and the uneven structures 815 may be disposed on all pixels each including the second SPAD (SPAD_A), but the scope of the disclosed technology is not limited thereto. For example, the light blocking structure 855 may be placed only on some of the pixels each including the first SPAD (SPAD_C), or the uneven structures 815 may be placed on only some of the pixels each including the second SPAD (SPAD_A).

In some implementations, pixels including the first SPAD (SPAD_C) may have the light blocking structures 855 different from each other. For example, at least one of a width, depth, period (or spacing), or number of the light blocking structures 855 disposed in each pixel including the first SPAD (SPAD_C) may be different for each pixel. In some implementations, pixels including the second SPAD (SPAD_A) may have the uneven structures 815 different from each other. For example, at least one of the width, depth, period (or spacing), or number of the uneven structures 815 disposed in each pixel including the second SPAD (SPAD_A) may be different for each pixel.

Since the second optical structure 850 is selectively disposed in a pixel including the first SPAD (SPAD_C) and the first optical structure 810 is selectively disposed in a pixel including the second SPAD (SPAD_A), a difference in sensitivity between the first SPAD (SPAD_C) and the second SPAD (SPAD_A) can be further increased, so that the suitability of the first SPAD (SPAD_C) for high illuminance and the suitability of the second SPAD (SPAD_A) for low illuminance can be further increased.

In some implementations, the structures for increasing or reducing the sensitivity of the first SPAD (SPAD_C) or the second SPAD (SPAD_A), which are to be described later with reference to the drawings including FIG. 9A and the following features may be combined with each other to adjust the sensitivity of the first SPAD (SPAD_C) or the second SPAD (SPAD_A), or may be combined with the first optical structure 810 and the second optical structure 850.

In some implementations, for ease of fabrication processing, the structure for improving or reducing the sensitivity of the first SPAD (SPAD_C) or the second SPAD (SPAD_A) may be disposed, in the substantially same manner, not only in the region corresponding to the first SPAD (SPAD_C) but also in the region corresponding to the second SPAD (SPAD_A).

Figure 9A:
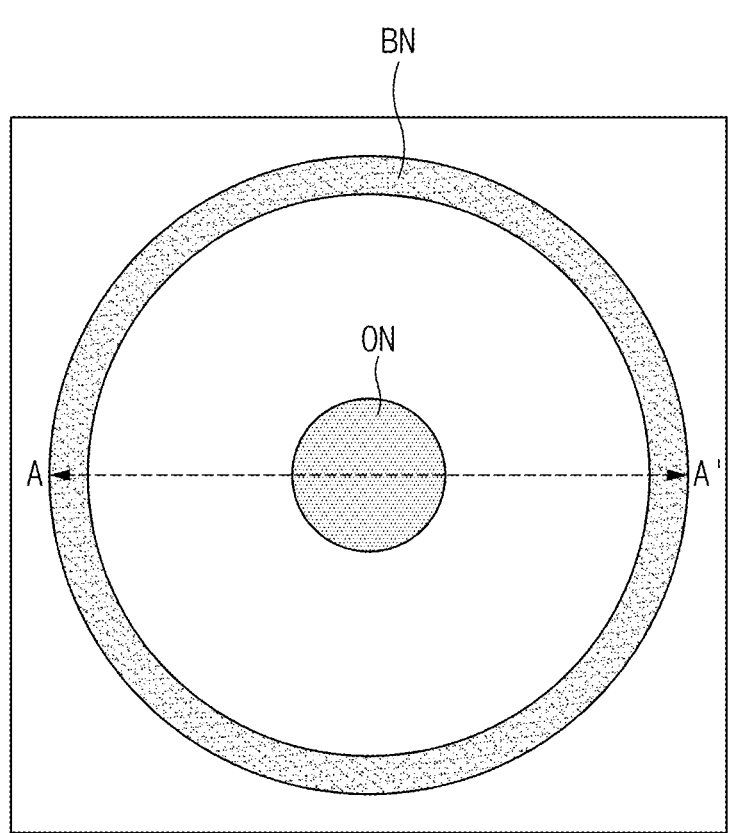
FIG. 9A is a diagram illustrating an example of a planar structure of a first SPAD or a second SPAD based on some implementations of the disclosed technology.

FIG. 9A is a diagram illustrating an example of a planar structure of the first SPAD or the second SPAD based on some implementations of the disclosed technology.

Referring to FIG. 9A, the planar structure 900-1 of the first SPAD (SPAD_C) or the second SPAD (SPAD_A) is schematically shown.

The first SPAD (SPAD_C) may include a cathode through which the first bias voltage (VB1) is received and an anode through which the first voltage pulse (PLS1) is output. Additionally, the second SPAD (SPAD_A) may include an anode through which the second bias voltage (VB2) is received and a cathode through which the second voltage pulse (PLS2) is output.

Each of the cathode of the first SPAD (SPAD_C) and the anode of the second SPAD (SPAD_A) may be defined as a biasing node (BN) through which a bias voltage is received. In addition, each of the anode of the first SPAD (SPAD_C) and the cathode of the second SPAD (SPAD_A) may be defined as an output node (ON) through which a voltage pulse is output.

The planar structure 900-1 may include an output node (ON) and a biasing node (BN), and may correspond to the first SPAD (SPAD_C) or the second SPAD (SPAD_A).

That is, when the planar structure 900-1 corresponds to the first SPAD (SPAD_C), the output node (ON) may correspond to the anode of the first SPAD (SPAD_C), and the biasing node (BN) may correspond to the cathode of the first SPAD (SPAD_C). Conversely, when the planar structure 900-1 corresponds to the second SPAD (SPAD_A), the output node (ON) may correspond to the cathode of the second SPAD (SPAD_A), and the biasing node (BN) may correspond to the anode of the second SPAD (SPAD_A).

The output node (ON) may have a circular shape disposed at the center of the SPAD.

The biasing node (BN) may have a circular ring (or donut) shape that surrounds the output node (ON) while being spaced apart from the output node (ON) by a predetermined distance.

When the distance between the biasing node (BN) and the output node (ON) becomes shorter than necessary, there may occur the edge breakdown (or tunneling) phenomenon in which charges directly flow from the biasing node (BN) to the output node (ON) without flowing into the output node (ON) due to the avalanche process. As a result, the distance between the biasing node (BN) and the output node (ON) may be determined experimentally to prevent the edge breakdown phenomenon. In addition, the distance between the biasing node (BN) and the output node (ON) may be arranged to remain substantially constant.

Figure 9B:
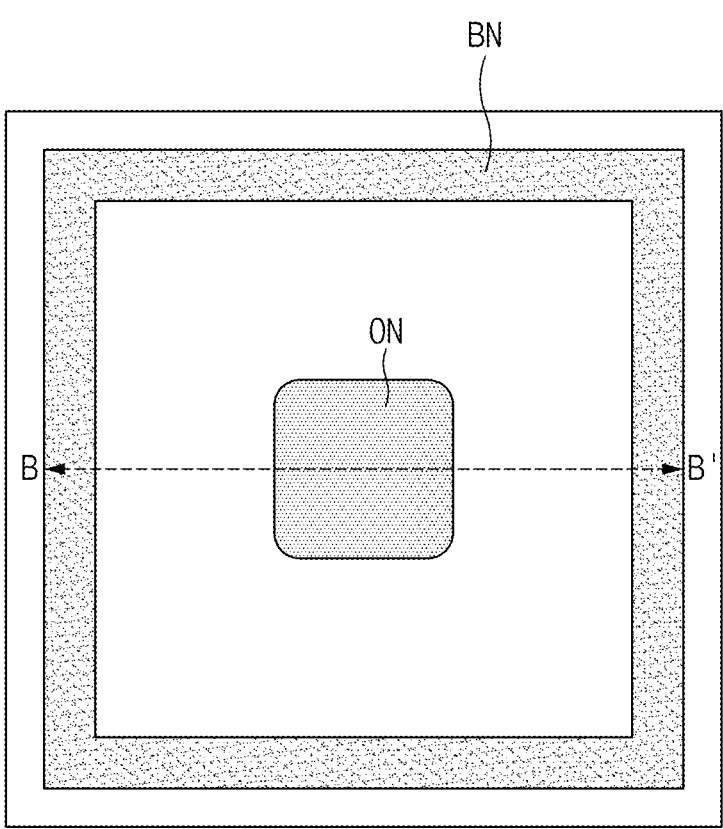
FIG. 9B is a diagram illustrating another example of a planar structure of a first SPAD or a second SPAD based on some implementations of the disclosed technology.

FIG. 9B is a diagram illustrating another example of a planar structure of the first SPAD or the second SPAD based on some implementations of the disclosed technology.

Referring to FIG. 9B, the planar structure 900-2 of the first SPAD (SPAD_C) or the second SPAD (SPAD_A) is schematically shown.

The planar structure 900-2 is substantially the same as the planar structure 900-1 except for some differences, and the following description will focus on such differences.

The output node (ON) may be formed in a rectangular shape with rounded corners placed at the center of the SPAD. As the output node (ON) has a rectangular shape with rounded corners, the output node (ON) may be disposed so that the distance between the biasing node (BN) and the output node (ON) is not shorter than a required distance, thereby minimizing the edge breakdown phenomenon.

The biasing node (BN) may be formed in a rectangular ring shape that surrounds the output node (ON) while being spaced a predetermined distance away from the output node (ON).

Figure 9C:
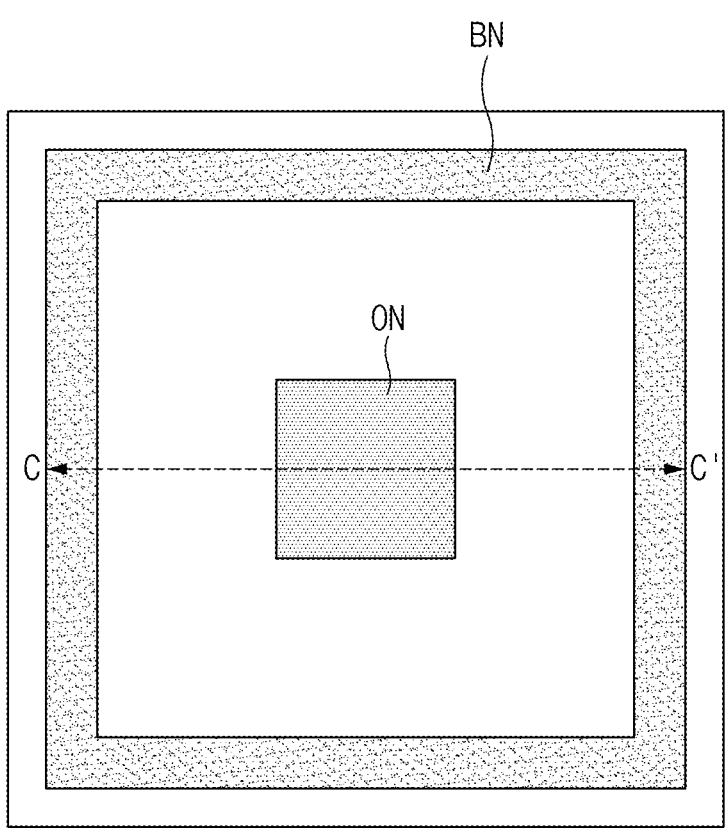
FIG. 9C is a diagram illustrating another example of a planar structure of a first SPAD or a second SPAD based on some implementations of the disclosed technology.

FIG. 9C is a diagram illustrating another example of a planar structure of the first SPAD or the second SPAD based on some implementations of the disclosed technology.

Referring to FIG. 9C, the planar structure 900-3 of the first SPAD (SPAD_C) or the second SPAD (SPAD_A) is schematically shown.

The planar structure 900-3 is substantially the same as the planar structure 900-1 except for some differences, and the following description will focus on such differences.

The output node (ON) may be formed in a rectangular shape with angled corners placed at the center of the SPAD.

The biasing node (BN) may be formed in a rectangular ring shape that surrounds the output node (ON) while being spaced a predetermined distance away from the output node (ON).

The area of the output node (ON) may correspond to the area of the active region that can detect photons. As the area of the output node (ON) increases in size, sensitivity may increase, but the possibility of noise generation due to ambient noise (also called background noise) may increase. Additionally, as the area of the output node (ON) increases in size, the possibility of occurrence of the edge breakdown phenomenon may also increase.

Assuming that the output nodes (ON) included in the planar structures (900-1 to 900-3) have the same width (e.g., width in the horizontal direction), a planar structure 900-3 in which the output node (ON) (i.e., the largest output node ON) has the largest area may have the highest sensitivity, the planar structure 900-2 in which the output node (ON) has the second largest area may have the second highest sensitivity, and the planar structure 900-1 in which the output node (ON) has the smallest area may have the lowest sensitivity.

In some implementations, in order to further increase a difference in sensitivity between the first SPAD (SPAD_C) and the second SPAD (SPAD_A), the first SPAD (SPAD_C) may be formed as the planar structure 900-1, and the second SPAD (SPAD_A) may be formed as the planar structure 900-3.

Figure 10A:
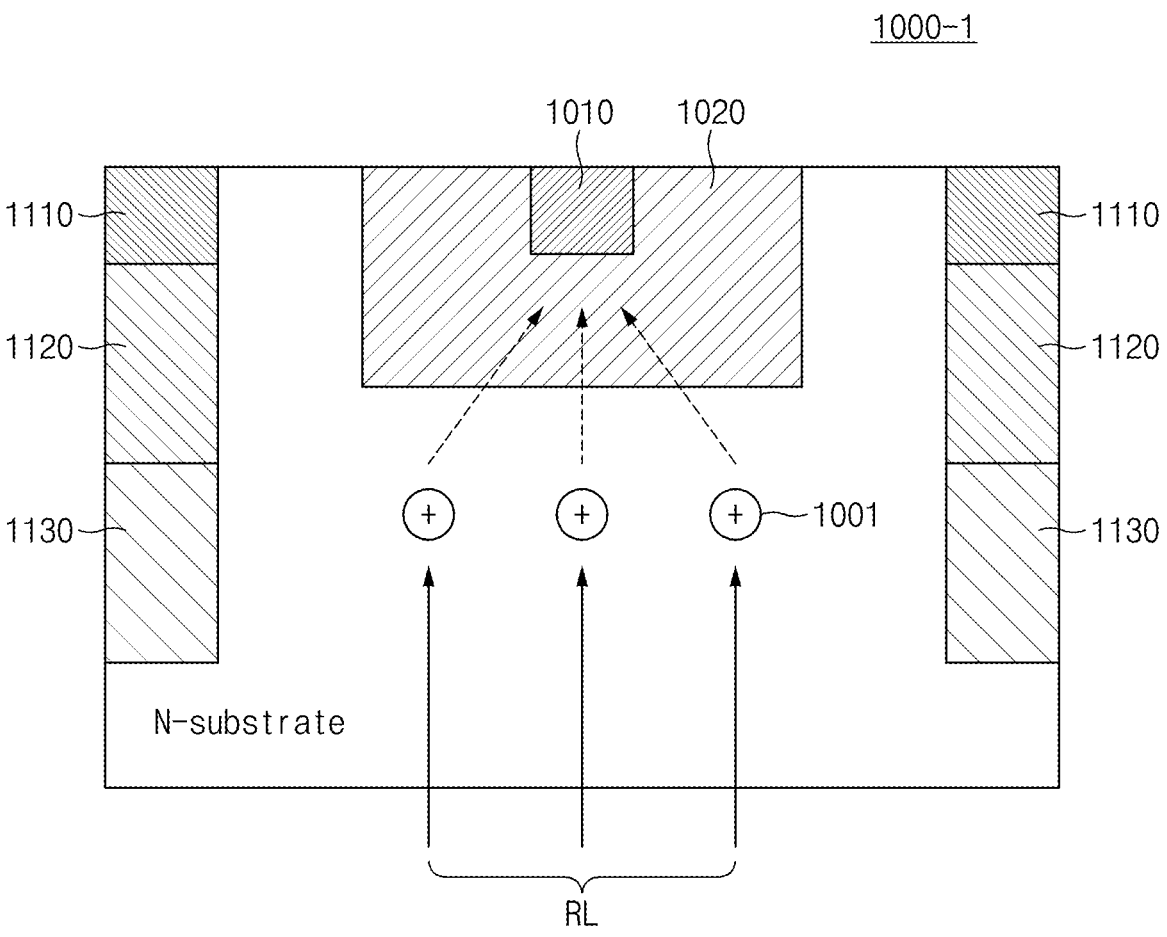
FIG. 10A is a diagram illustrating an example of a cross-sectional structure taken along any one of first to third lines shown in FIGS. 9A to 9C based on some implementations of the disclosed technology.

FIG. 10A is a diagram illustrating an example of a cross-sectional structure taken along any one of first to third lines (A-A', B-B', C-C') shown in FIGS. 9A to 9C based on some implementations of the disclosed technology.

Referring to FIG. 10A, a cross-sectional structure 1000-1 taken along any one of the first to third lines (A-A', B-B', C-C') of FIGS. 9A to 9C is schematically shown. The cross-sectional structures (1000-1 to 1000-6) shown in FIGS. 10A to 10F may be cross-sectional structures obtained when each of the planar structures (900-1 to 900-3) of FIGS. 9A to 9C corresponds to the first SPAD (SPAD_C). Although it is assumed that each of the cross-sectional structures (1000-1 to 1000-6) is a structure formed on an N-type substrate (N-substrate) doped with N-type impurities (e.g., Group-V elements), other implementations are also possible, and it should be noted that each cross-sectional structure may be or include a structure that is formed in a well region doped with N-type impurities within the P-type substrate doped with P-type impurities (e.g., Group-III elements) as necessary.

The cross-sectional structure 1000-1 may include a first P-type region 1010, a second P-type region 1020, a first N-type region 1110, a second N-type region 1120, and a third N-type region 1130.

The first P-type region 1010 may correspond to the output node (ON) of the planar structures (900-1 to 900-3), and may be a region doped with P-type impurities.

The second P-type region 1020 may surround the first P-type region 1010, and may have a larger width than the first P-type region 1010 and a greater depth than the first P-type region 1010. In the following description, the width may refer to a horizontal width (i.e., a left and right width), and the depth may refer to a depth from the top surface of the substrate. The second P-type region 1020 may be a region doped with P-type impurities at a lower doping concentration than the first P-type region 1010.

The first N-type region 1110 may be disposed to contact the top surface of the N-type substrate, and may be a region doped with N-type impurities.

The second N-type region 1120 may be in contact with the bottom surface of the first N-type region 1110, and at the same time may have the same width as the first N-type region 1110 and have a greater depth than the first N-type region 11100. The second N-type region 1120 may be a region doped with N-type impurities at a lower doping concentration than the first N-type region 1110.

The third N-type region 1130 may be in contact with the bottom surface of the second N-type region 1120, and at the same time may have the same width as the second N-type region 1120 and have a greater depth than the second N-type region 1120. The third N-type region 1130 may be a region doped with N-type impurities at a lower doping concentration than the second N-type region 1120. Meanwhile, the third N-type region 1130 may be a region doped with N-type impurities at a higher doping concentration than the N-type substrate.

The first N-type region 1110, the second N-type region 1120, and the third N-type region 1130 may correspond to the biasing nodes (BN) of the planar structures (900-1 to 900-3). In more detail, the first N-type region 1110 may correspond to the biasing node (BN) of the biasing node (BN) of the planar structure 900-1, the second N-type region 1120 may correspond to the biasing node (BN) of the biasing node (BN) of the planar structure 900-2, and the third N-type region 1130 may correspond to the biasing node (BN) of the biasing node (BN) of the planar structure 900-3.

An N-type region including the first N-type region 1110, the second N-type region 1120, the third N-type region 1130, and the N-type substrate, and a P-type region including the first P-type region 1010 and the second P-type region 1020 may form the first SPAD (SPAD_C).

Electrons and holes 1001 of the reached light (RL) transmitted through the bottom surface of the N-type substrate may cause photoelectric conversion to generate electrons and holes 1001. Although FIG. 10A shows that three holes 1001 are generated at a specific position by the reached light (RL) for convenience of description, other implementations are also possible, and it should be noted that at least one hole 1001 is generated at any position within the cross-sectional structure 1000-1 so that the avalanche process may proceed. When the avalanche process by photons proceeds, the doping concentration increases in the order of the second P-type region 1020 and the first P-type region 1010, so that amplification of carriers (i.e., holes 1001) may occur in the direction of the first P-type region 1010. Since the second P-type region 1020 causes amplification of carriers to increase a detection speed of carriers and results in increased sensitivity, the second P-type region 1020 may be defined as a multiplier region.

As the doping concentration decreases in the order of the first N-type region 1110, the second N-type region 1120, the third N-type region 1130, and the N-type substrate, the electric field (or reverse bias) caused by the first bias voltage (VB1) applied to the first N-type region 1110 may affect a deeper position within the N-type substrate. Accordingly, the avalanche process can proceed even with photons that have reached deep positions within the N-type substrate, and the sensitivity of the first SPAD (SPAD_C) can be improved.

Additionally, the third N-type region 1130 is formed to extend to a deep position close to the bottom surface of the N-type substrate, thereby contributing to pixel isolation from adjacent pixels.

On the other hand, the second P-type region 1020 forms a PN junction with the N-type substrate between the first N-type region 1110 and the first P-type region 1010, thereby preventing the edge breakdown phenomenon between the first N-type region 1110 and the first P-type region 1010.

Figure 10B:
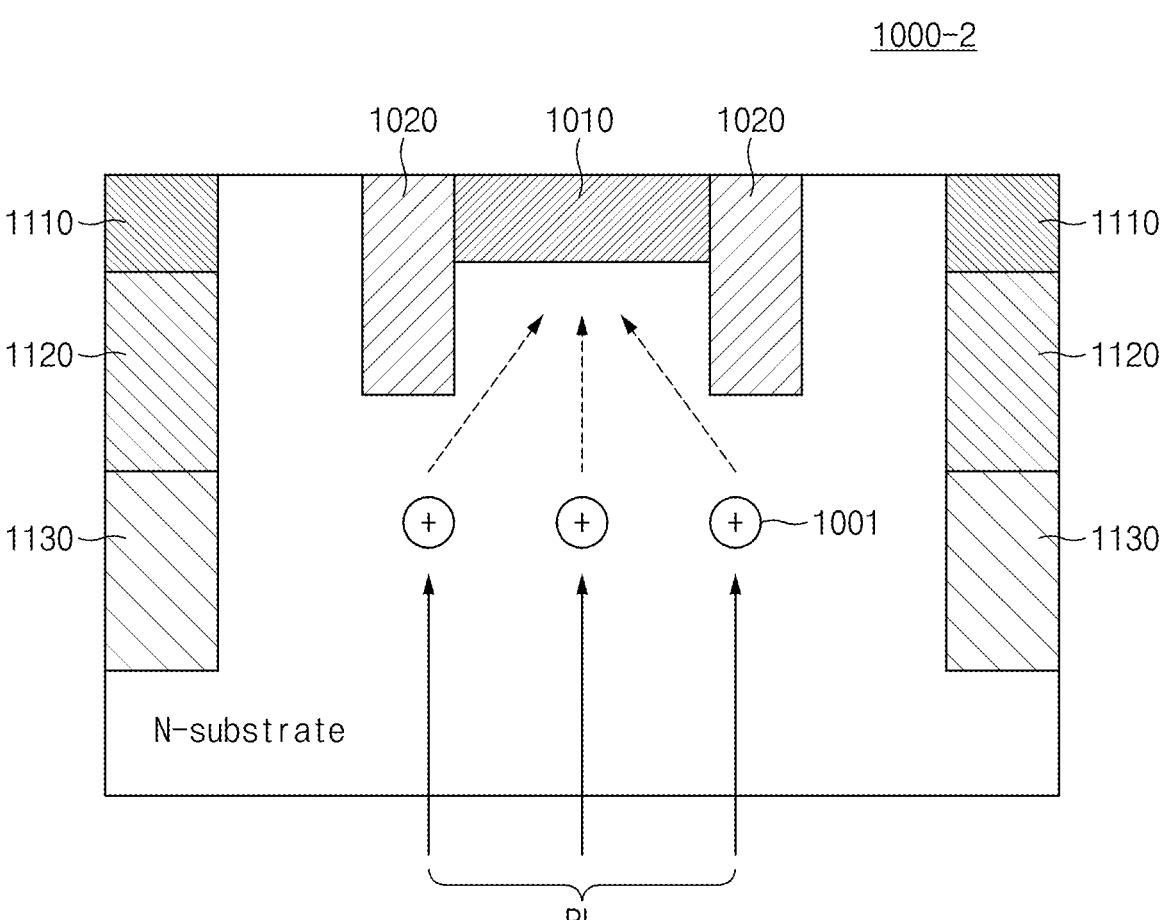
FIG. 10B is a diagram illustrating another example of a cross-sectional structure taken along any one of the first to third lines shown in FIGS. 9A to 9C based on some implementations of the disclosed technology.

FIG. 10B is a diagram illustrating another example of a cross-sectional structure taken along any one of the first to third lines (A-A', B-B', C-C') shown in FIGS. 9A to 9C based on some implementations of the disclosed technology.

Referring to FIG. 10B, a cross-sectional structure 1000-2 taken along any one of the first to third lines (A-A', B-B', C-C') of FIGS. 9A to 9C is schematically shown.

The cross-sectional structure 1000-2 is substantially the same as the cross-sectional structure 1000-1 except for some differences, and the following description will focus on such differences.

The cross-sectional structure 1000-2 may include a first P-type region 1010, a second P-type region 1020, a first N-type region 1110, a second N-type region 1120, and a third N-type region 1130.

The second P-type region 1020 may be arranged to contact both left and right sides of the first P-type region 1010, and may have a greater depth than the first P-type region 1010. The second P-type region 1020 may be a region doped with P-type impurities at a lower doping concentration than the first P-type region 1010.

The second P-type region 1020 may not be disposed below the first P-type region 1010 and the first P-type region 1010 may be opened, so that the multiplier region is reduced in size and the sensitivity of the first SPAD (SPAD_C) decreases.

On the other hand, the second P-type region 1020 may form a PN junction with the N-type substrate between the first N-type region 1110 and the first P-type region 1010, thereby preventing the edge breakdown phenomenon between the first N-type region 1110 and the first P-type region 1010.

Figure 10C:
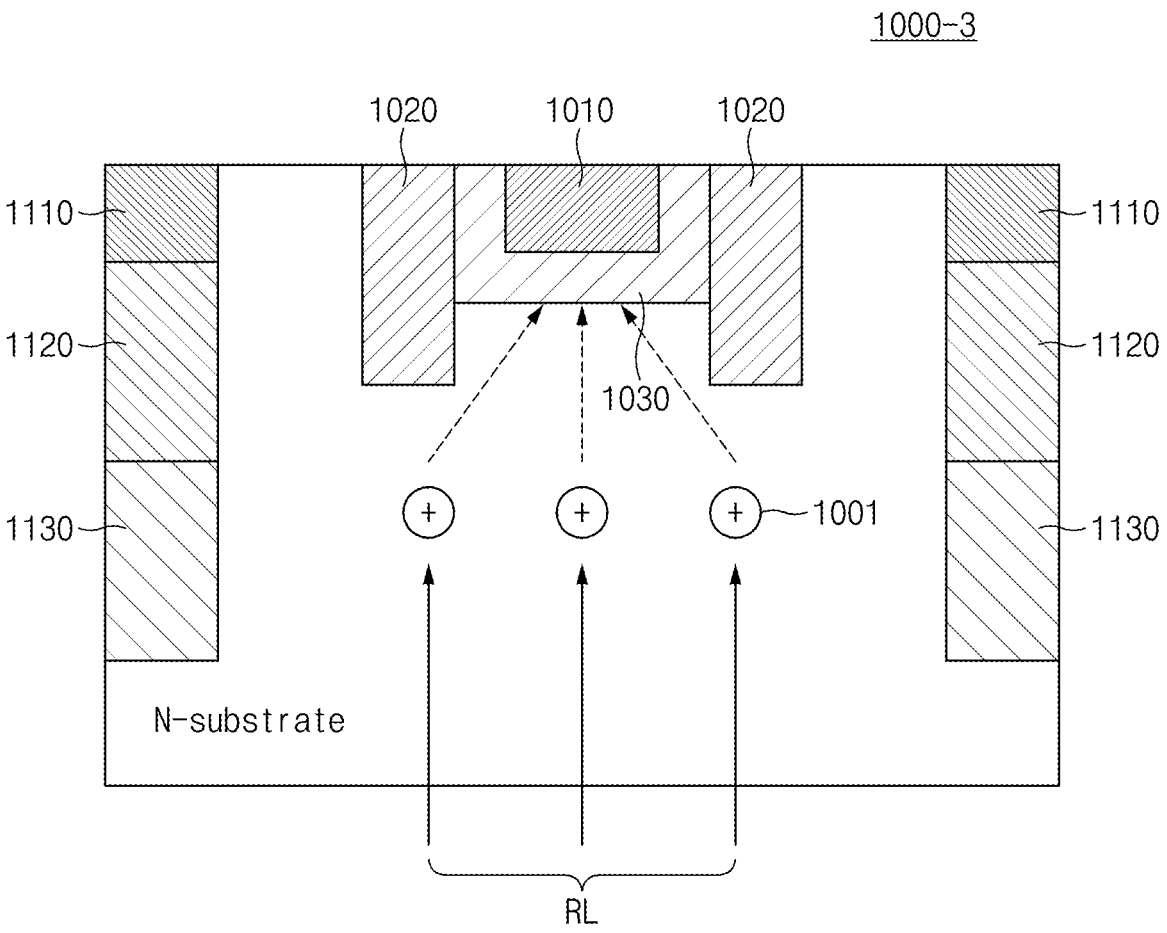
FIG. 10C is a diagram illustrating another example of a cross-sectional structure taken along any one of the first to third lines shown in FIGS. 9A to 9C based on some implementations of the disclosed technology.

FIG. 10C is a diagram illustrating another example of a cross-sectional structure taken along any one of the first to third lines (A-A', B-B', C-C') shown in FIGS. 9A to 9C based on some implementations of the disclosed technology.

Referring to FIG. 10C, a cross-sectional structure 1000-3 taken along any one of the first to third lines (A-A', B-B', C-C') of FIGS. 9A to 9C is schematically shown.

The cross-sectional structure 1000-3 is substantially the same as the cross-sectional structure 1000-1 except for some differences, and the following description will focus on such differences.

The cross-sectional structure 1000-3 may include a first P-type region 1010, a second P-type region 1020, a third P-type region 1030, a first N-type region 1110, a second N-type region 1120, and a third N-type region 1130.

The second P-type region 1020 may be arranged to contact the third P-type region 1030 on both left and right sides of the first P-type region 1010, and may have a greater depth than the first P-type region 1010 and the third P-type region 1030. The second P-type region 1020 may be a region doped with P-type impurities at a lower doping concentration than that of the first P-type region 1010.

The second P-type region 1020 may not be disposed below the first P-type region 1010 to reduce the multiplier region, thereby reducing the sensitivity of the first SPAD (SPAD_C).

On the other hand, the second P-type region 1020 may form a PN junction with the N-type substrate between the first N-type region 1110 and the first P-type region 1010, thereby preventing the edge breakdown phenomenon between the first N-type region 1110 and the first P-type region 1010.

The third P-type region 1030 may be arranged to surround the first P-type region 1010 while contacting the second P-type region 1020 within the second P-type region 1020, and may have a greater depth than the first P-type region 1010 as well as a smaller depth than the second P-type region 1020. The third P-type region 1030 may be a region doped with P-type impurities not only at a lower doping concentration than the first P-type region 1010, but also at a higher doping concentration than the second P-type region 1020.

The third P-type region 1030 may be disposed below the first P-type region 1010 to enlarge the multiplier region, so that the sensitivity of the first SPAD (SPAD_C) may increase and at the same time may function as a double guard-ring for the second P-type region 1020, thereby preventing the edge breakdown phenomenon.

Figure 10D:
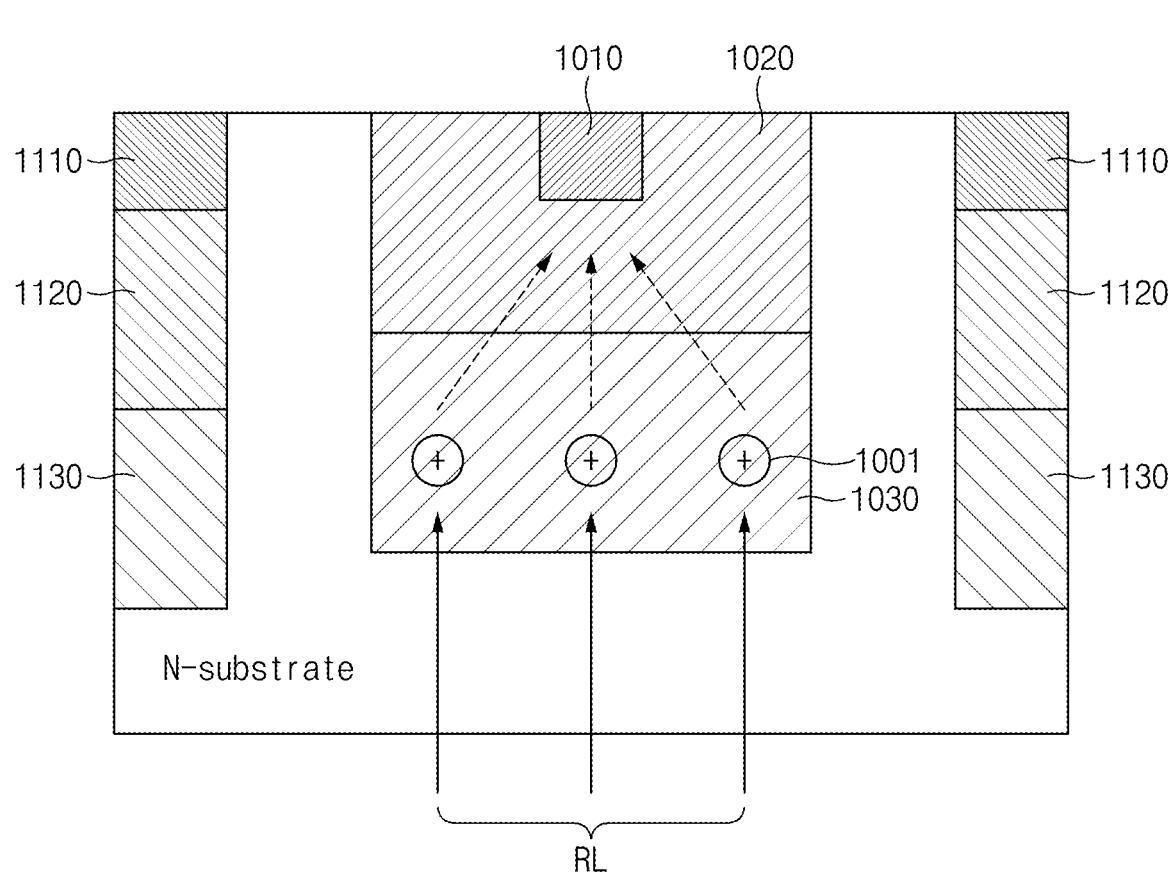
FIG. 10D is a diagram illustrating another example of a cross-sectional structure taken along any one of the first to third lines shown in FIGS. 9A to 9C based on some implementations of the disclosed technology.

FIG. 10D is a diagram illustrating another example of a cross-sectional structure taken along any one of the first to third lines (A-A', B-B', C-C') shown in FIGS. 9A to 9C based on some implementations of the disclosed technology.

Referring to FIG. 10D, a cross-sectional structure 1000-4 taken along any one of the first to third lines (A-A', B-B', C-C') of FIGS. 9A to 9C is schematically shown.

The cross-sectional structure 1000-4 is substantially the same as the cross-sectional structure 1000-1 except for some differences, and the following description will focus on such differences.

The cross-sectional structure 1000-4 may include a first P-type region 1010, a second P-type region 1020, a third P-type region 1030, a first N-type region 1110, a second N-type region 1120, and a third N-type region 1130.

The third P-type region 1030 may be arranged to contact the bottom surface of the second P-type region 1020, and may have the same width as the second P-type region 1020 as well as a greater depth than the second P-type region 1020. The third P-type region 1030 may be a region doped with P-type impurities at a lower doping concentration than the second P-type region 1020.

The third P-type region 1030 may be disposed below the second P-type region 1020 to enlarge the multiplier region, thereby increasing the sensitivity of the first SPAD (SPAD_C).

Figure 10E:
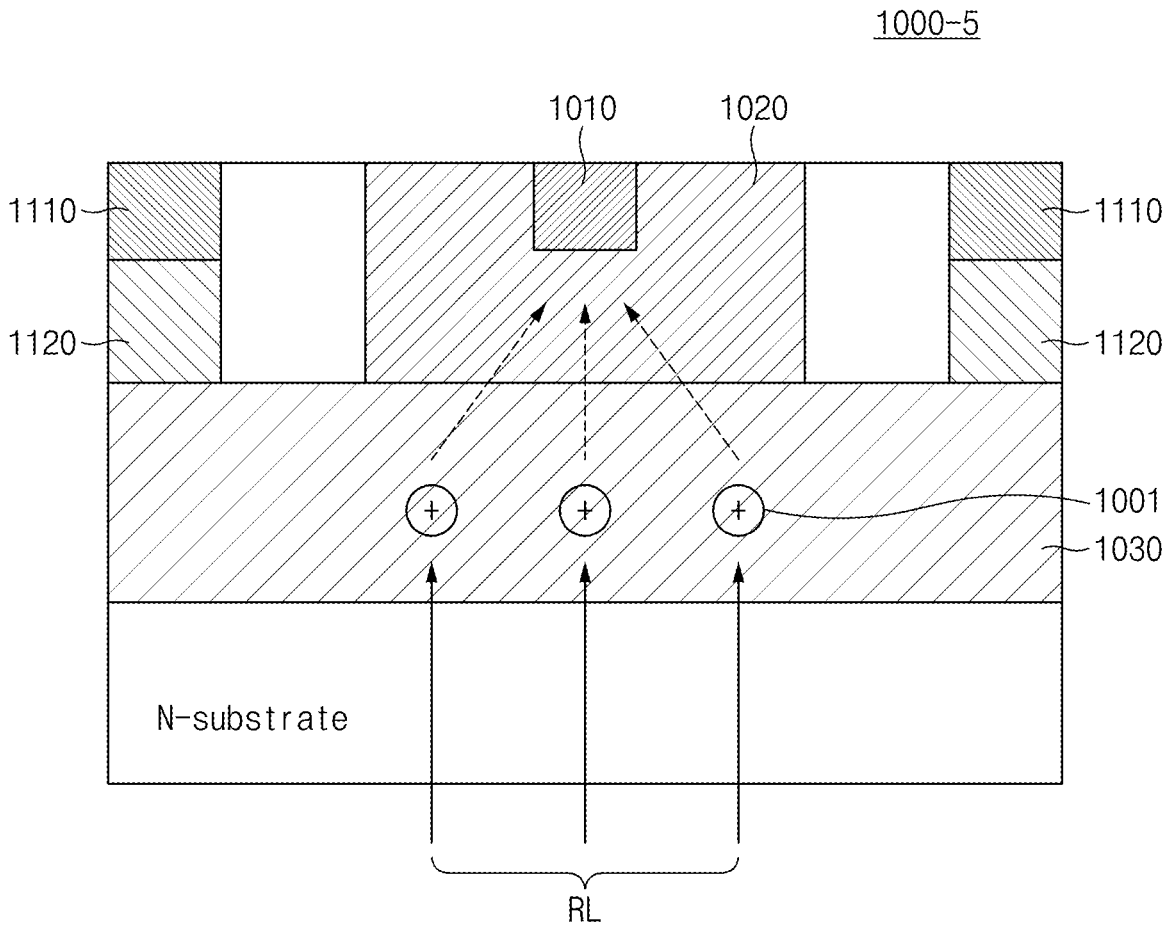
FIG. 10E is a diagram illustrating another example of a cross-sectional structure taken along any one of the first to third lines shown in FIGS. 9A to 9C based on some implementations of the disclosed technology.

FIG. 10E is a diagram illustrating another example of a cross-sectional structure taken along any one of the first to third lines (A-A', B-B', C-C') shown in FIGS. 9A to 9C based on some implementations of the disclosed technology.

Referring to FIG. 10E, a cross-sectional structure 1000-5 taken along any one of the first to third lines (A-A', B-B', C-C') of FIGS. 9A to 9C is schematically shown.

The cross-sectional structure 1000-5 is substantially the same as the cross-sectional structure 1000-1 except for some differences, and the following description will focus on such differences.

The cross-sectional structure 1000-5 may include a first P-type region 1010, a second P-type region 1020, a third P-type region 1030, a first N-type region 1110, and a second N-type region 1120.

The third P-type region 1030 may be disposed over the entire area of the first SPAD (SPAD_C) while contacting the bottom surface of the second P-type region 1020 and the bottom surface of the second N-type region 1120, and may have a greater depth than the second P-type region 1020 and the second N-type region 1120. The third P-type region 1030 may be a region doped with P-type impurities at a lower doping concentration than the second P-type region 1020.

The third N-type region 1130 may be omitted due to the third P-type region 1030.

The third P-type region 1030 may be disposed over the entire area of the first SPAD (SPAD_C) to enlarge the multiplier region, thereby increasing the sensitivity of the first SPAD (SPAD_C).

In some implementations, the third P-type region 1030 may be formed integrally with the third P-type region of an adjacent pixel.

Figure 10F:
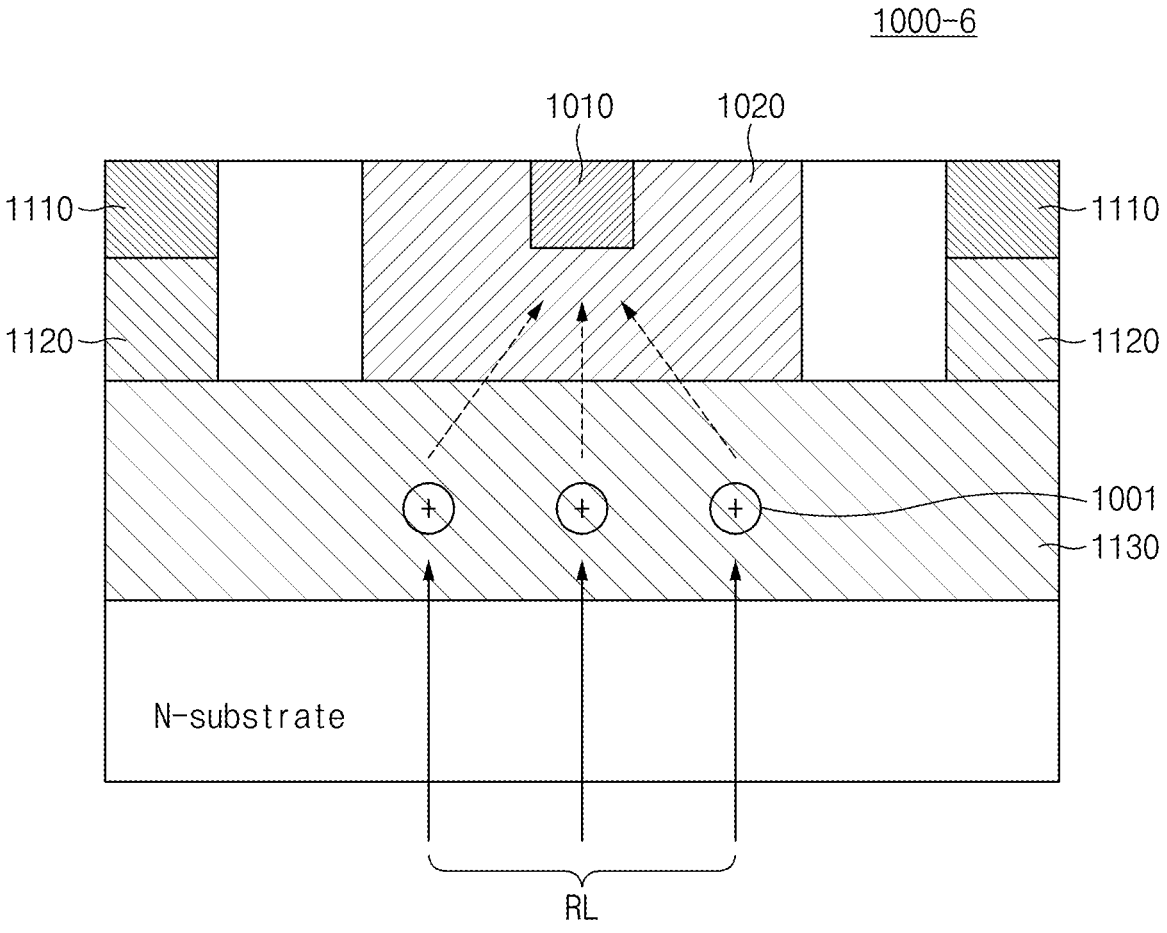
FIG. 10F is a diagram illustrating another example of a cross-sectional structure taken along any one of the first to third lines shown in FIGS. 9A to 9C based on some implementations of the disclosed technology.

FIG. 10F is a diagram illustrating another example of a cross-sectional structure taken along any one of the first to third lines (A-A', B-B', C-C') shown in FIGS. 9A to 9C based on some implementations of the disclosed technology.

Referring to FIG. 10F, a cross-sectional structure 1000-6 taken along any one of the first to third lines (A-A', B-B', C-C') of FIGS. 9A to 9C is schematically shown.

The cross-sectional structure 1000-6 is substantially the same as the cross-sectional structure 1000-1 except for some differences, and the following description will focus on such differences.

The cross-sectional structure 1000-6 may include a first P-type region 1010, a second P-type region 1020, a first N-type region 1110, a second N-type region 1120, and a third N-type region 1130.

The third N-type region 1130 may be disposed over the entire area of the first SPAD (SPAD_C) while contacting the bottom surface of the second P-type region 1020 and the bottom surface of the second N-type region 1120, and may have a greater depth than the second P-type region 1020 and the second N-type region 1120. The third N-type region 1130 may be a region doped with N-type impurities at a lower doping concentration than the second N-type region 1120.

Due to the third N-type region 1130, the electric field (or reverse bias) caused by the first bias voltage (VB1) to be applied to the first N-type region 1110 may affect a larger region at a deeper position within the N-type substrate. In addition, the electric field caused by the first bias voltage (VB1) may affect the entire first SPAD (SPAD_C), so that the first SPAD (SPAD_C) can be driven with the first bias voltage (VB1) lower than the first bias voltage (VB1) that must be applied to the cross-sectional structure 1000-1, thereby reducing power consumption.

However, as the third N-type region extends to the bottom surface of the second P-type region 1020, the avalanche process may not occur not only by a PN junction between the third N-type region and the second P-type region, but also by a smaller region of the N-type substrate in which photons are detected, thereby reducing the sensitivity of the first SPAD (SPAD_C).

In some implementations, the third N-type region 1130 may be formed integrally with the third N-type region of an adjacent pixel.

Figure 11A:
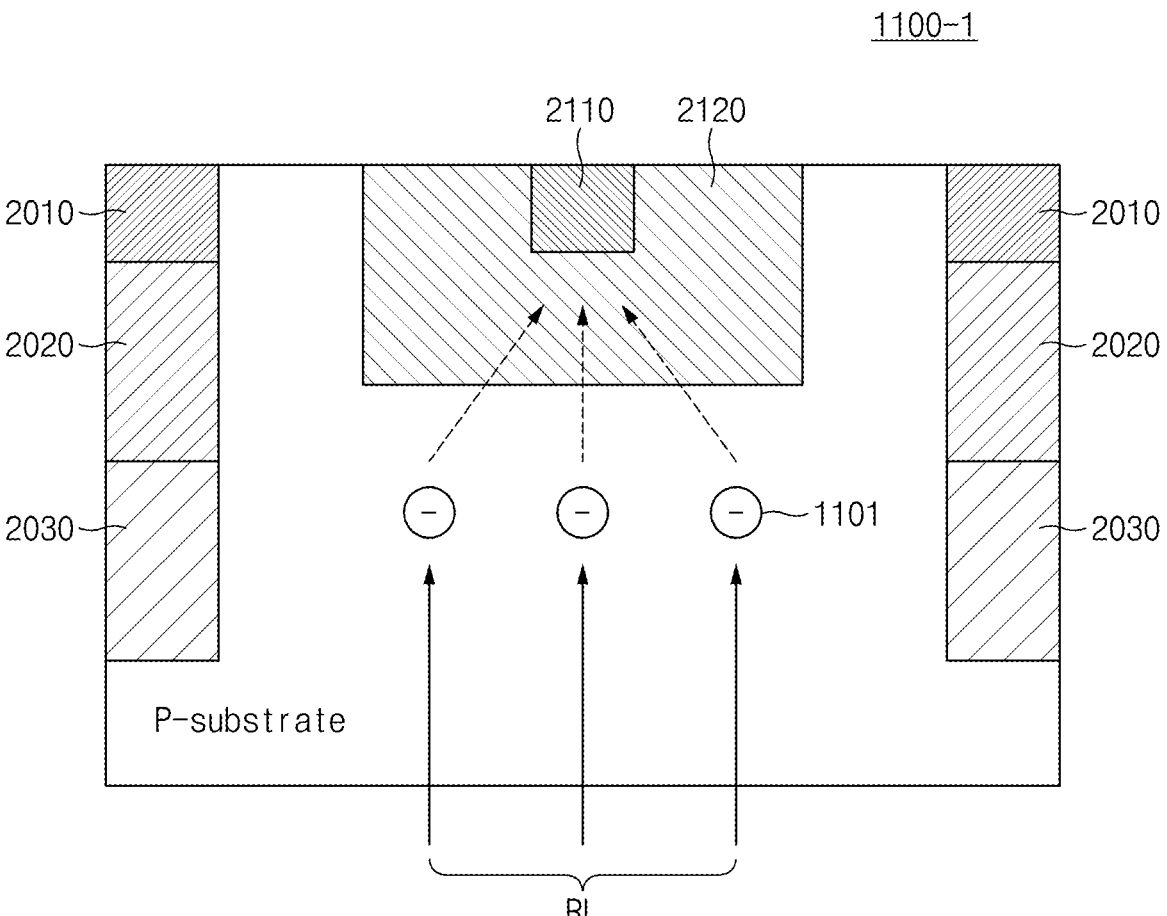
FIG. 11A is a diagram illustrating another example of a cross-sectional structure taken along any one of the first to third lines shown in FIGS. 9A to 9C based on some implementations of the disclosed technology.

FIG. 11A is a diagram illustrating another example of a cross-sectional structure taken along any one of the first to third lines (A-A', B-B', C-C') shown in FIGS. 9A to 9C based on some implementations of the disclosed technology.

Referring to FIG. 11A, a cross-sectional structure 1100-1 taken along any one of the first to third lines (A-A', B-B', C-C') of FIGS. 9A to 9C is schematically shown. The cross-sectional structures (1100-1 to 1100-6) shown in FIGS. 11A to 11F may be cross-sectional structures obtained when each of the planar structures (900-1 to 900-3) of FIGS. 9A to 9C corresponds to the second SPAD (SPAD_A). Although it is assumed that each of the cross-sectional structures (1100-1 to 1100-6) is a structure formed on a P-type substrate (P-substrate) doped with P-type impurities, other implementations are also possible, and it should be noted that each cross-sectional structure may be or include a structure that is formed in a well region doped with P-type impurities within the N-type substrate doped with N-type impurities as necessary.

The cross-sectional structure 1100-1 may include a first N-type region 2110, a second N-type region 2120, a first P-type region 2010, a second P-type region 2020, and a third P-type region 2030.

The materials, structures, and functions of the first to third P-type regions (2010 to 2030) shown in FIGS. 11A to 11F may be substantially the same as those of the first to third P-type regions (1010 to 1030) shown in FIGS. 10A to 10F, and the materials, structures, and functions of the first to third N-type regions (2110 to 2130) shown in FIGS. 11A to 11F may be substantially the same as those of the first to third N-type regions (1110 to 1130) shown in FIGS. 10A to 10F. If there occurs a difference between the first to third P-type regions (2010 to 2030) and the first to third P-type regions (1010 to 1030) or if there occurs a difference between the first to third N-type regions (2110 to 2130) and the first to third N-type regions (1110 to 1130), a detailed description thereof will be given later.

The first N-type region 2110 may correspond to the output node (ON) of the planar structures (900-1~900-3), and may be a region doped with N-type impurities.

The second N-type region 2120 may surround the first N-type region 2110, and may have a larger width than the first N-type region 2110 and a greater depth than the first N-type region 2110. The second N-type region 2120 may be a region doped with N-type impurities at a lower doping concentration than the first N-type region 2110.

The first P-type region 2010 may correspond to the biasing node (BN) of the planar structures (900-1 to 900-3), and may be a region doped with P-type impurities.

The second P-type region 2020 may be in contact with the bottom surface of the first P-type region 2010, and at the same time may have the same width as the first P-type region 2010 and have a greater depth than the first P-type region 2010. The second P-type region 2020 may be a region doped with P-type impurities at a lower doping concentration than the first P-type region 2010.

The third P-type region 2030 may be in contact with the bottom surface of the second P-type region 2020, and at the same time may have the same width as the second P-type region 2020 and have a greater depth than the second P-type region 2020. The third P-type region 2030 may be a region doped with P-type impurities at a lower doping concentration than the second P-type region 2020. Meanwhile, the third P-type region 2030 may be a region doped with P-type impurities at a higher doping concentration than the P-type substrate.

A P-type region including the first P-type region 2010, the second P-type region 2020, the third P-type region 2030, and the P-type substrate, and an N-type region including the first N-type region 2110 and the second N-type region 2120 may form the second SPAD (SPAD_A).

Electrons 1101 and holes of the reached light (RL) transmitted through the bottom surface of the P-type substrate may cause photoelectric conversion to generate electrons 1101 and holes. Although FIG. 11A shows that three electrons 1101 are generated at a specific position by the reached light (RL) for convenience of description, other implementations are also possible, and it should be noted that at least one electron 1101 is generated at any position within the cross-sectional structure 1100-1 so that the avalanche process may proceed. When the avalanche process by photons proceeds, the doping concentration increases in the order of the second N-type region 2120 and the first N-type region 2110, so that amplification of carriers (i.e., electrons 1101) may occur in the direction of the first N-type region 2110. Since the second N-type region 2120 causes amplification of carriers to increase a detection speed of carriers and results in increased sensitivity, the second N-type region 2120 may be defined as a multiplier region.

As the doping concentration decreases in the order of the first P-type region 2010, the second P-type region 2020, the third P-type region 2030, and the P-type substrate, the electric field (or reverse bias) caused by the second bias voltage (VB2) applied to the first P-type region 2010 may affect a deeper position within the P-type substrate. Accordingly, the avalanche process can proceed even with photons that have reached deep positions within the P-type substrate, and the sensitivity of the second SPAD (SPAD_A) can be improved.

Additionally, the third P-type region 2030 is formed to extend to a deep position close to the bottom surface of the P-type substrate, thereby contributing to pixel isolation from adjacent pixels.

On the other hand, the second N-type region 2120 forms a PN junction with the P-type substrate between the first P-type region 2010 and the first N-type region 2110, thereby preventing the edge breakdown phenomenon between the first P-type region 2010 and the first N-type region 2110.

FIGS. 11B to 11F are diagrams illustrating other examples of a cross-sectional structure taken along any one of the first to third lines (A-A', B-B', C-C') shown in FIGS. 9A to 9C based on some implementations of the disclosed technology.

Referring to FIGS. 10B to 10F and FIGS. 11B to 11F, cross-sectional structures (1100-2~ 1100-6) taken along any one of the first to third lines (A-A', B-B', C-C') of FIGS. 9A to 9C are schematically shown.

The cross-sectional structures (1100-2~ 1100-6) are substantially the same as the cross-sectional structures (1000-2 to 1000-6) except for some differences that the cross-sectional structures (1000-2 to 1000-6) have opposite conductivity types to the cross-sectional structures (1100-2 to 1100-6), and as such redundant description thereof will herein be omitted for brevity and the following description will focus on such differences.

Figure 12A:
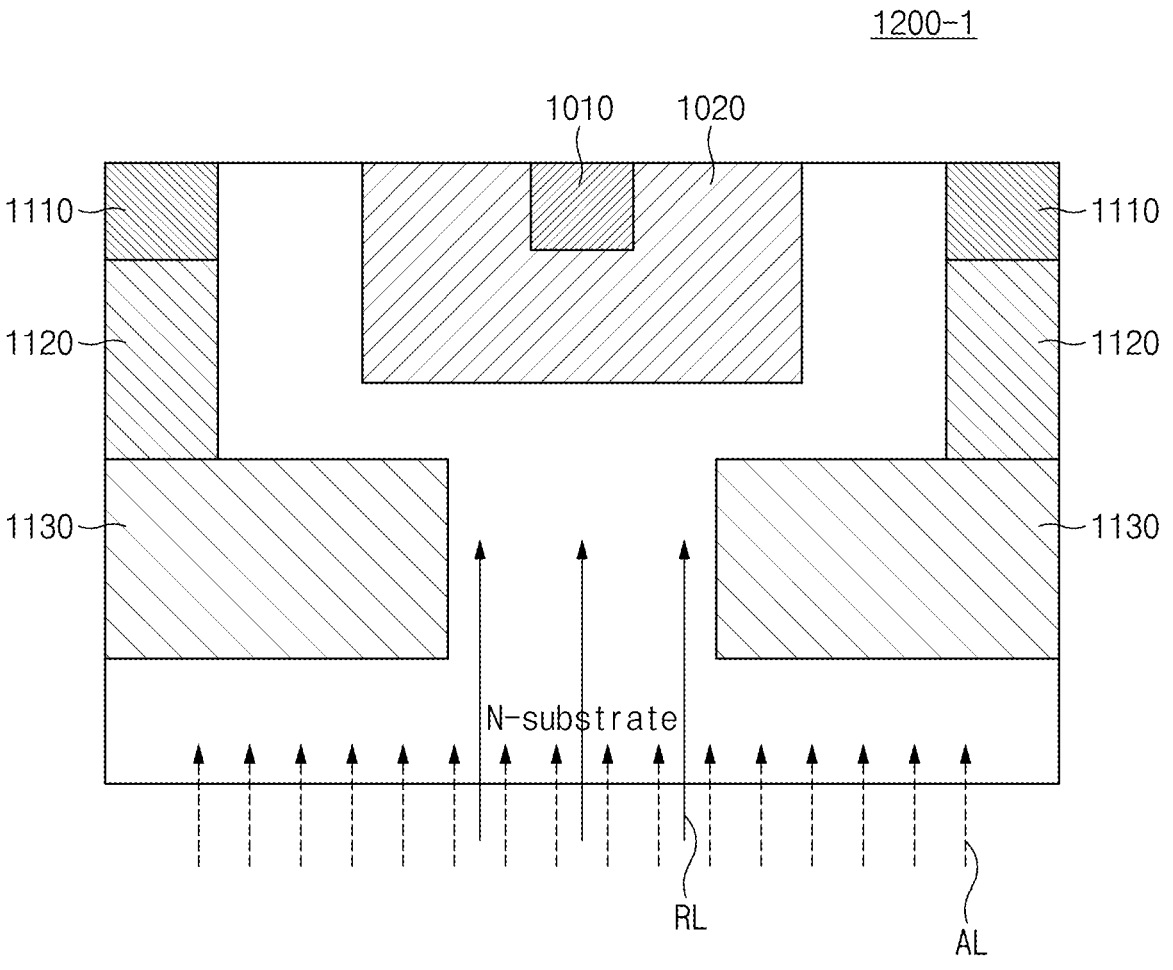
FIG. 12A is a diagram illustrating another example of a cross-sectional structure taken along any one of the first to third lines shown in FIGS. 9A to 9C based on some implementations of the disclosed technology.

FIG. 12A is a diagram illustrating another example of a cross-sectional structure taken along any one of the first to third lines (A-A', B-B', C-C') shown in FIGS. 9A to 9C based on some implementations of the disclosed technology.

Referring to FIGS. 10A and 12A, a cross-sectional structure 1200-1 taken along any one of the first to third lines (A-A', B-B', C-C') of FIGS. 9A to 9C is schematically shown. The cross-sectional structure 1200-1 may correspond to a modified example of the cross-sectional structure 1000-1 shown in FIG. 10A.

The cross-sectional structure 1200-1 of FIG. 12A is substantially the same as the cross-sectional structure 1000-1 except for some differences, and the following description will focus on such differences.

The third N-type region 1130 may be in contact with the bottom surface of the second N-type region 1120, and at the same time may have a greater depth than the second N-type region 1120. The third N-type region 1130 may extend horizontally toward the center of the cross-sectional structure 1200-1 to have a larger width than the second N-type region 1120. However, the third N-type regions 1130 disposed on both sides of the cross-sectional structure 1200-1 do not extend to contact each other, but form an opening region near the center of the cross-sectional structure 1200-1. The size of the opening region may be experimentally determined considering the sensitivity of the first SPAD (SPAD_C) and the size of noise caused by ambient light (AL).

Light incident upon the first SPAD (SPAD_C) may include reached light (RL) reflected from the target object 1 and ambient light (AL) that causes ambient noise. Due to the influence of the lens module 20 and the microlens 804 that focus the reached light (RL) onto the pixel array 110, the reached light (RL) may be concentrated at the center of the first SPAD (SPAD_C) as compared to the ambient light (AL) uniformly incident over the entirety of the first SPAD (SPAD_C).

The third N-type region 1130 may interfere with transmission of light, so that the third N-type region 1130 is disposed in the remaining region excluding the opening region located near the center of the first SPAD (SPAD_C). As a result, the third N-type region 1130 can minimize occurrence of the avalanche process caused by the ambient light (AL), may induce the avalanche process caused by the reached light (RL) concentrated at the center of the first SPAD (SPAD_C), thereby reducing the influence of noise caused by the ambient light (AL).

Figure 12B:
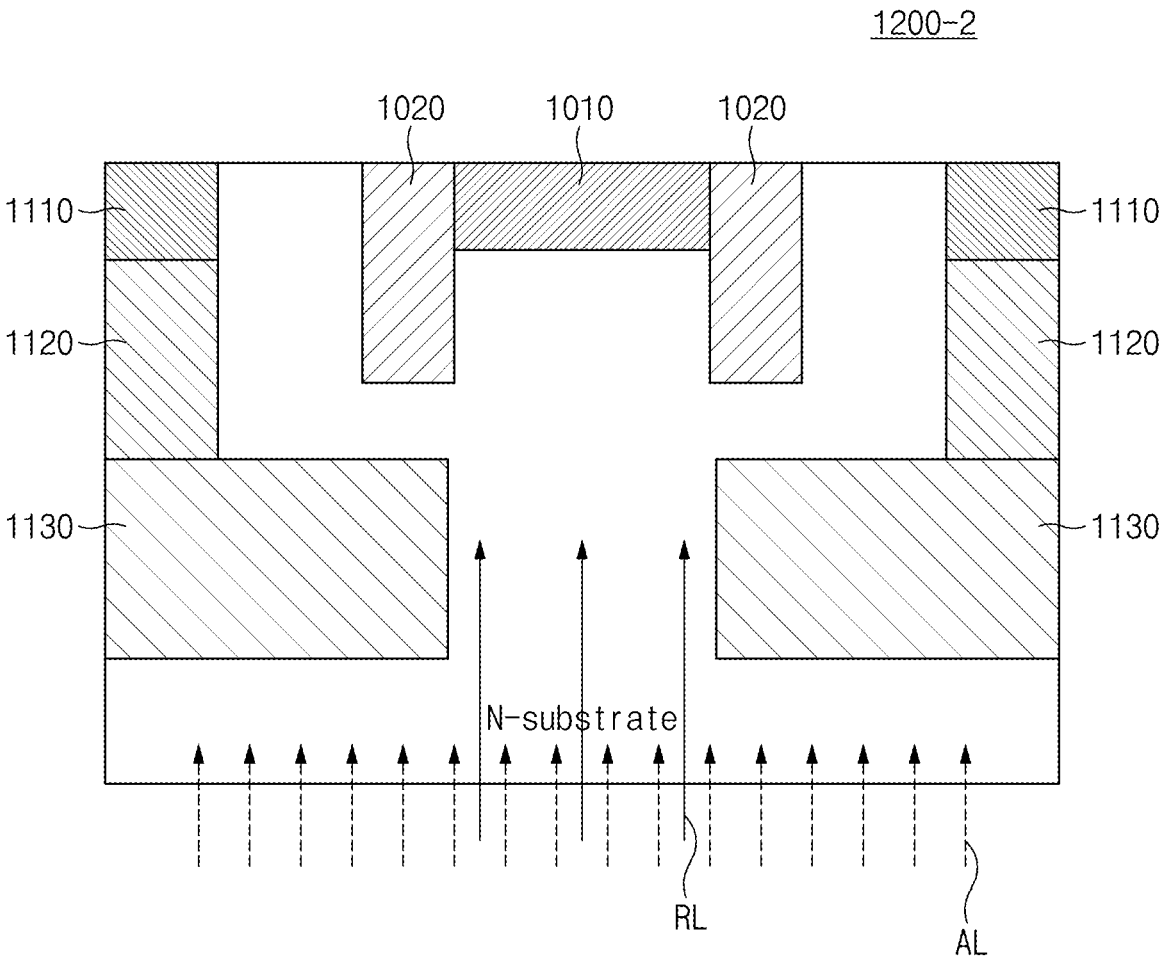
FIG. 12B is a diagram illustrating another example of a cross-sectional structure taken along any one of the first to third lines shown in FIGS. 9A to 9C based on some implementations of the disclosed technology.

FIG. 12B is a diagram illustrating another example of a cross-sectional structure taken along any one of the first to third lines (A-A', B-B', C-C') shown in FIGS. 9A to 9C based on some implementations of the disclosed technology.

Referring to FIGS. 10B and 12B, a cross-sectional structure 1200-2 taken along any one of the first to third lines (A-A', B-B', C-C') of FIGS. 9A to 9C is schematically shown. The cross-sectional structure 1200-2 may correspond to a modified example of the cross-sectional structure 1000-2 shown in FIG. 10B.

The cross-sectional structure 1200-2 of FIG. 12B is substantially the same as the cross-sectional structure 1000-2 except for some differences, and the following description will focus on such differences.

The third N-type region 1130 may be in contact with the bottom surface of the second N-type region 1120, and at the same time may have a greater depth than the second N-type region 1120. The third N-type region 1130 may extend horizontally toward the center of the cross-sectional structure 1200-2 to have a larger width than the second N-type region 1120. However, the third N-type regions 1130 disposed on both sides of the cross-sectional structure 1200-2 do not extend to contact each other, but form an opening region near the center of the cross-sectional structure 1200-2.

Since the functions and effects of the third N-type region 1130 of the cross-sectional structure 1200-2 are substantially the same as those of the third N-type region 1130 of the cross-sectional structure 1200-1, duplicate descriptions thereof will herein be omitted for brevity.

Figure 12C:
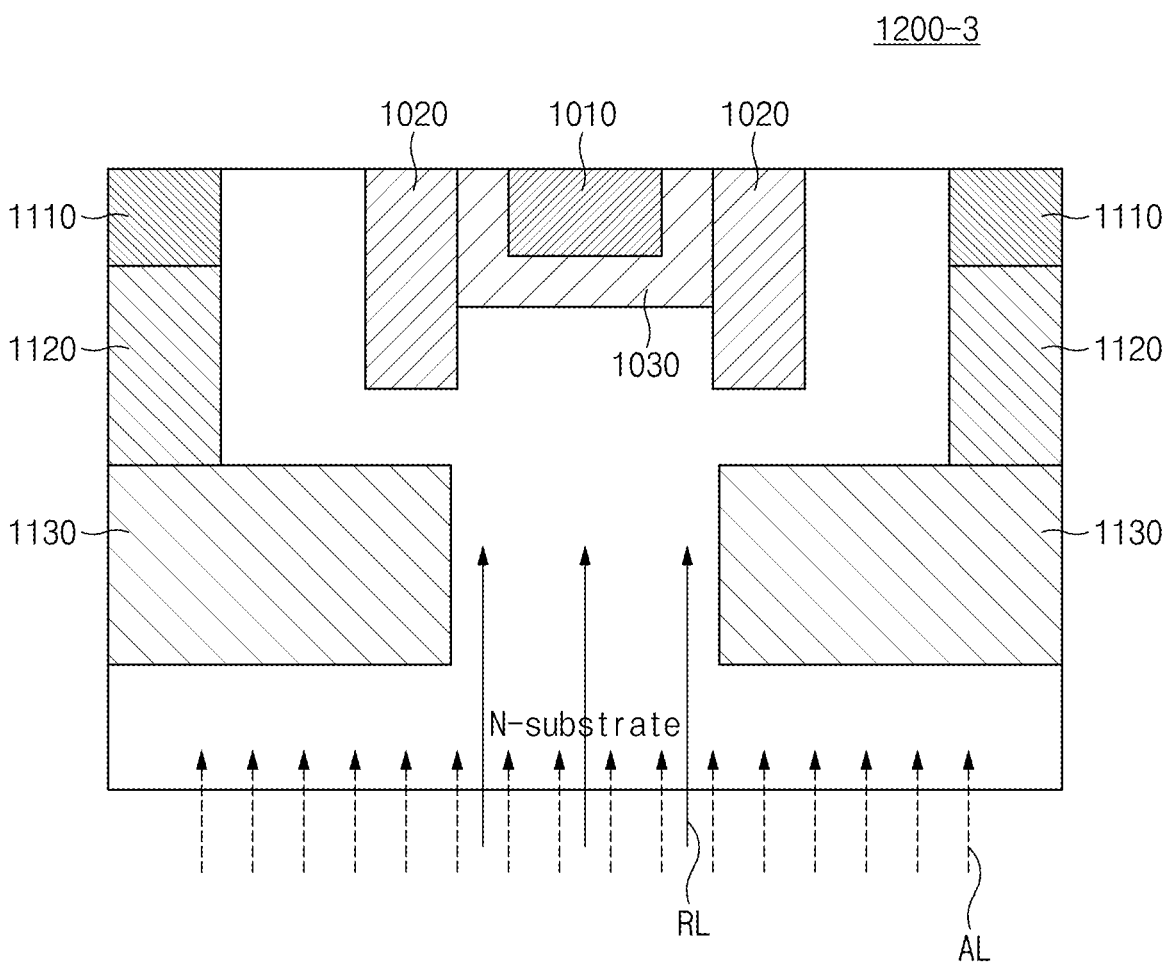
FIG. 12C is a diagram illustrating another example of a cross-sectional structure taken along any one of the first to third lines shown in FIGS. 9A to 9C based on some implementations of the disclosed technology.

FIG. 12C is a diagram illustrating another example of a cross-sectional structure taken along any one of the first to third lines (A-A', B-B, C-C') shown in FIGS. 9A to 9C based on some implementations of the disclosed technology.

Referring to FIGS. 10C and 12C, a cross-sectional structure 1200-3 taken along any one of the first to third lines (A-A', B-B', C-C') of FIGS. 9A to 9C is schematically shown. The cross-sectional structure 1200-3 may correspond to a modified example of the cross-sectional structure 1000-3 shown in FIG. 10C.

The cross-sectional structure 1200-3 of FIG. 12C is substantially the same as the cross-sectional structure 1000-3 except for some differences, and the following description will focus on such differences.

The third N-type region 1130 may be in contact with the bottom surface of the second N-type region 1120, and at the same time may have a greater depth than the second N-type region 1120. The third N-type region 1130 may extend horizontally toward the center of the cross-sectional structure 1200-3 to have a larger width than the second N-type region 1120. However, the third N-type regions 1130 disposed on both sides of the cross-sectional structure 1200-3 do not extend to contact each other, but form an opening region near the center of the cross-sectional structure 1200-3.

Since the functions and effects of the third N-type region 1130 of the cross-sectional structure 1200-3 are substantially the same as those of the third N-type region 1130 of the cross-sectional structure 1200-1, duplicate descriptions thereof will herein be omitted for brevity.

Figure 11B:
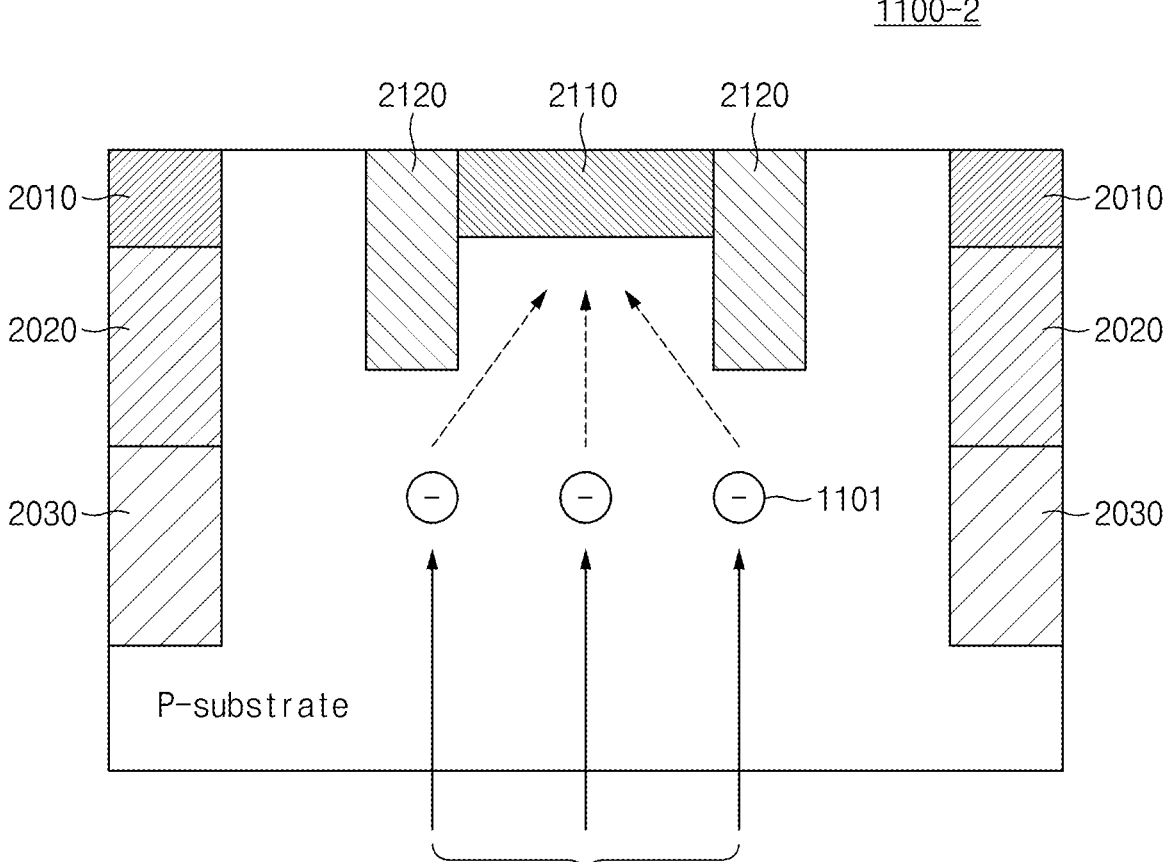
FIGS. 11B to 11F are diagrams illustrating other examples of a cross-sectional structure taken along any one of the first to third lines shown in FIGS. 9A to 9C based on some implementations of the disclosed technology.
Figure 11C:
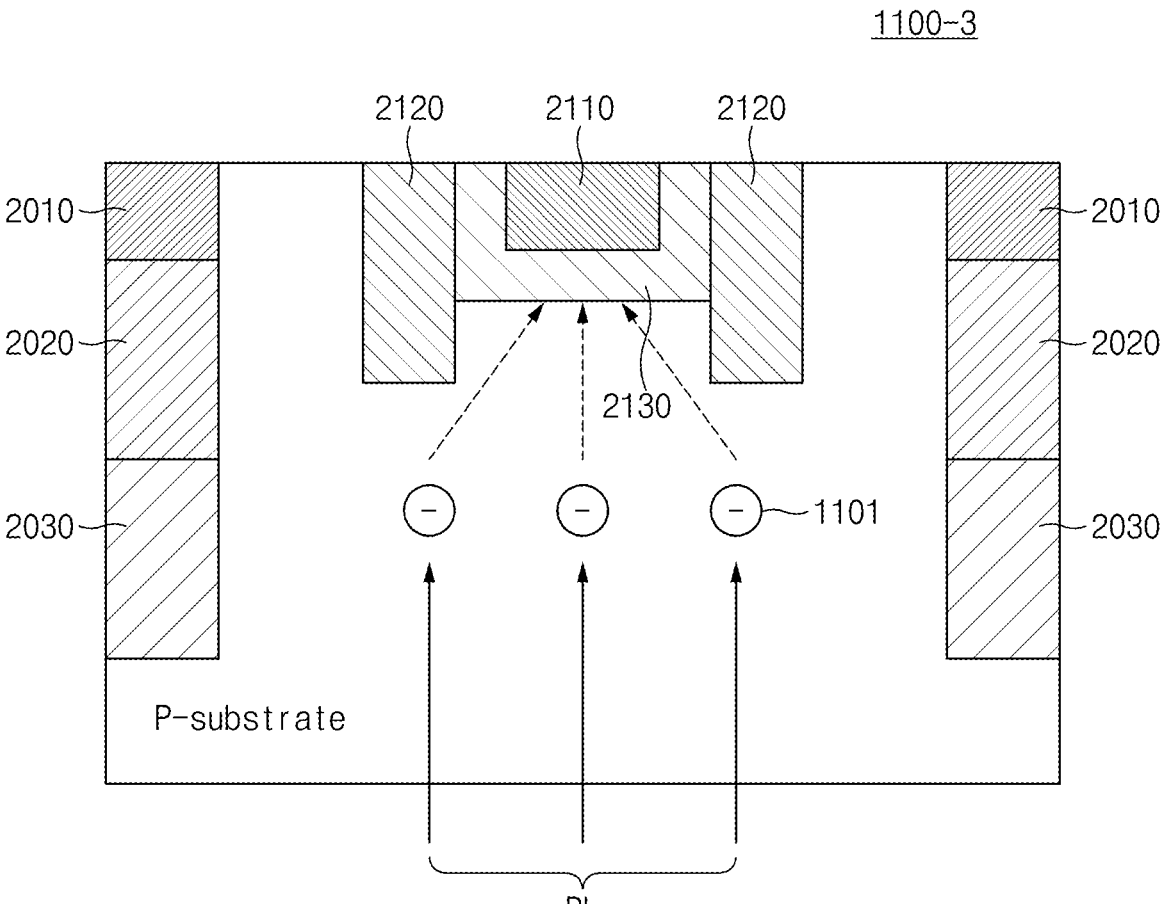

Although FIGS. 12A to 12C illustrate the modified examples of FIGS. 10A to 10C, respectively, other implementations are also possible, and substantially the same technical idea may be implemented in the modified examples of FIGS. 11A to 11C. That is, the third P-type region 2030 of each of the cross-sectional structures (1100-1 to 1100-3) may extend toward the center of each of the cross-sectional structures (1100-1 to 1100-3) while forming the opening region near the center of each of the cross-sectional structures (1100-1 to 1100-3).

Figure 13:
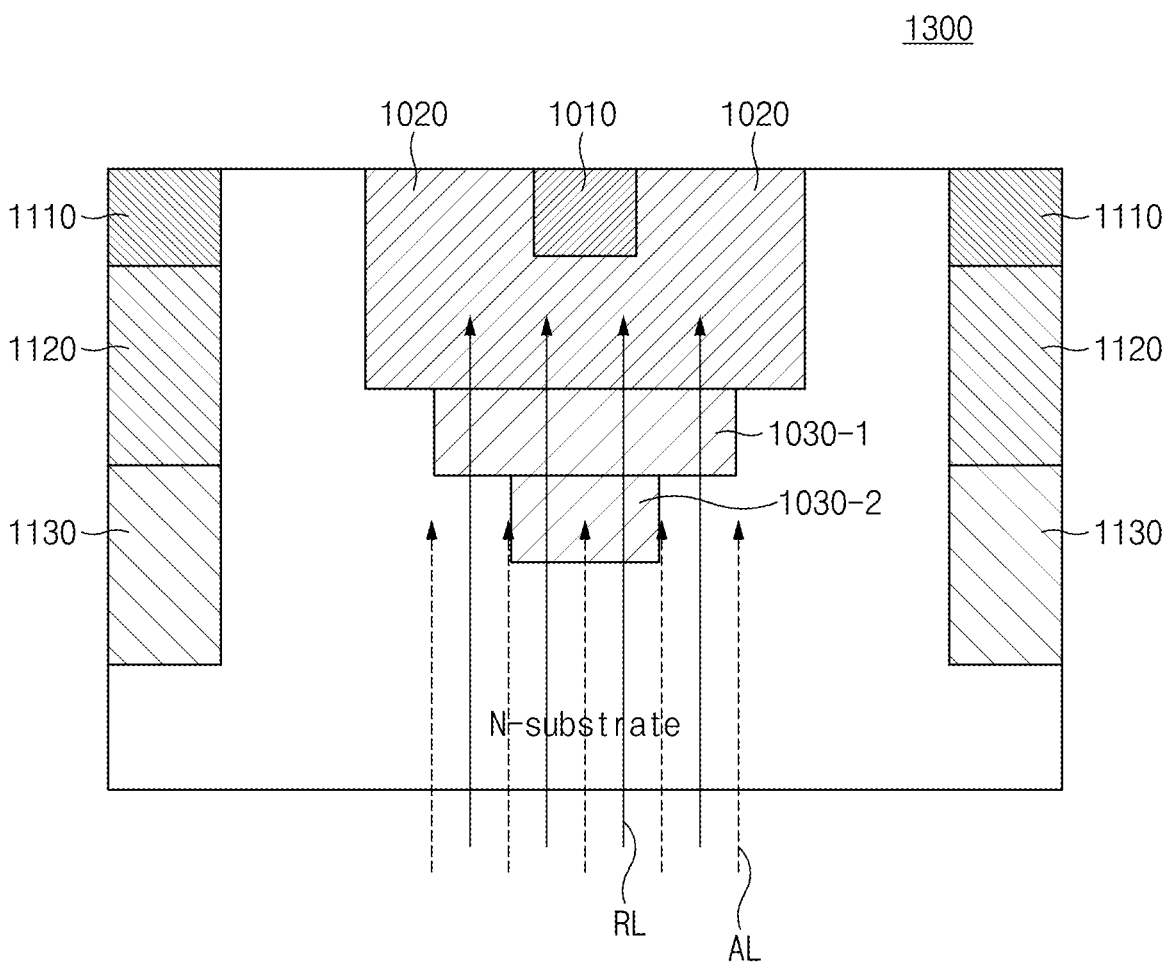
FIG. 13 is a diagram illustrating another example of a cross-sectional structure taken along any one of the first to third lines shown in FIGS. 9A to 9C based on some implementations of the disclosed technology.

FIG. 13 is a diagram illustrating another example of a cross-sectional structure taken along any one of the first to third lines (A-A', B-B, C-C') shown in FIGS. 9A to 9C based on some implementations of the disclosed technology.

Referring to FIGS. 10D and 13, a cross-sectional structure 1300 taken along any one of the first to third lines (A-A', B-B', C-C') of FIGS. 9A to 9C is schematically shown. The cross-sectional structure 1300 may correspond to a modified example of the cross-sectional structure 1000-4 shown in FIG. 10D.

The cross-sectional structure 1300 of FIG. 13 is substantially the same as the cross-sectional structure 1000-4 except for some differences, and the following description will focus on such differences.

The cross-sectional structure 1300 may include third P-type regions (1030-1, 1030-2) arranged vertically instead of the third P-type region 1030. The third P-type region 1030-1 may have a larger width than the third P-type region 1030-2 and may have a smaller width than the second P-type region 1020. That is, as the P-type regions (1020, 1030-1, 1030-2) are sequentially arranged in a vertical direction, the highest P-type region 1020 has the largest width, the intermediate P-type region 1030-1 has an intermediate width, and the lowest P-type region 1030-2 has the smallest width.

Since the reached light (RL) is infrared (IR) light, the reached light (RL) may have a relatively greater penetration depth within the semiconductor substrate as compared to the ambient light (AL) having a high proportion of visible light.

Since the multiplier regions corresponding to the P-type regions (1020, 1030-1, 1030-2) are regions where there is a high possibility of generating the avalanche process due to incident light, the P-type regions (1020, 1030-1, 1030-2) are arranged to have reduced width in the vertical direction, so that the number of occurrences of the avalanche process caused by the ambient light (AL) having a relatively small penetration depth can be minimized.

Additionally, the third P-type region 1030-1 may have a higher doping concentration than the third P-type region 1030-2 and may have a lower doping concentration than the second P-type region 1020. That is, the doping concentrations of the P-type regions (1020, 1030-1, 1030-2) sequentially stacked in the vertical direction may decrease in a downward direction of the stacked structure including the P-type regions (1020, 1030-1, 1030-2).

Accordingly, since the electric field from the P-type regions (1020, 1030-1, 1030-2) to the first P-type region 1010 increases, the intensity of the reached light (RL) incident near the center of the first SPAD (SPAD_C) decreases and a penetration depth of the reached light (RL) within the semiconductor substrate also decreases, so that the avalanche process caused by the reached light (RL) can be performed, thereby improving the sensitivity of the first SPAD (SLAD_C).

In addition, although the above-described embodiment has disclosed the example in which the number of the third P-type regions (1030-1, 1030-2) is set to 2 for convenience of description, other implementations are also possible, and it should be noted that three or more P-type regions may also be used as necessary.

Figure 11D:
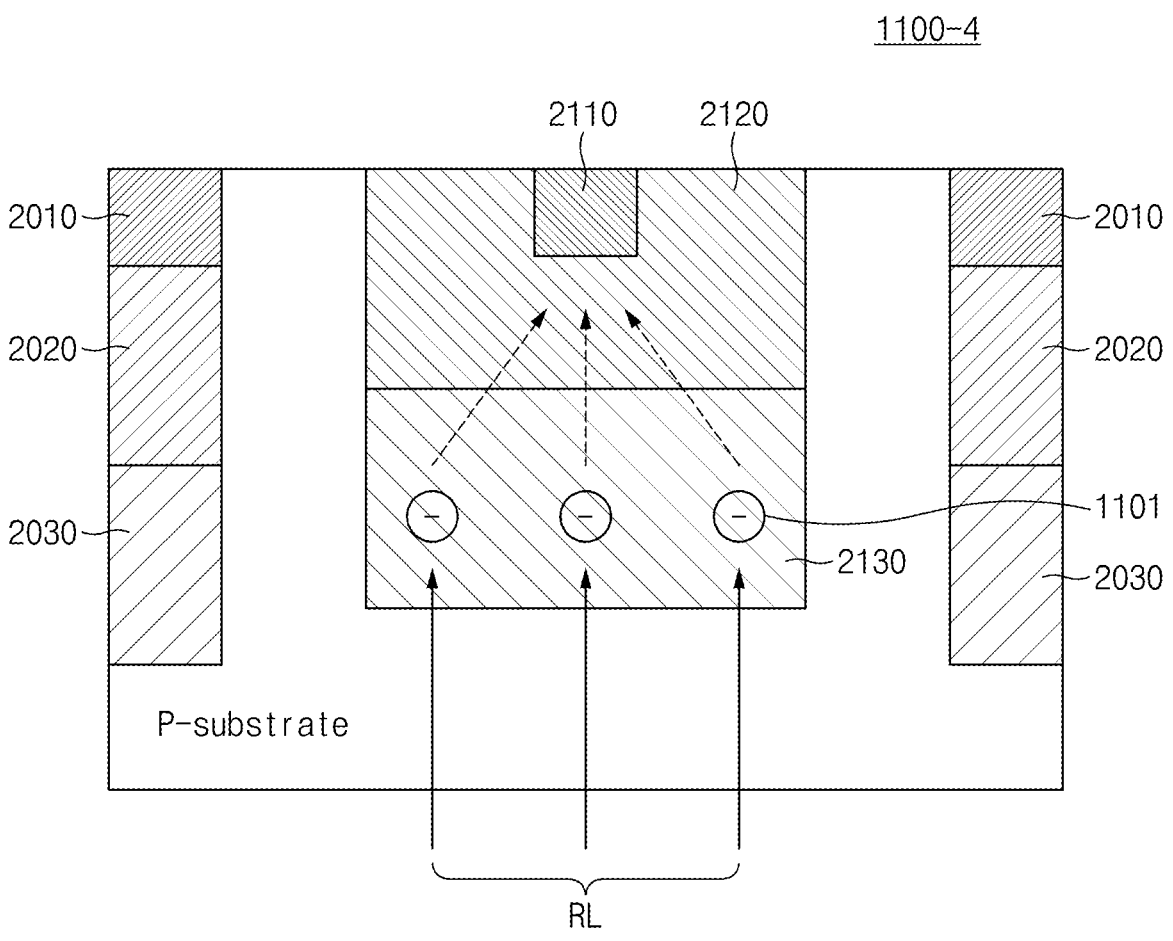
Figure 11E:
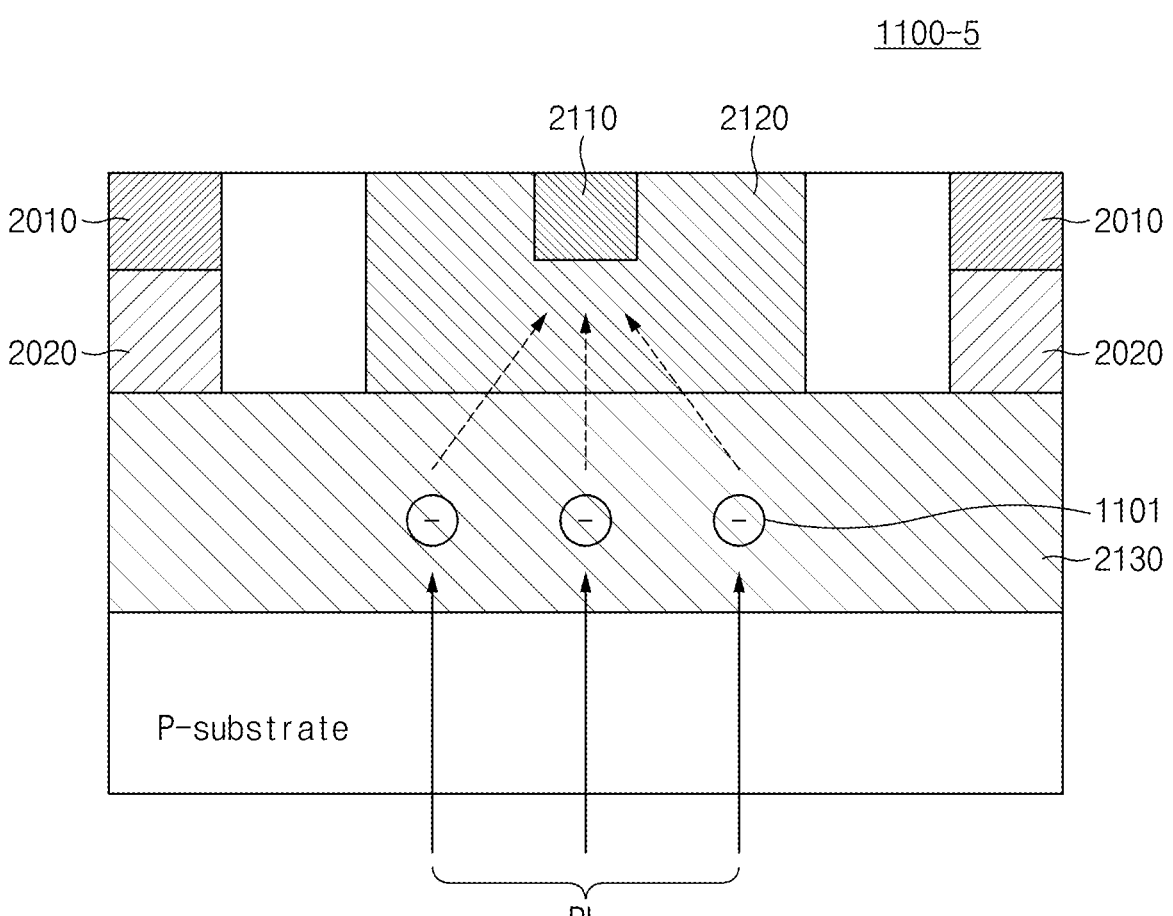
Figure 11F:
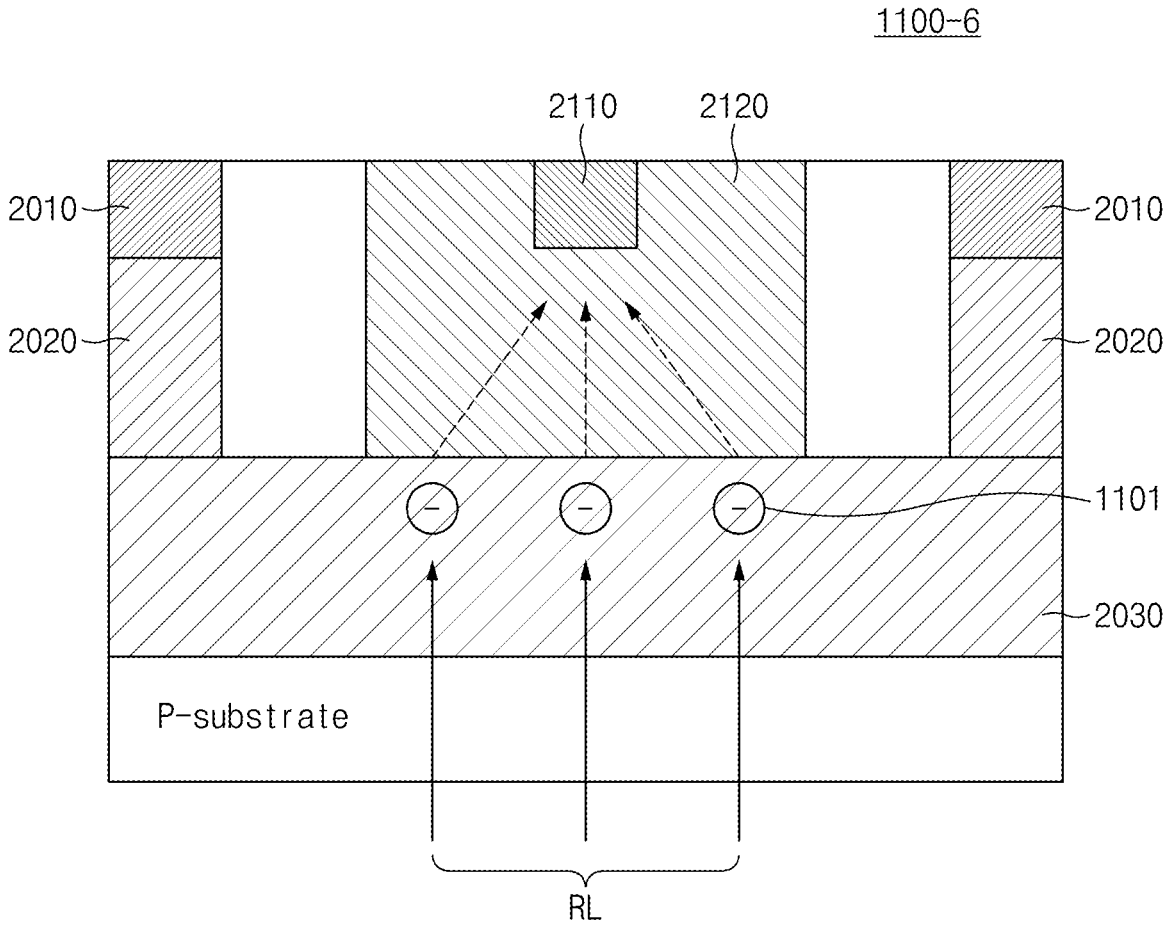

Although FIG. 13 has disclosed the modified embodiment of FIG. 10D, other implementations are also possible, and substantially the same technical idea may also be implemented in the modified embodiment of FIG. 11D. That is, the third N-type region 2130 of the cross-sectional structure 1100-4 may be replaced with two or more third N-type regions, the widths of which are gradually reduced in a downward direction from the top surface to the bottom surface of the third N-type region 1130, and the doping concentrations of which are also gradually reduced in the same downward direction.

Figure 14A:
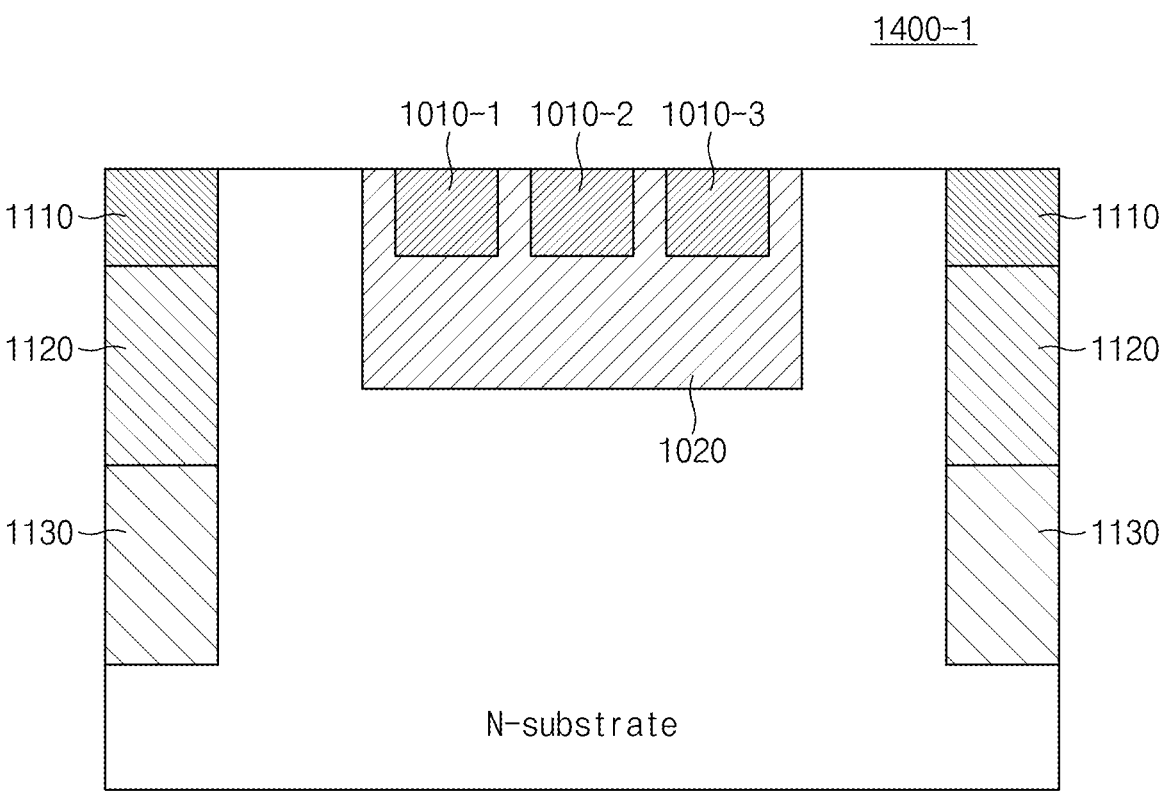
FIG. 14A is a diagram illustrating an example of a modified embodiment of the cross-sectional structure shown in FIG. 10A based on some implementations of the disclosed technology.

FIG. 14A is a diagram illustrating an example of a modified embodiment of the cross-sectional structure shown in FIG. 10A based on some implementations of the disclosed technology.

Referring to FIGS. 10A and 14A, a cross-sectional structure 1400-1 serving as a modified example of the cross-sectional structure 1000-1 of FIG. 10A is schematically shown.

The cross-sectional structure 1400-1 of FIG. 14A is substantially the same as the cross-sectional structure 1000-1 except for some differences, and the following description will focus on such differences.

The cross-sectional structure 1400-1 may include a plurality of first P-type regions (1010-1 to 1010-3) instead of one first P-type region 1010. The plurality of first P-type regions (1010-1 to 1010-3) may have substantially the same characteristics (e.g., same material, same function) as the first P-type region 1010.

The plurality of first P-type regions (1010-1 to 1010-3) may be arranged to be spaced apart at predetermined intervals within the second P-type region 1020. In addition, although FIG. 14A shows that the number of the first P-type regions (1010-1 to 1010-3) is set to 3 for convenience of description, other implementations are also possible, and at least two or at least four first P-type regions may also be included in the cross-sectional structure as necessary. The plurality of first P-type regions (1010-1 to 1010-3) may be physically isolated from each other, but may be electrically connected to each other to operate as one output node (ON). Electrical connection between the plurality of first P-type regions (1010-1 to 1010-3) may be made through a metal line of an interconnect layer (also called a wiring layer) disposed over the semiconductor substrate, but the scope of the disclosed technology is not limited thereto.

Compared to the case where one first P-type region having the same area as that of each of the first P-type regions (1010-1 to 1010-3) is disposed, a plurality of first P-type regions (1010-1 to 1010-3) is arranged, the cross-sectional structure 1400-1 includes the plurality of first P-type regions (1010-1 to 1010-3) so that the detection efficiency of carriers to be transmitted by the avalanche process can be further increased.

In addition, compared to the case where the plurality of first P-type regions (1010-1 to 1010-3) is interconnected to form one first P-type region, the first P-type regions (1010-1 to 1010-3) are arranged separately to reduce the detection efficiency of carriers to be transmitted by the avalanche process caused by ambient light (AL), thereby reducing the influence of noise.

Figure 14B:
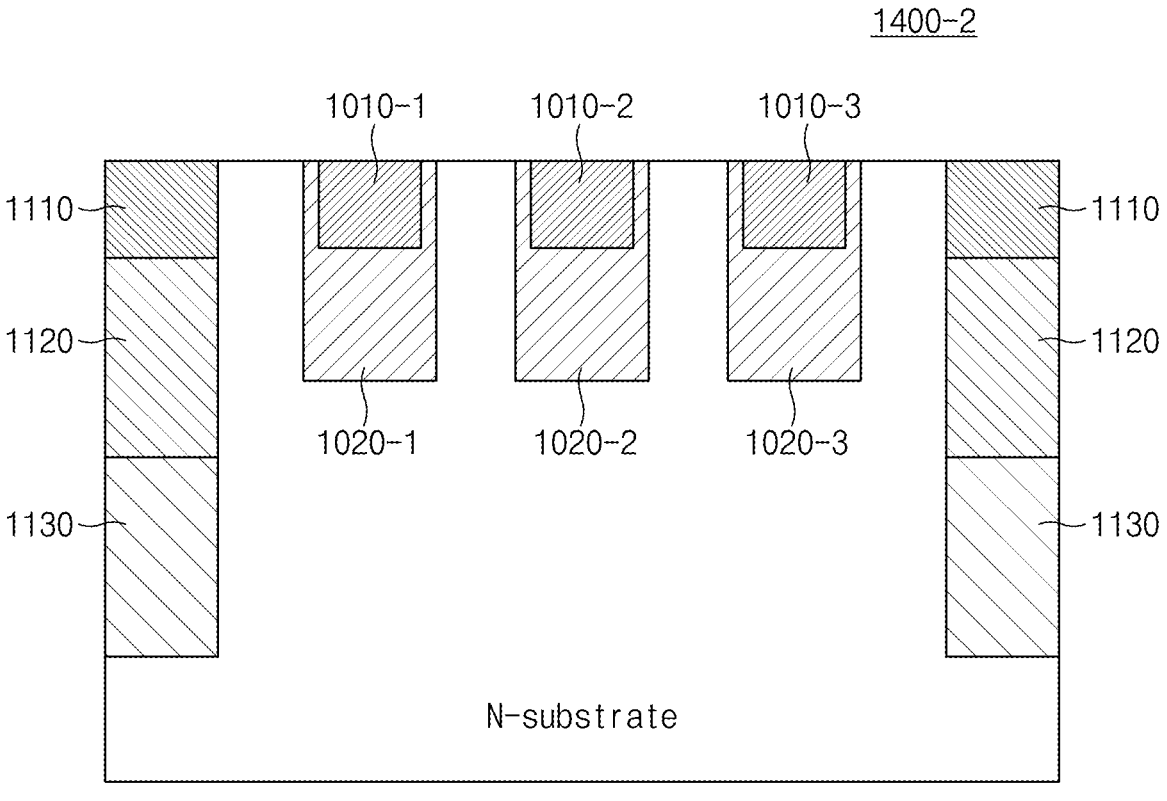
FIG. 14B is a diagram illustrating another example of a modified embodiment of the cross-sectional structure shown in FIG. 10A based on some implementations of the disclosed technology.

FIG. 14B is a diagram illustrating another example of a modified embodiment of the cross-sectional structure shown in FIG. 10A based on some implementations of the disclosed technology.

Referring to FIGS. 10A and 14B, a cross-sectional structure 1400-2 serving as a modified example of the cross-sectional structure 1000-1 of FIG. 10A is schematically shown.

The cross-sectional structure 1400-2 of FIG. 14B is substantially the same as the cross-sectional structure 1000-1 except for some differences, and the following description will focus on such differences.

The cross-sectional structure 1400-2 may include a plurality of first P-type regions (1010-1 to 1010-3) and a plurality of second P-type regions (1020-1 to 1020-3) instead of one first P-type region 1010 and one second P-type region 1020. The plurality of first P-type regions (1010-1 to 1010-3) may have substantially the same characteristics (e.g., same material, same function) as the first P-type region 1010. The plurality of second P-type regions (1020-1 to 1020-3) may have substantially the same characteristics (e.g., same material, same function) as the second P-type region 1020.

The plurality of first P-type regions (1010-1 to 1010-3) and the plurality of second P-type regions (1020-1 to 1020-3) may be arranged in pairs to be spaced apart at predetermined intervals within the N substrate. A first detection region composed of the first P-type region 1010-1 and the second P-type region 1020-1 surrounding the first P-type region 1010-1, a second detection region composed of the first P-type region 1010-2 and the second P-type region 1020-2 surrounding the first P-type region 1010-2, and a third detection region composed of the first P-type region 1010-3 and the second P-type region 1020-3 surrounding the first P-type region 1010-3 may be arranged to be spaced apart from each other by a predetermined distance. In addition, although FIG. 14B shows that the number of the detection regions is set to 3 for convenience of description, other implementations are also possible, and at least two or at least four detection regions may also be included in the cross-sectional structure as necessary. The plurality of first P-type regions (1010-1 to 1010-3) may be physically isolated from each other, but may be electrically connected to each other to operate as one output node (ON). Electrical connection between the plurality of first P-type regions (1010-1 to 1010-3) may be made through a metal line of an interconnect layer (i.e., a wiring layer) disposed over the semiconductor substrate, but the scope of the disclosed technology is not limited thereto.

Compared to the case where one detection region having the same area as that of each detection region is disposed, the cross-sectional structure 1400-2 includes the plurality of detection regions so that the detection efficiency of carriers to be transmitted by the avalanche process can be further increased.

In addition, compared to the case where the plurality of first P-type regions (1010-1 to 1010-3) is interconnected to form one first P-type region, the first P-type regions (1010-1 to 1010-3) are arranged separately for each detection region to reduce the detection efficiency of carriers to be transmitted by the avalanche process caused by ambient light (AL), thereby reducing the influence of noise.

Figure 15:
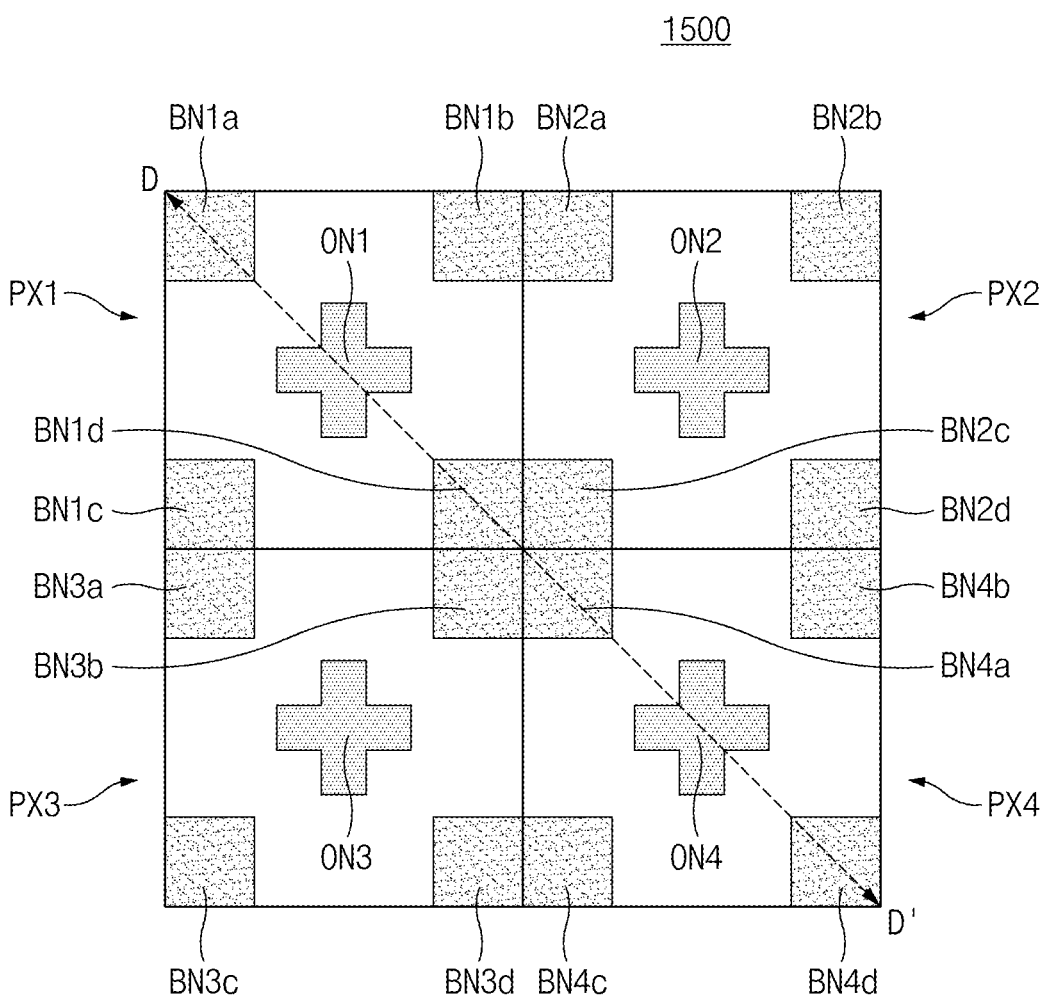
FIG. 15 is a diagram illustrating an example of a planar structure for a plurality of pixels based on some implementations of the disclosed technology.

FIG. 15 is a diagram illustrating an example of a planar structure for a plurality of pixels based on some implementations of the disclosed technology.

Referring to FIG. 15, a planar structure 1500 of the sensor layer of the first to fourth pixels (PX1 to PX4) is schematically shown. Each of the first to fourth pixels (PX1 to PX4) may correspond to a pixel (PX) included in the pixel array 110 of FIG. 1, and the planar structure 1500 of FIG. 15 will be described using the first to fourth pixels (PX1 to PX4) as an example, but substantially the same structure can also be applied to other pixels (PXs) as necessary.

The first to fourth pixels (PX1 to PX4) may be SPAD pixels of the same type (i.e., homogeneous SPAD pixels). In the implementation, SPADs respectively included in the first to fourth pixels (PX1 to PX4) may be the first SPAD (SPAD_C) or the second SPAD (SPAD_A), and may correspond to the same SPADs. When the SPAD included in each of the first to fourth pixels (PX1 to PX4) is the first SPAD (SPAD_C), each of the output nodes (ON1 to ON4) may correspond to the anode of the first SPAD (SPAD_C), and each of the biasing nodes (BN1*a* to BN4*d*) may correspond to the cathode of the first SPAD (SPAD_C). When the SPAD included in each of the first to fourth pixels (PX1 to PX4) is the second SPAD (SPAD_A), each of the output nodes (ON1 to ON4) may correspond to the cathode of the second SPAD (SPAD_A), and each of the biasing nodes (BN1a to BN4d) may correspond to the anode of the second SPAD (SPAD_A).

The first pixel (PX1) may include not only a cross-shaped first output node (ON1) disposed at the center of the first pixel (PX1), but also the biasing nodes (BN1a to BN1d) that are spaced apart from the first output node (ON1) by a predetermined distance and are disposed at vertices of the first pixel (PX1).

As the first biasing nodes (BN1a to BN1d) are disposed at vertices of the first pixel (PX1), the first output node (ON) may be formed in a cross shape to prevent the edge breakdown phenomenon that occurs when the distance between the first output node (ON1) and each of the first biasing nodes (BN1a to BN1d) becomes shorter than necessary.

Since the second to fourth pixels (PX2 to PX4) have a structure corresponding to the first pixel (PX1), duplicate descriptions thereof will herein be omitted for brevity.

As the biasing nodes (BN1a to BN4d) are disposed at vertices of the first to fourth pixels (PX1 to PX4), adjacent biasing nodes (e.g., BN1b and BN2a, or BN1d, BN2c, BN3b and BN4a) of adjacent pixels can be formed integrally.

As the adjacent biasing nodes are formed integrally, the difficulty of the process for forming the biasing nodes can be improved, and a design margin for interconnect lines (i.e., wiring) for supplying the biasing voltage can be secured. Additionally, as the number of biasing nodes to which biasing voltage must be supplied decreases, power consumption required to supply the biasing voltage may also decrease.

Figure 16:
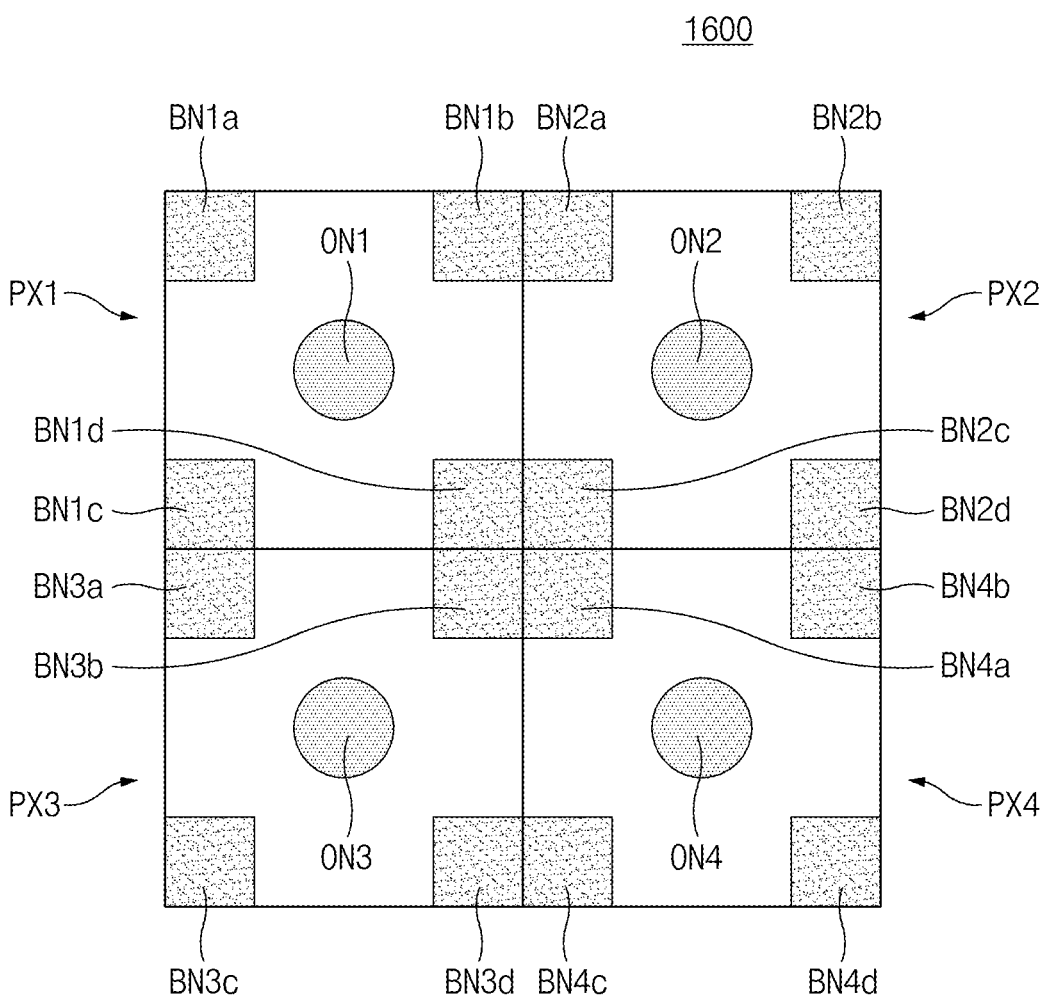
FIG. 16 is a diagram illustrating another example of a planar structure for a plurality of pixels based on some implementations of the disclosed technology.

FIG. 16 is a diagram illustrating another example of a planar structure for a plurality of pixels based on some implementations of the disclosed technology.

Referring to FIG. 16, a planar structure 1600 of the sensor layer of the first to fourth pixels (PX1 to PX4) is schematically shown. The planar structure 1600 is substantially the same as the planar structure 1500 except for some differences, and the following description will focus on such differences.

In the implementation as shown in FIG. 16, each of the first to fourth output nodes (ON1 to ON4) of the first to fourth pixels (PX1 to PX4) may have a circular shape.

In this implementation, as the first output node (ON1) has a circular shape, the circular first output node (ON1) may prevent the distance between the first output node (ON1) and each of the first biasing nodes (BN1a to BN1d) from being shortened than necessary, thereby minimizing the number of occurrences of the edge breakdown phenomenon. While the above description is provided for the first output node (ON1), the similar description can be applied for other output nodes, the second to fourth output nodes (ON2 to ON4).

Figure 17:
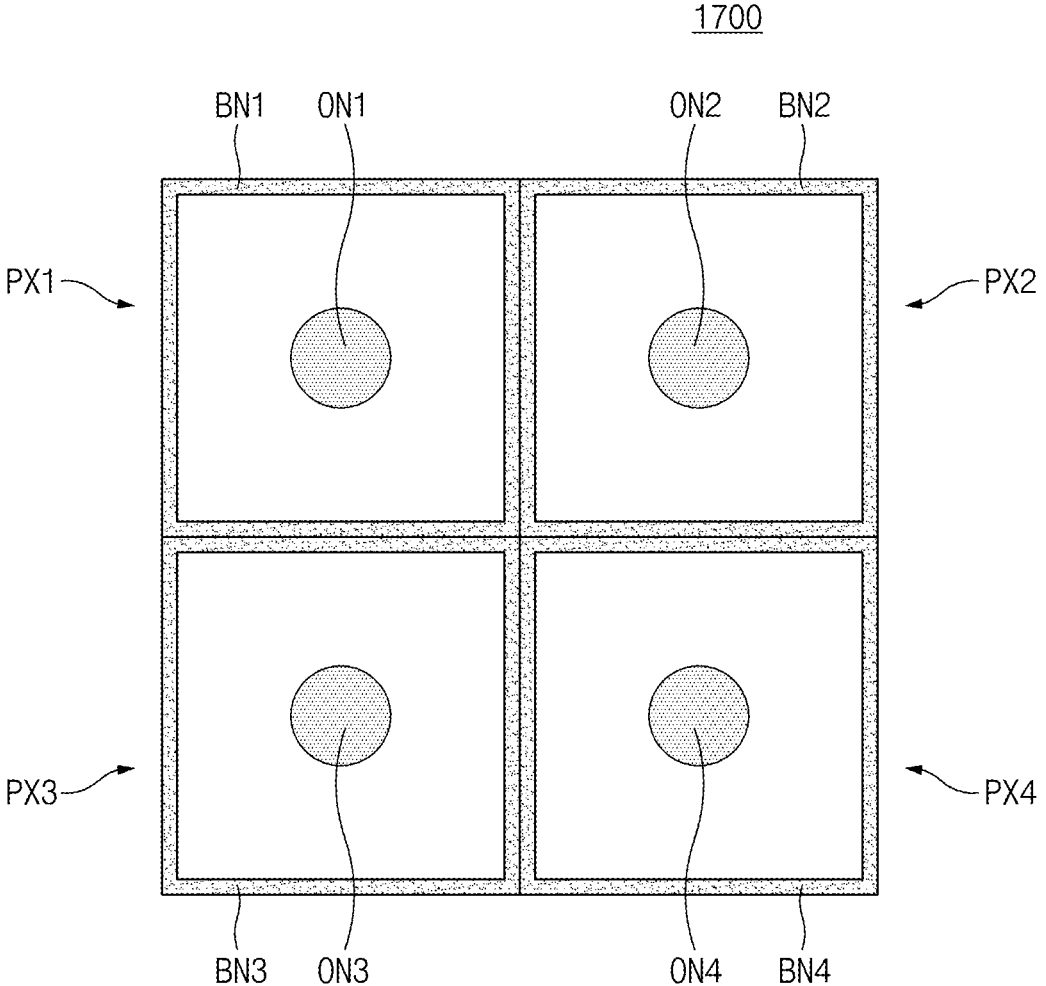
FIG. 17 is a diagram illustrating another example of a planar structure for a plurality of pixels based on some implementations of the disclosed technology.

FIG. 17 is a diagram illustrating another example of a planar structure for a plurality of pixels based on some implementations of the disclosed technology.

Referring to FIG. 17, a planar structure 1700 of the sensor layer of the first to fourth pixels (PX1 to PX4) is schematically shown. The planar structure 1700 is substantially the same as the planar structure 1500 except for some differences, and the following description will focus on such differences.

Each of the first to fourth output nodes (ON1 to ON4) of the first to fourth pixels (PX1 to PX4) may have a circular shape.

The first biasing node (BN1) of the first pixel (PX1) may be spaced apart from the output node (ON1) and disposed in the periphery of the output node (ON1). In the implementation, the first biasing node (BN1) may be arranged along a border (or edge) of the first pixel (PX1). In the implementation, the first biasing node (BN1) may surround the output node (ON1). The second biasing node (BN2) of the second pixel (PX2) may be spaced apart from the output node (ON2) and disposed in the periphery of the output node (ON2). In the implementation, the second biasing node (BN2) may be arranged along a border (or edge) of the second pixel (PX2). In the implementation, the second biasing node (BN2) may surround the output node (ON2). The third biasing node (BN3) of the third pixel (PX3) may be spaced apart from the output node (ON3) and disposed in the periphery of the output node (ON3). In the implementation, the third biasing node (BN3) may be arranged along a border (or edge) of the third pixel (PX3). In the implementation, the third biasing node (BN3) may surround the output node (ON3). The fourth biasing node (BN4) of the fourth pixel (PX4) may be spaced apart from the output node (ON4) and disposed in the periphery of the output node (ON4). In the implementation, the fourth biasing node (BN4) may be arranged along a border (or edge) of the fourth pixel (PX4). In the implementation, the fourth biasing node (BN4) may surround the output node (ON4).

As the biasing nodes (BN1 to BN4) are disposed along the border of the first to fourth pixels (PX1 to PX4), adjacent biasing nodes (e.g., BN1 to BN4) of adjacent pixels may be formed integrally.

Figure 18:
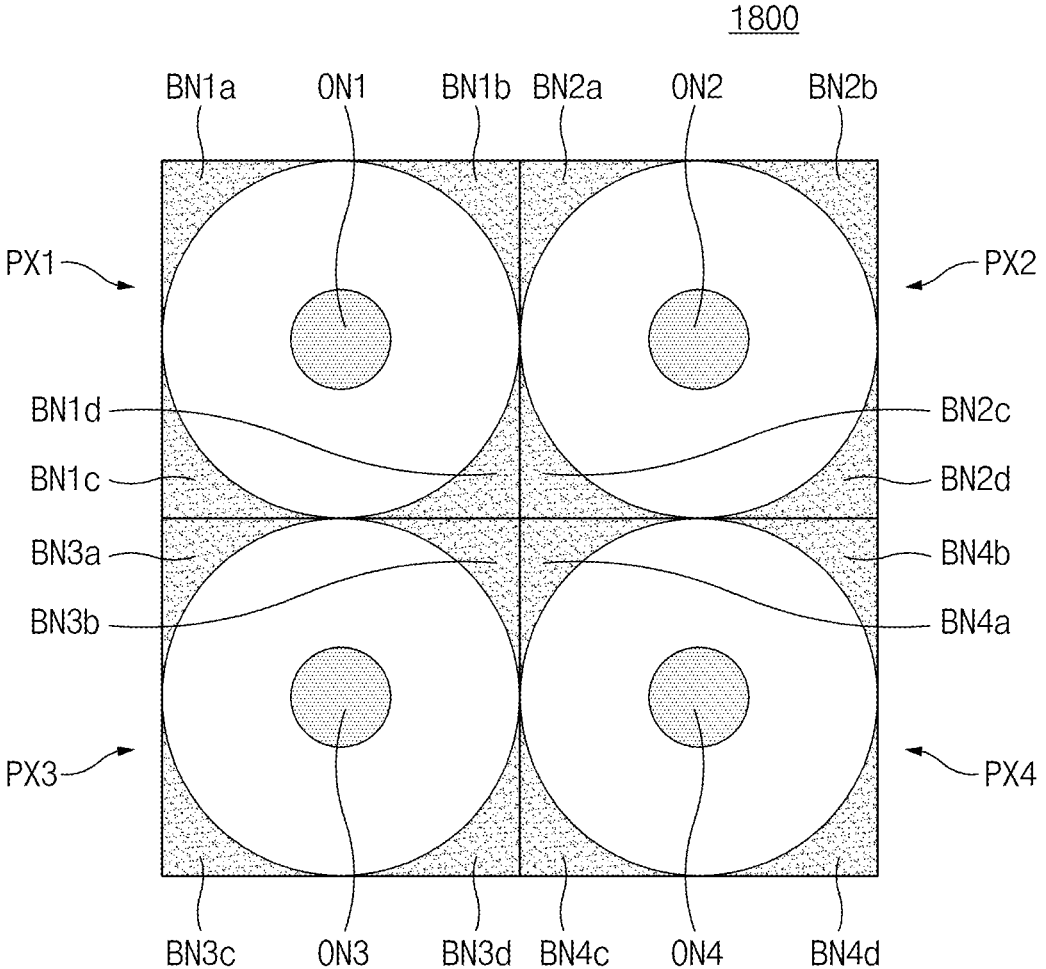
FIG. 18 is a diagram illustrating another example of a planar structure for a plurality of pixels based on some implementations of the disclosed technology.

FIG. 18 is a diagram illustrating another example of a planar structure for a plurality of pixels based on some implementations of the disclosed technology.

Referring to FIG. 18, a planar structure 1800 of the sensor layer of the first to fourth pixels (PX1 to PX4) is schematically shown. The planar structure 1800 is substantially the same as the planar structure 1500 except for some differences, and the following description will focus on such differences.

Each of the first to fourth output nodes (ON1 to ON4) of the first to fourth pixels (PX1 to PX4) may have a circular shape.

The first to fourth biasing nodes (BN1a to BN4d) of the first to fourth pixels (PX1 to PX4) may be spaced apart from the output nodes (ON1~ON4) and arranged at vertices of the corresponding pixels (PX1 to PX4). In the implementation, the first to fourth biasing nodes (BN1a to BN4d) may surround at least some portions of the output nodes (ON1 to ON4). In the implementation, the first to fourth biasing nodes (BN1a, BN1b, BN1c, BN1d) of the first pixel (PX1) may form a circular shape such that the distance to the corresponding output node (ON1) becomes constant. In the implementation, the first to fourth biasing nodes (BN1a, BN1b, BN1c, BN1d) of the first pixel (PX1) may have internal boundaries that are arranged along the circular shape. The first to fourth biasing nodes (BN1a, BN1b, BN1c, BN1d) of the first pixel (PX1) may have external boundaries that are arranged along the edges of the corresponding pixels (PX1 to PX4). The first to fourth biasing nodes (BN2a, BN2b, BN2c, BN2d) of the second pixel (PX2) may form a circular shape such that the distance to the corresponding output node (ON2) becomes constant. The first to fourth biasing nodes (BN3a, BN3b, BN3c, BN3d) of the third pixel (PX3) may form a circular shape such that the distance to the corresponding output node (ON3) becomes constant. The first to fourth biasing nodes (BN4a, BN4b, BN4c, BN4d) of the fourth pixel (PX4) may form a circular shape such that the distance to the corresponding output node (ON4) becomes constant. Accordingly, it is possible to prevent the edge breakdown phenomenon that occurs when the distance between the corresponding output nodes (ON1 to ON4) and the first to fourth biasing nodes (BN1a to BN4d) becomes shorter than necessary at a specific location.

As the biasing nodes (BN1a to BN4d) are disposed at vertices of the first to fourth pixels (PX1 to PX4), adjacent biasing nodes of adjacent pixels (e.g., BN1b and BN2a, or BN1d, BN2c, BN3b and BN4a) may be formed integrally.

Figure 19:
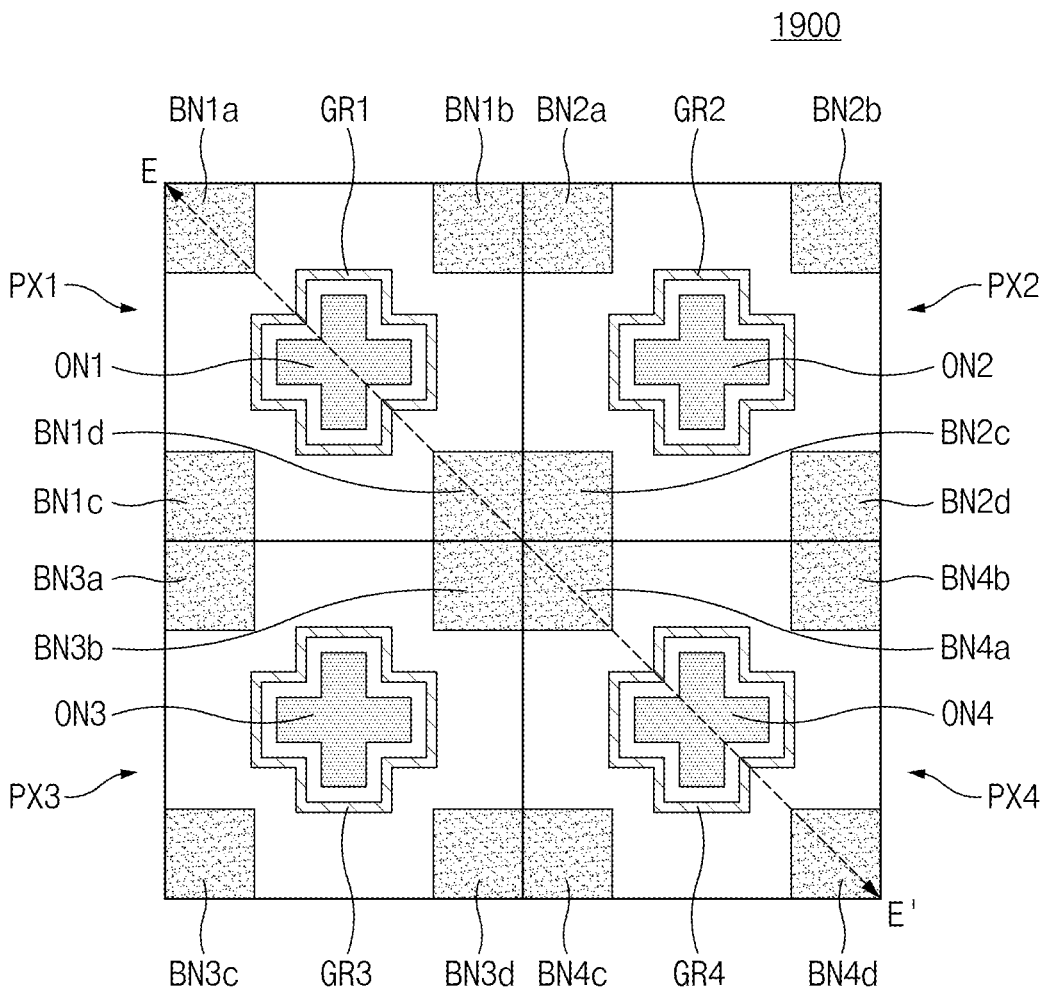
FIG. 19 is a diagram illustrating another example of a planar structure for a plurality of pixels based on some implementations of the disclosed technology.

FIG. 19 is a diagram illustrating another example of a planar structure for a plurality of pixels based on some implementations of the disclosed technology.

Referring to FIG. 19, a planar structure 1900 of the sensor layer of the first to fourth pixels (PX1 to PX4) is schematically shown. The planar structure 1900 is substantially the same as the planar structure 1500 except for some differences, and the following description will focus on such differences.

In the planar structure 1900, the first to fourth pixels (PX1 to PX4) may further include first to fourth guard-rings (GR1 to GR4), respectively. The first to fourth guard-rings (GR1 to GR4) may surround the first to fourth output nodes (ON1 to ON4), and may be spaced by a predetermined distance from the first to fourth output nodes (ON1 to ON4). The first guard-ring (GR1) may surround the first output node (ON1) and may be spaced by a predetermined distance from the first output node (ON1), the second guard-ring (GR2) may surround the second output node (ON2) and may be spaced by a predetermined distance from the second output node (ON2), the third guard-ring (GR3) may surround the third output node (ON3) and may be spaced by a predetermined distance from the third output node (ON3), and the fourth guard-ring (GR4) may surround the fourth output node (ON4) and may be spaced by a predetermined distance from the fourth output node (ON4).

The first to fourth guard-rings (GR1 to GR4) may electrically separate the first to fourth output nodes (ON1 to ON4) from the adjacent first to fourth biasing nodes (BN1a to BN4d), and may thus prevent the edge breakdown phenomenon.

The conductivity types of the first to fourth guard-rings (GR1 to GR4) may be the same as those of the first to fourth output nodes (ON1 to ON4), or may be the same as those of the first to fourth biasing nodes (BN1a to BN4d).

Figure 20:
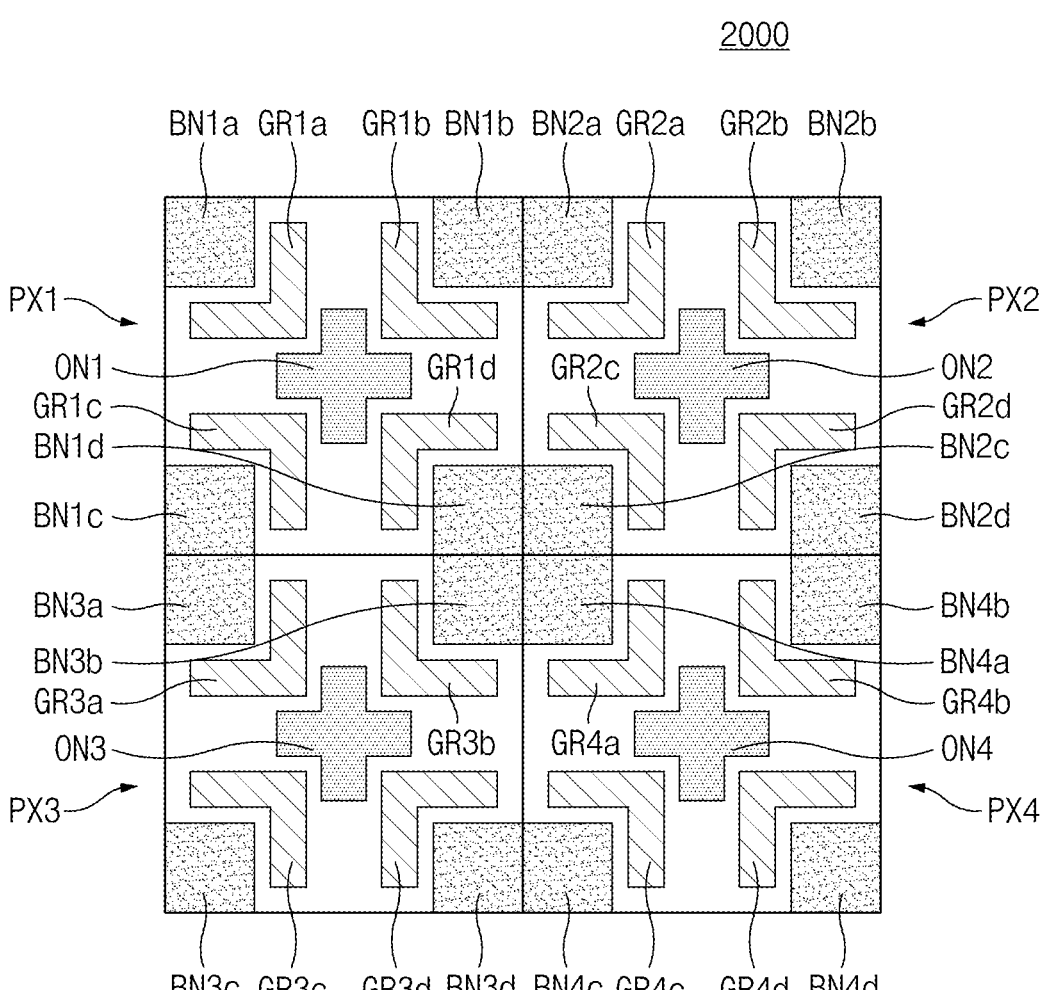
FIG. 20 is a diagram illustrating another example of a planar structure for a plurality of pixels based on some implementations of the disclosed technology.

FIG. 20 is a diagram illustrating another example of a planar structure of a plurality of pixels based on some implementations of the disclosed technology.

Referring to FIG. 20, a planar structure 2000 of the sensor layer of the first to fourth pixels (PX1 to PX4) is schematically shown. The planar structure 2000 is substantially the same as the planar structure 1500 except for some differences, and the following description will focus on such differences.

In the planar structure 2000, the first to fourth pixels (PX1 to PX4) may further include first to fourth guard-rings (GR1a to GR4d), respectively.

In some implementations, each of the first guard-rings (GR1a to GR1d) has two portions extending in different directions. For example, in the implementation as shown in FIG. 20, each of the first guard-rings (GR1a to GR1d) has the first portion extending in a horizontal direction and the second portion extending in a vertical direction. In the example, each of the first guard-rings (GR1a to GR1d) may have a clamp shape surrounding at least some portions of each of the first biasing nodes (BN1a to BN1d), and may be spaced a predetermined distance from each of the first biasing nodes (BN1a to BN1d). In more detail, the first guard-ring (GR1a) may have a clamp shape surrounding the first biasing node (BN1a) and may be spaced a predetermined distance from the first biasing node (BN1a). The first guard-ring (GR1b) may have a clamp shape surrounding the first biasing node (BN1b) and may be spaced a predetermined distance from the first biasing node (BN1b). The first guard-ring (GR1c) may have a clamp shape surrounding the first biasing node (BN1c) and may be spaced a predetermined distance from the first biasing node (BN1c). The first guard-ring (GR1d) may have a clamp shape surrounding the first biasing node (BN1d) and may be spaced a predetermined distance from the first biasing node (BN1d).

The first guard-rings (GR1a to GR1d) may electrically separate the first biasing nodes (BN1a to BN1d) from the adjacent first output node (ON1), and may thus prevent the edge breakdown phenomenon.

The conductivity types of the first guard-rings (GR1a~ GR1d) may be the same as those of the first output node (ON1), or may be the same as those of the first biasing nodes (BN1a to BN1d).

Each of the second to fourth guard-rings (GR2a to GR4d) may have a structure and conductivity type corresponding to the first guard-rings (GR1a to GR1d).

Figure 21:
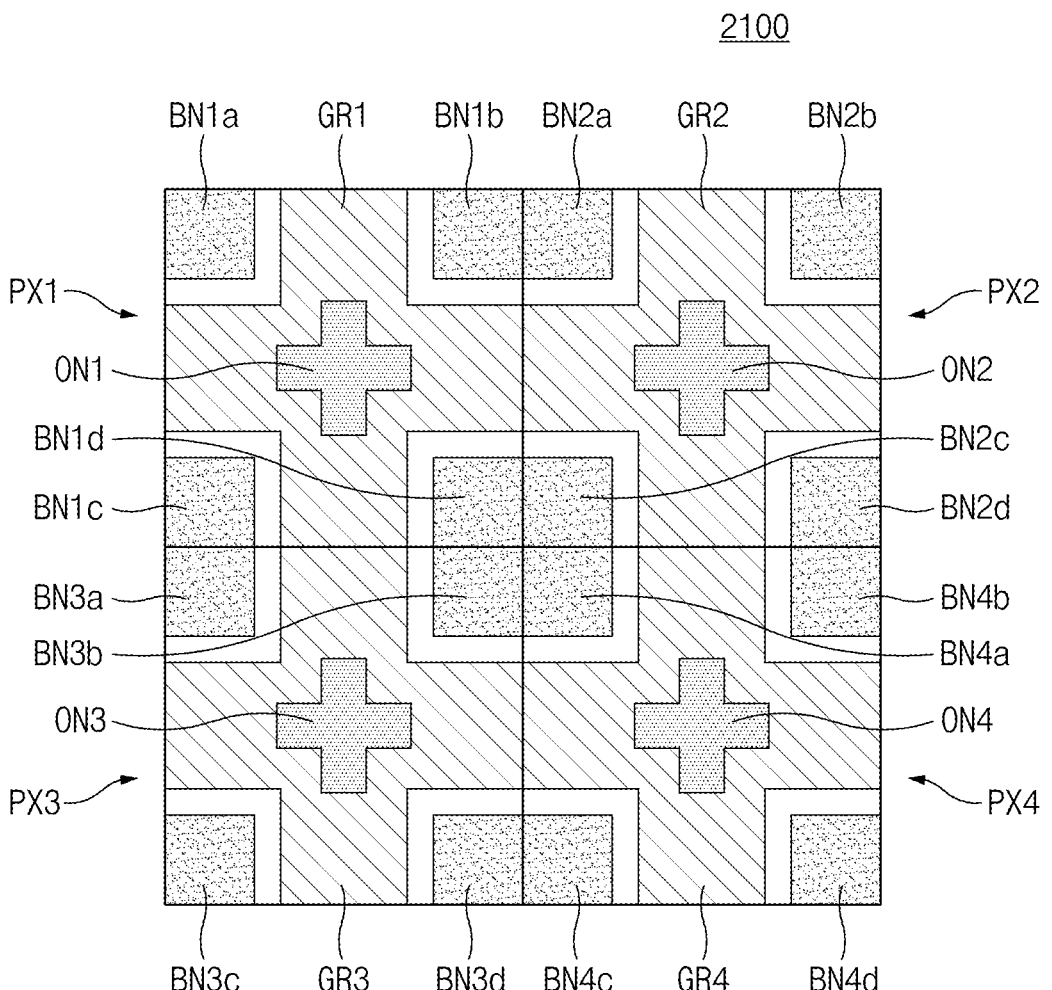
FIG. 21 is a diagram illustrating another example of a planar structure for a plurality of pixels based on some implementations of the disclosed technology.

FIG. 21 is a diagram illustrating another example of a planar structure for a plurality of pixels based on some implementations of the disclosed technology.

Referring to FIG. 21, a planar structure 2100 of the sensor layer of the first to fourth pixels (PX1 to PX4) is schematically shown. The planar structure 2100 is substantially the same as the planar structure 1500 except for some differences, and the following description will focus on such differences.

In the planar structure 2100, the first to fourth pixels (PX1 to PX4) may further include first to fourth guard-rings (GR1 to GR4), respectively. In more detail, the first guard-ring (GR1) may be arranged to contact the first output node (ON1) while surrounding the first output node (ON1). The second guard-ring (GR2) may be arranged to contact the second output node (ON2) while surrounding the second output node (ON2). The third guard-ring (GR3) may be arranged to contact the third output node (ON3) while surrounding the third output node (ON3). The fourth guard-ring (GR4) may be arranged to contact the fourth output node (ON4) while surrounding the fourth output node (ON4). In addition, each of the first to fourth guard-rings (GR1 to GR4) may extend in up, down, left, and right directions based on each of the first to fourth output nodes (ON1 to ON4) and may have an overall shape similar to a cross shape. Accordingly, the first to fourth guard-rings (GR1 to GR4) may be formed integrally.

The first to fourth guard-rings (GR1 to GR4) may electrically separate the first to fourth output nodes (ON1 to ON4) from the first to fourth biasing nodes (BN1a to BN4d), and may thus prevent the edge breakdown phenomenon.

The conductivity types of the first to fourth guard-rings (GR1 to GR4) may be the same as those of the first to fourth output nodes (ON1 to ON4). Accordingly, the multiplier region may be enlarged, thereby improving the sensitivity of the SPAD.

The guard-rings shown in FIGS. 19 to 21 have been described as examples of guard-rings applied to the planar structure 1500 of FIG. 15, but the guard-rings shown in FIGS. 19 to 21 can also be similarly applied to the planar structures (1600 to 1800) of FIGS. 16 to 18.

Figure 22A:
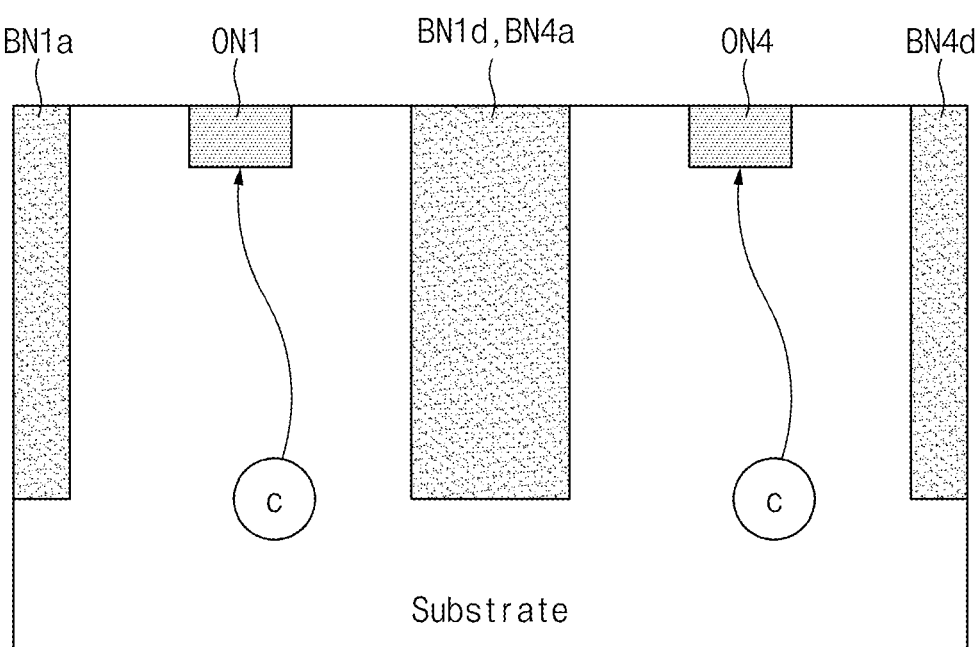
FIG. 22A is a diagram illustrating an example of a cross-sectional structure taken along the fourth line shown in FIG. 15 based on some implementations of the disclosed technology.

FIG. 22A is a diagram illustrating an example of a cross-sectional structure taken along the fourth line (D-D') shown in FIG. 15 based on some implementations of the disclosed technology.

Referring to FIGS. 15 and 22A, a cross-sectional structure 2200-1 of the first pixel (PX1) and the fourth pixel (PX4) taken along the fourth line (D-D') of FIG. 15 is schematically shown. Although FIG. 22A illustrates the cross-sectional structure 2200-1 of the first pixel (PX1) and the fourth pixel (PX4) taken along the fourth line (D-D') of FIG. 15 for convenience of description, as the cross-sectional structure 2200-1 is substantially the same as the planar structures of FIGS. 16 to 18 except for some differences, the following description will focus on such differences.

The cross-sectional structure 2200-1 may include a first output node (ON1) and a fourth output node (ON4) arranged to be spaced apart from each other within the semiconductor substrate, a first biasing node (BN1*a*) arranged on the left side of the first output node (ON1), first and fourth biasing nodes (BN1*d*, BN4*a*) disposed between the first output node (ON1) and the fourth output node (ON4), and a fourth biasing node (BN4*d*) arranged on the right side of the fourth output node (ON4).

Each of the first and fourth biasing nodes (BN1*a*, BN1*d*, BN4*a*, BN4*d*) may have a greater depth than each of the first and fourth output nodes (ON1, ON4). The first and fourth biasing nodes (BN1*a*, BN1*d*, BN4*a*, BN4*d*) are formed at a deep position close to the bottom surface of the semiconductor substrate, such that movement of carriers (C) generated in a specific pixel is interrupted, thereby contributing to pixel isolation from adjacent pixels.

Carriers (C) generated by the avalanche process due to photons incident onto a specific pixel can be transmitted to the corresponding output nodes (ON1, ON4) by the electric fields of the first and fourth biasing nodes (BN1*a*, BN1*d*, BN4*a*, BN4*d*) formed at deep positions located close to the bottom surface of the semiconductor substrate, so that the resultant carriers (C) can be detected.

Figure 22B:
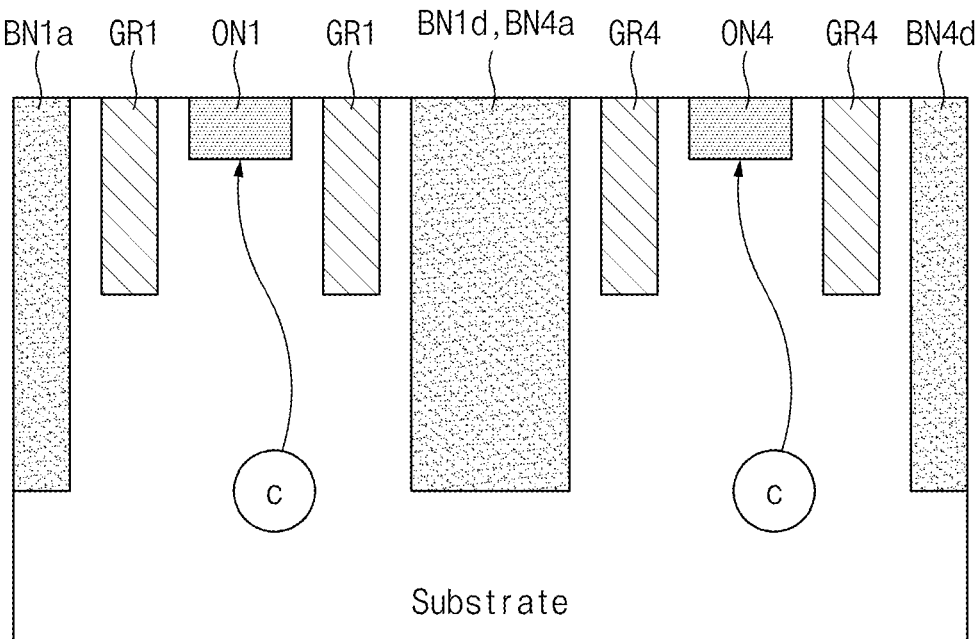
FIG. 22B is a diagram illustrating an example of a cross-sectional structure taken along the fifth line shown in FIG. 19 based on some implementations of the disclosed technology.

FIG. 22B is a diagram illustrating an example of a cross-sectional structure taken along the fifth line (E-E') shown in FIG. 19 based on some implementations of the disclosed technology.

Referring to FIGS. 19 and 22B, a cross-sectional structure 2200-2 of the first pixel (PX1) and the fourth pixel (PX4) taken along the fifth line (E-E') of FIG. 19 is schematically shown.

Although FIG. 22B illustrates the cross-sectional structure 2200-2 of the first pixel (PX1) and the fourth pixel (PX4) taken along the fifth line (E-E') of FIG. 19 for convenience of description, as the cross-sectional structure 2200-2 is substantially the same as the planar structures of FIGS. 20 and 21 except for some differences, the following description will focus on such differences.

The cross-sectional structure 2200-2 may include a first output node (ON1) and a fourth output node (ON4) arranged to be spaced apart from each other within the semiconductor substrate, a first biasing node (BN1*a*) arranged on the left side of the first output node (ON1), first and fourth biasing nodes (BN1*d*, BN4*a*) disposed between the first output node (ON1) and the fourth output node (ON4), a fourth biasing node (BN4*d*) arranged on the right side of the fourth output node (ON4), a first guard-ring (GR1) disposed on both left and right sides of the first output node (ON1), and a fourth guard-ring (GR4) disposed on both left and right sides of the fourth output node (ON4).

The first and fourth output nodes (ON1, ON4) and the first and fourth biasing nodes (BN1*a*, BN1*d*, BN4*a*, BN4*d*) of FIG. 22B are substantially the same as those of FIG. 22A, and as such duplicate descriptions thereof will herein be omitted.

The depth of each of the first and fourth guard-rings (GR1, GR4) may be smaller than the depth of each of the first and fourth biasing nodes (BN1*a*, BN1*d*, BN4*a*, BN4*d*), and may be greater than the depth of each of the first and fourth output nodes (ON1, ON4).

The first and fourth guard-rings (GR1, GR4) may electrically separate the first and fourth output nodes (ON1, ON4) from the first and fourth biasing nodes (BN1*a*, BN1*d*, BN4*a*, BN4*d*), and may thus prevent the edge breakdown phenomenon.

Figure 23A:
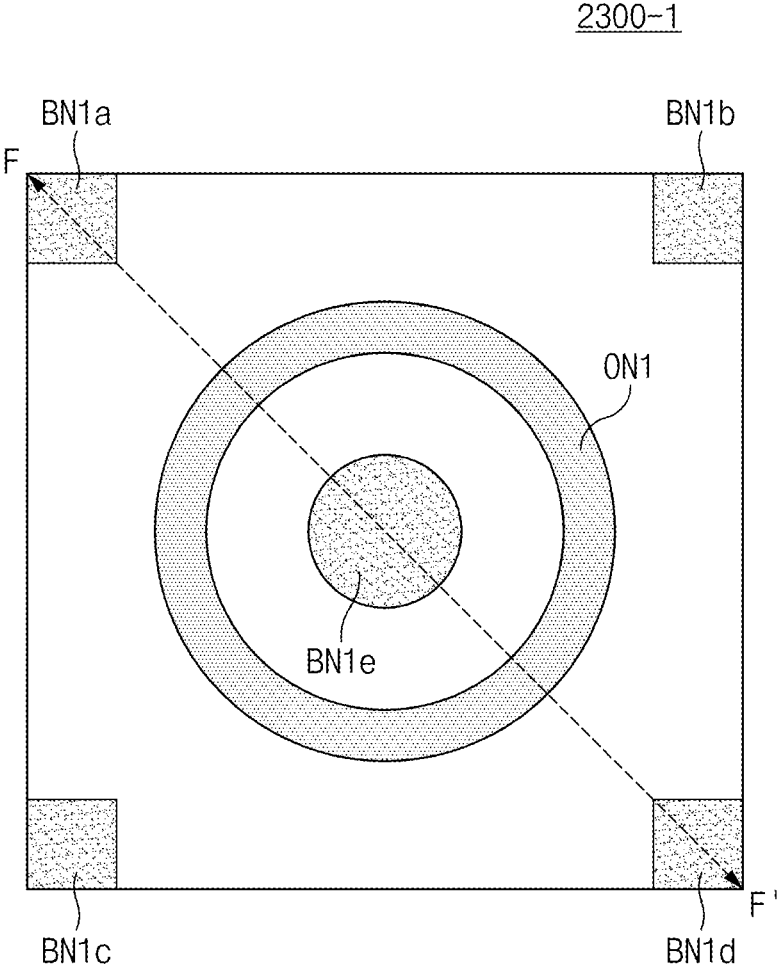
FIG. 23A is a diagram illustrating an example of a planar structure for a pixel included in the pixel array based on some implementations of the disclosed technology.

FIG. 23A is a diagram illustrating an example of a planar structure for a pixel included in the pixel array based on some implementations of the disclosed technology.

Referring to FIGS. 16 and 23A, a planar structure 2300-1 of the sensor array of the pixel (PX) included in the pixel array 110 is schematically shown.

The planar structure 2300-1 will hereinafter be described by taking an embodiment modified based on the first pixel (PX1) of FIG. 16 as an example, but the technical idea of the disclosed technology can also be substantially equally applied to other pixels shown in FIGS. 15 to 21.

The planar structure 2300-1 may include a plurality of first biasing nodes (BN1*a*~ BN1*d*) disposed at vertices of the planar structure 2300-1, a circular first biasing node (BN1*e*) disposed at the center of the planar structure 2300-1, and the first output node (ON1) surrounding the first biasing node (BN1*e*).

That is, unlike the first pixel (PX1) of FIG. 16, the first biasing node (BN1*e*) may be added to a pixel including the planar structure 2300-1 and may be disposed at the center of the pixel. The first biasing node (BN1*e*) may be defined as a central biasing node.

The first output node (ON1) may be spaced a predetermined distance from the first biasing node (BN1*e*) and may have a circular ring shape surrounding the first biasing node (BN1*e*). In the example of FIG. 23A, since the first biasing node (BN1*e*) has a circular shape, the first output node (ON1) may have a circular ring shape such that the distance between the first output node (ON1) and the first biasing node (BN1*e*) can be kept constant.

The scope of the disclosed technology is not limited thereto, and the first output node (ON1) may have a ring shape corresponding to the shape of the first biasing node (BN1*e*) such that the distance between the first output node (ON1) and the first biasing node (BN1*e*) can be kept constant.

Figure 23B:
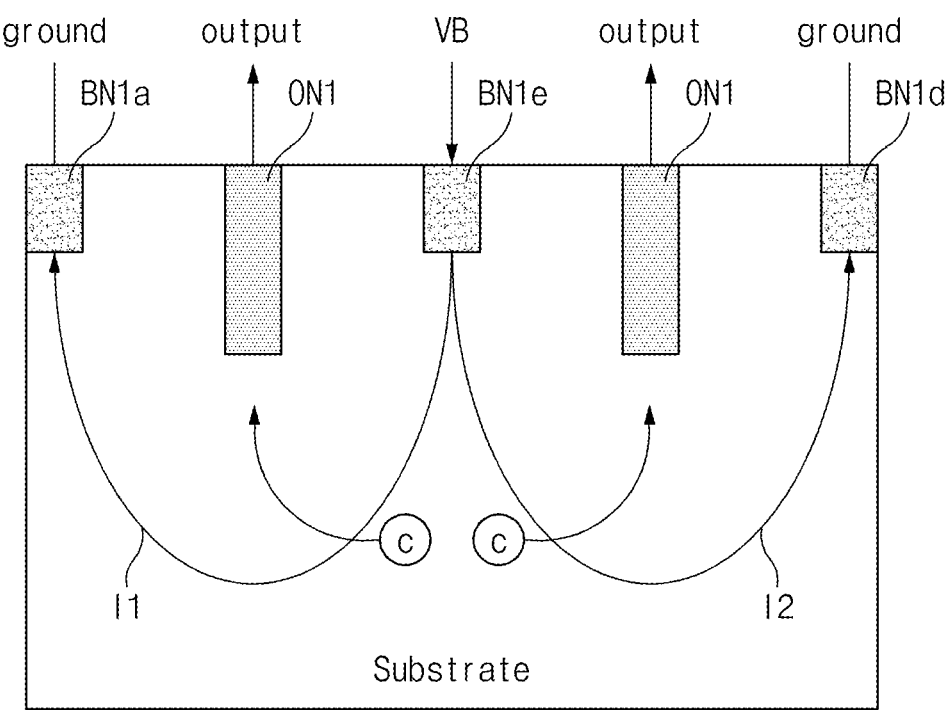
FIG. 23B is a cross-sectional view illustrating an example of the planar structure shown in FIG. 23A based on some implementations of the disclosed technology.

FIG. 23B is a cross-sectional view illustrating an example of the planar structure shown in FIG. 23A based on some implementations of the disclosed technology.

Referring to FIGS. 23A and 23B, a cross-sectional structure 2300-2 obtained when the planar structure 2300-1 of FIG. 23A is taken along the sixth line (F-F') of FIG. 23A is schematically shown. Although FIG. 23B illustrates the cross-sectional structure 2300-2 taken along a backslash ('\') direction as an example, other implementations are also possible, and substantially the same description can also be applied to the other cross-sectional structure taken along the slash ('/') direction, and as such duplicate descriptions thereof will herein be omitted for brevity.

The cross-sectional structure 2300-2 may include first output nodes (ON1) arranged to be spaced apart from each other within the semiconductor substrate, a first biasing node (BN1*e*) disposed between the first output nodes (ON1), a first biasing node (BN1*a*) arranged on the left side of the left first output node (ON1), and a first biasing node (BN1*d*) arranged on the right side of the right first output node (ON1). The depth of the first output node (ON1) may be greater than the depth of each of the first biasing nodes (BN1*a*, BN1*d*, BN1*e*), but the scope of the disclosed technology is not limited thereto.

The first biasing node (BN1*e*) may receive a bias voltage (VB) for enabling the SPAD corresponding to the cross-sectional structure 2300-2 to enter the Geiger mode. Here, the bias voltage (VB) may be the first bias voltage (VB1) or the second bias voltage (VB2), but in the following description, it will be assumed that the bias voltage (VB) is the first bias voltage (VB1).

Additionally, the first biasing nodes (BN1*a*, BN1*d*) may be connected to the ground and may receive a ground voltage (e.g., OV).

The first current (I1) may flow between the first biasing nodes (BN1*a*, BN1*e*) through the semiconductor substrate due to a difference in voltage between the first biasing nodes (BN1*a*, BN1*e*). In addition, the second current (I2) may flow between the first biasing nodes (BN1*d*, BN1*e*) through the semiconductor substrate due to the voltage difference between the first biasing nodes (BN1*d*, BN1*e*). The paths of the first current (I1) and the second current (I2) shown in FIG. 23B are merely examples, the scope of the disclosed technology is not limited thereto, and the first current (I1) and the second current (I2) can flow through various paths.

In addition, when the bias voltage (VB) is the second bias voltage (VB2), the first current I1 and the second current I2 may flow in the opposite directions.

Carriers (C) generated by photons incident onto the semiconductor substrate may move along the flow of the first current (I1) or the second current (I2), and the avalanche breakdown can be triggered due to the electric field directed to the first output node (ON1).

In other words, even when it is difficult for the carriers (C) generated by photons incident onto the semiconductor substrate to generate the avalanche process, the avalanche process can be induced by moving the carriers (C) through the current flowing between the biasing nodes, resulting in increased sensitivity of the corresponding SPAD.

In FIGS. 8A to 23B, various structures for increasing or decreasing the sensitivity (PDE or DCR) of SPADs have been described. The first SPAD (SPAD_C) and the second SPAD (SPAD_A) having different characteristics may be disposed in the pixel array 110 according to the embodiments of the disclosed technology. Accordingly, the first SPAD (SPAD_C) and the second SPAD (SPAD_A) that are optimized according to the design purpose of the imaging device ID) can be selected. For example, in order to expand the dynamic range by maximizing a difference in sensitivity e between the first SPAD (SPAD_C) and the second SPAD (SPAD_A), a structure for minimizing the sensitivity may be selected for the first SPAD (SPAD_C) and the selected structure may then be applied to the first SPAD (SPAD_C), and a structure for maximizing the sensitivity may be selected for the second SPAD (SPAD_A) and the selected structure may then be applied to the second SPAD (SPAD_A).

Additionally, as necessary, the structures of the first SPADs (SPAD_C) included in one pixel array 110 may be different from each other, or the structures of the second SPADs (SPAD_A) included in one pixel array 110 may be different from each other.

For example, in a region that is disposed near the edge of the pixel array 110, resulting in deteriorated light reception efficiency (or light reception amount per area) therein, a structure that can increase sensitivity may be applied to the first SPAD (SPAD_C). In a region that is disposed near the optical axis of the pixel array 110, resulting in increased light reception efficiency (or light reception amount per area) therein, a structure that can reduce sensitivity may be applied to the first SPAD (SPAD_C).

The structures and operations of SPADs and pixels, positions of impurity regions, doping concentrations, etc. of the SPADs and the pixels are merely examples, and may be varied within the range to which the technical idea of the disclosed technology can be applied.

As is apparent from the above description, the image sensing device based on some implementations of the disclosed technology may include single-photon avalanche diode (SPAD) pixels having different sensitivities, and may detect a distance to a target object using one or more SPAD pixels appropriate for a situation, resulting in implementation of optimal performance optimized for the imaging device.

The embodiments of the disclosed technology may provide a variety of effects capable of being directly or indirectly recognized through the above-mentioned patent document.

Those skilled in the art will appreciate that the disclosed technology may be carried out in other specific ways than those set forth herein. In addition, claims that are not explicitly presented in the appended claims may be presented in combination as an embodiment or included as a new claim by a subsequent amendment after the application is filed.

Although a number of illustrative embodiments have been described, it should be understood that modifications and enhancements to the disclosed embodiments and other embodiments can be devised based on what is described and/or illustrated in this patent document.

What is claimed is:

1. An image sensing device comprising:
   a first pixel including a first single-photon avalanche diode (SPAD) that includes a cathode to receive a first bias voltage;
   a second pixel including a second SPAD that includes an anode to receive a second bias voltage; and
   a selection circuit coupled to the first pixel and the second pixel and configured to select the first pixel or the second pixel to produce an output.

2. The image sensing device according to claim 1, wherein the selection circuit includes:
   a mode selector configured to activate the first pixel or the second pixel in response to a mode selection signal based on at least one of illuminance information, power information, user selection information, or temperature information.

3. The image sensing device according to claim 2, wherein:
   the first pixel includes:
      a first control transistor coupled between the cathode of the first SPAD and the mode selector and configured to receive a mode selection voltage in response to the mode selection signal; and
   the second pixel includes:
      a second control transistor coupled between the anode of the second SPAD and the mode selector and configured to receive the mode selection voltage.

4. The image sensing device according to claim 3, wherein:

the first control transistor is configured to be turned on, in response to the mode selection voltage being the first bias voltage, to transmit the first bias voltage to the cathode of the first SPAD.

5. The image sensing device according to claim 3, wherein:

the second control transistor is configured to be turned on, in response to the mode selection voltage being the second bias voltage, to transmit the second bias voltage to the anode of the second SPAD.

6. The image sensing device according to claim 3, wherein:

the first control transistor is a PMOS transistor; and the second control transistor is an NMOS transistor.

7. The image sensing device according to claim 2, wherein:

the first pixel includes:

a first control transistor coupled between the cathode of the first SPAD and a node to which the first bias voltage is applied, and configured to receive a mode selection voltage in response to the mode selection signal; and the second pixel includes:

a second control transistor coupled between the anode of the second SPAD and a node to which the second bias voltage is applied, and configured to receive the mode selection voltage.

8. The image sensing device according to claim 7, wherein the first control transistor is configured to be turned on, in response to the mode selection voltage being at a first activation voltage lower than the first bias voltage, to transmit the first bias voltage to the cathode of the first SPAD.

9. The image sensing device according to claim 7, wherein:

the second control transistor is configured to be turned on, in response to the mode selection voltage being at a second activation voltage higher than the second bias voltage, to transmit the second bias voltage to the anode of the second SPAD.

10. The image sensing device according to claim 2, wherein:

the mode selector is configured to activate the first pixel in response to the illuminance information indicating that an illuminance value is equal to or greater than a predetermined threshold value.

11. The image sensing device according to claim 2, wherein:

the mode selector is configured to activate the second pixel in response to the illuminance information indicating that an illuminance value is less than a predetermined threshold value.

12. The image sensing device according to claim 1, wherein the selection circuit includes:

an output selector configured to select an output signal of the first pixel or an output signal of the second pixel as a pixel output signal in response to a mode selection signal based on illuminance information.

13. The image sensing device according to claim 12, wherein:

the output selector is configured to select the output signal of the first pixel in response to the illuminance information indicating that an illuminance value is equal to or greater than a predetermined threshold value.

14. The image sensing device according to claim 12, wherein:

the output selector is configured to select the output signal of the second pixel in response to the illuminance information indicating that an illuminance value is less than a predetermined threshold value.

15. The image sensing device according to claim 1, wherein:

the first pixel and the second pixel are alternately arranged in a first direction.

16. The image sensing device according to claim 1, wherein:

the first pixel and the second pixel are configured to form a first block and a second block, respectively, each of the first block and the second block having a (Mx N) matrix structure, wherein at least one of M and N is a natural number of 2 or greater, in the first block, the first pixel is arranged to be adjacent to another first pixel, and in the second block, the second pixel is arranged to be adjacent to another second pixel.

17. The image sensing device according to claim 1, wherein each of the first pixel and the second pixel includes:

a sensor layer configured to include the first SPAD or the second SPAD, and a logic layer configured to include a circuit for driving the first SPAD or the second SPAD.

18. The image sensing device according to claim 1, wherein the second pixel further includes:

a first optical structure configured to increase sensitivity of the second SPAD.

19. The image sensing device according to claim 18, wherein the first optical structure further includes:

a plurality of uneven structures formed to scatter light incident on the second pixel.

20. The image sensing device according to claim 1, wherein the first pixel further includes:

a second optical structure configured to reduce sensitivity of the first SPAD.

21. The image sensing device according to claim 1, wherein the first pixel includes:

a first output node disposed at a center of the first pixel and corresponding to an anode of the first SPAD; and a first biasing node disposed to surround the first output node and corresponding to the cathode of the first SPAD.

22. The image sensing device according to claim 1, wherein the first pixel includes:

a first P-type region disposed on a top surface of a semiconductor substrate and configured to correspond to the anode of the first SPAD; and a first N-type region spaced apart from the first P-type region and configured to correspond to the cathode of the first SPAD.

23. The image sensing device according to claim 1, wherein the first pixel includes:

a first output node disposed at a center of the first pixel and corresponding to an anode of the first SPAD; and a first biasing node disposed at each vertex of the first pixel and corresponding to the cathode of the first SPAD.

24. The image sensing device according to claim 1, wherein the first pixel includes:

a central biasing node disposed at a center of the first pixel and corresponding to the cathode of the first SPAD;

a first output node disposed to surround the central biasing node and corresponding to an anode of the first SPAD; and a first biasing node disposed at each vertex of the first pixel.

25. An image sensing device comprising:

a first pixel including a first single-photon avalanche diode (SPAD) with a first detection sensitivity;

a second pixel including a second SPAD with a second detection sensitivity higher than the first detection sensitivity; and a selection circuit coupled to the first pixel and the second pixel and configured to select the first pixel or the second pixel to produce an output.

\* \* \* \* \*